(12) United States Patent
Petite et al.

(10) Patent No.: US 8,379,564 B2
(45) Date of Patent: *Feb. 19, 2013

(54) SYSTEM AND METHOD FOR MONITORING REMOTE DEVICES WITH A DUAL-MODE WIRELESS COMMUNICATION PROTOCOL

(75) Inventors: Thomas David Petite, Atlanta, GA (US); Richard M Huff, Conyers, GA (US); David P Aldoretta, Duluth, GA (US); Candida Stevens, Atlanta, GA (US)

(73) Assignee: Sipco, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/220,355

(22) Filed: Aug. 29, 2011

(65) Prior Publication Data

US 2011/0310929 A1    Dec. 22, 2011

Related U.S. Application Data

(63) Continuation of application No. 10/792,608, filed on Mar. 3, 2004, now Pat. No. 8,031,650.

(51) Int. Cl.
*H04B 7/216* (2006.01)
*H04B 1/00* (2006.01)
*G08B 23/00* (2006.01)
*H04M 3/00* (2006.01)

(52) U.S. Cl. .................. 370/320; 375/130; 340/870.02; 455/418; 455/419; 455/420

(58) Field of Classification Search ........... 370/319–320
See application file for complete search history.

(56) References Cited

U.S. PATENT DOCUMENTS

| | | | |
|---|---|---|---|
| 3,665,475 A | 5/1972 | Gram |
| 3,705,385 A | 12/1972 | Batz |
| 3,723,876 A | 3/1973 | Seaborn, Jr. |
| 3,742,142 A | 6/1973 | Martin |
| 3,848,231 A | 11/1974 | Wootton |
| 3,892,948 A | 7/1975 | Constable |
| 3,906,460 A | 9/1975 | Halpern |
| 3,914,692 A | 10/1975 | Seaborn, Jr. |
| 3,922,492 A | 11/1975 | Lumsden |

(Continued)

FOREIGN PATENT DOCUMENTS

| | | |
|---|---|---|
| EP | 0483547 A1 | 5/1992 |
| EP | 0578041 B1 | 1/1994 |

(Continued)

OTHER PUBLICATIONS

"Wayport's Value Proposition: To provide the industry's best high-speed Internet and business center experience for the airport passenger to stay productive," http://www.wayport.net/airportsoverview (visited Jul. 29, 2003) (2 pages).

(Continued)

*Primary Examiner* — Huy C Ho
(74) *Attorney, Agent, or Firm* — Dustin B. Weeks, Esq.; Troutman Sanders LLP

(57) ABSTRACT

The present invention is generally directed to systems and device for monitoring remote device with a wireless, dual-mode communication protocol. As such, a representative embodiment is a system for monitoring and controlling remote devices. The system includes a first and a second remote device; and a first and a second wireless transceiver integrated with the respective remote devices. The wireless transceivers are configured to communicate with at least one of a spread-spectrum communication protocol and a fixed-frequency communication protocol.

18 Claims, 8 Drawing Sheets

U.S. PATENT DOCUMENTS

| | | |
|---|---|---|
| 3,925,763 A | 12/1975 | Wadhwani et al. |
| 4,025,315 A | 5/1977 | Mazelli |
| 4,056,684 A | 11/1977 | Lindstrom |
| 4,058,672 A | 11/1977 | Crager et al. |
| 4,083,003 A | 4/1978 | Haemmig |
| 4,120,452 A | 10/1978 | Kimura et al. |
| 4,124,839 A | 11/1978 | Cohen |
| 4,135,181 A | 1/1979 | Bogacki et al. |
| 4,204,195 A | 5/1980 | Bogacki |
| 4,213,119 A | 7/1980 | Ward et al. |
| 4,277,837 A | 7/1981 | Stuckert |
| 4,278,975 A | 7/1981 | Kimura et al. |
| 4,284,852 A | 8/1981 | Szybicki et al. |
| 4,322,842 A | 3/1982 | Martinez |
| 4,345,116 A | 8/1982 | Ash et al. |
| 4,354,181 A | 10/1982 | Spletzer |
| 4,395,780 A | 7/1983 | Gohm et al. |
| 4,396,910 A | 8/1983 | Enemark et al. |
| 4,396,915 A | 8/1983 | Farnsworth et al. |
| 4,399,531 A | 8/1983 | Grande et al. |
| 4,406,016 A | 9/1983 | Abrams et al. |
| 4,417,450 A | 11/1983 | Morgan, Jr. et al. |
| 4,436,957 A | 3/1984 | Mazza et al. |
| 4,446,454 A | 5/1984 | Pyle |
| 4,446,458 A | 5/1984 | Cook |
| 4,454,414 A | 6/1984 | Benton |
| 4,468,656 A | 8/1984 | Clifford et al. |
| 4,488,152 A | 12/1984 | Arnason et al. |
| 4,495,496 A | 1/1985 | Miller, III |
| 4,551,719 A | 11/1985 | Carlin et al. |
| 4,611,198 A | 9/1986 | Levinson et al. |
| 4,621,263 A | 11/1986 | Takenaka et al. |
| 4,630,035 A | 12/1986 | Stahl et al. |
| 4,631,357 A | 12/1986 | Grunig |
| 4,665,519 A | 5/1987 | Kirchner et al. |
| 4,669,113 A | 5/1987 | Ash et al. |
| 4,670,739 A | 6/1987 | Kelly, Jr. |
| 4,692,761 A | 9/1987 | Robinton |
| 4,704,724 A | 11/1987 | Krishnan et al. |
| 4,707,852 A | 11/1987 | Jahr et al. |
| 4,731,810 A | 3/1988 | Watkins |
| 4,742,296 A | 5/1988 | Petr et al. |
| 4,757,185 A | 7/1988 | Onishi |
| 4,788,721 A | 11/1988 | Krishnan et al. |
| 4,792,946 A | 12/1988 | Mayo |
| 4,799,059 A | 1/1989 | Grindahl et al. |
| 4,800,543 A | 1/1989 | Lyndon-James et al. |
| 4,814,763 A | 3/1989 | Nelson et al. |
| 4,825,457 A | 4/1989 | Lebowitz |
| 4,829,561 A | 5/1989 | Matheny |
| 4,849,815 A | 7/1989 | Streck |
| 4,851,654 A | 7/1989 | Nitta |
| 4,856,046 A | 8/1989 | Streck et al. |
| 4,857,912 A | 8/1989 | Everett, Jr. et al. |
| 4,864,559 A | 9/1989 | Perlman |
| 4,875,231 A | 10/1989 | Hara et al. |
| 4,884,123 A | 11/1989 | Dixit et al. |
| 4,884,132 A | 11/1989 | Morris et al. |
| 4,897,644 A | 1/1990 | Hirano |
| 4,906,828 A | 3/1990 | Halpern |
| 4,908,769 A | 3/1990 | Vaughan et al. |
| 4,912,656 A | 3/1990 | Cain et al. |
| 4,918,432 A | 4/1990 | Pauley |
| 4,918,690 A | 4/1990 | Markkula, Jr. et al. |
| 4,918,995 A | 4/1990 | Pearman et al. |
| 4,924,462 A | 5/1990 | Sojka |
| 4,928,299 A | 5/1990 | Tansky et al. |
| 4,939,726 A | 7/1990 | Flammer et al. |
| 4,940,976 A | 7/1990 | Gastouniotis et al. |
| 4,949,077 A | 8/1990 | Mbuthia |
| 4,952,928 A | 8/1990 | Carroll et al. |
| 4,962,496 A | 10/1990 | Vercellotti et al. |
| 4,967,366 A | 10/1990 | Kaehler |
| 4,968,970 A | 11/1990 | LaPorte |
| 4,968,978 A | 11/1990 | Stolarczyk |
| 4,972,504 A | 11/1990 | Daniel, Jr. et al. |
| 4,973,957 A | 11/1990 | Shimizu et al. |
| 4,973,970 A | 11/1990 | Reeser |
| 4,977,612 A | 12/1990 | Wilson |
| 4,980,907 A | 12/1990 | Raith et al. |
| 4,987,536 A | 1/1991 | Humblet |
| 4,989,230 A | 1/1991 | Gillig et al. |
| 4,991,008 A | 2/1991 | Nama |
| 4,993,059 A | 2/1991 | Smith et al. |
| 4,998,095 A | 3/1991 | Shields |
| 4,999,607 A | 3/1991 | Evans |
| 5,007,052 A | 4/1991 | Flammer |
| 5,032,833 A | 7/1991 | Laporte |
| 5,038,372 A | 8/1991 | Elms et al. |
| 5,055,851 A | 10/1991 | Sheffer |
| 5,057,814 A | 10/1991 | Onan et al. |
| 5,061,997 A | 10/1991 | Rea et al. |
| 5,079,768 A | 1/1992 | Flammer |
| 5,086,391 A | 2/1992 | Chambers |
| 5,088,032 A | 2/1992 | Bosack |
| 5,091,713 A | 2/1992 | Horne et al. |
| 5,111,199 A | 5/1992 | Tomoda et al. |
| 5,113,183 A | 5/1992 | Mizuno et al. |
| 5,113,184 A | 5/1992 | Katayama |
| 5,115,224 A | 5/1992 | Kostusiak et al. |
| 5,115,433 A | 5/1992 | Baran et al. |
| 5,117,422 A | 5/1992 | Hauptschein et al. |
| 5,124,624 A | 6/1992 | de Vries et al. |
| 5,128,855 A | 7/1992 | Hilber et al. |
| 5,130,519 A | 7/1992 | Bush et al. |
| 5,130,987 A | 7/1992 | Flammer |
| 5,131,038 A | 7/1992 | Puhl et al. |
| 5,134,650 A | 7/1992 | Blackmon |
| 5,136,285 A | 8/1992 | Okuyama |
| 5,138,615 A | 8/1992 | Lamport et al. |
| 5,155,481 A | 10/1992 | Brennan, Jr. et al. |
| 5,159,317 A | 10/1992 | Brav |
| 5,159,592 A | 10/1992 | Perkins |
| 5,162,776 A | 11/1992 | Bushnell et al. |
| 5,170,393 A | 12/1992 | Peterson et al. |
| 5,177,342 A | 1/1993 | Adams |
| 5,189,287 A | 2/1993 | Parienti |
| 5,191,192 A | 3/1993 | Takahira et al. |
| 5,191,326 A | 3/1993 | Montgomery |
| 5,193,111 A | 3/1993 | Matty et al. |
| 5,195,018 A | 3/1993 | Kwon et al. |
| 5,197,095 A | 3/1993 | Bonnet et al. |
| 5,200,735 A | 4/1993 | Hines |
| 5,204,670 A | 4/1993 | Stinton |
| 5,212,645 A | 5/1993 | Wildes et al. |
| 5,216,502 A | 6/1993 | Katz |
| 5,221,838 A | 6/1993 | Gutman et al. |
| 5,223,844 A | 6/1993 | Mansell et al. |
| 5,224,648 A | 7/1993 | Simon et al. |
| 5,231,658 A | 7/1993 | Eftechiou |
| 5,235,630 A | 8/1993 | Moody et al. |
| 5,239,294 A | 8/1993 | Flanders et al. |
| 5,239,575 A | 8/1993 | White et al. |
| 5,241,410 A | 8/1993 | Streck et al. |
| 5,243,338 A | 9/1993 | Brennan, Jr. et al. |
| 5,245,633 A | 9/1993 | Schwartz et al. |
| 5,251,205 A | 10/1993 | Callon et al. |
| 5,252,967 A | 10/1993 | Brennan et al. |
| 5,253,167 A | 10/1993 | Yoshida et al. |
| 5,265,150 A | 11/1993 | Helmkamp et al. |
| 5,265,162 A | 11/1993 | Bush et al. |
| 5,266,782 A | 11/1993 | Alanara et al. |
| 5,272,747 A | 12/1993 | Meads |
| 5,276,680 A | 1/1994 | Messenger |
| 5,282,204 A | 1/1994 | Shpancer et al. |
| 5,282,250 A | 1/1994 | Dent et al. |
| 5,289,165 A | 2/1994 | Belin |
| 5,289,362 A | 2/1994 | Liebl et al. |
| 5,291,516 A | 3/1994 | Dixon et al. |
| 5,295,154 A | 3/1994 | Meier et al. |
| 5,305,370 A | 4/1994 | Kearns et al. |
| 5,309,501 A | 5/1994 | Kozik et al. |
| 5,315,645 A | 5/1994 | Matheny |
| 5,317,309 A | 5/1994 | Vercellotti et al. |
| 5,319,364 A | 6/1994 | Waraksa et al. |
| 5,319,698 A | 6/1994 | Glidewell et al. |
| 5,319,711 A | 6/1994 | Servi |

| | | | | | |
|---|---|---|---|---|---|
| 5,323,384 A | 6/1994 | Norwood et al. | 5,550,535 A | 8/1996 | Park |
| 5,325,429 A | 6/1994 | Kurgan | 5,553,094 A | 9/1996 | Johnson et al. |
| 5,329,394 A | 7/1994 | Calvani et al. | 5,555,258 A | 9/1996 | Snelling et al. |
| 5,331,318 A | 7/1994 | Montgomery | 5,555,286 A | 9/1996 | Tendler |
| 5,334,974 A | 8/1994 | Simms et al. | 5,557,320 A | 9/1996 | Krebs |
| 5,335,265 A | 8/1994 | Cooper et al. | 5,557,748 A | 9/1996 | Norris |
| 5,343,493 A | 8/1994 | Karimullah | 5,562,537 A | 10/1996 | Zver et al. |
| 5,344,068 A | 9/1994 | Haessig | 5,565,857 A | 10/1996 | Lee |
| 5,345,231 A | 9/1994 | Koo et al. | 5,568,535 A | 10/1996 | Sheffer et al. |
| 5,345,595 A | 9/1994 | Johnson et al. | 5,570,084 A | 10/1996 | Ritter et al. |
| 5,347,263 A | 9/1994 | Carroll et al. | 5,572,438 A | 11/1996 | Ehlers et al. |
| 5,352,278 A | 10/1994 | Korver et al. | 5,572,528 A | 11/1996 | Shuen |
| 5,354,974 A | 10/1994 | Eisenberg | 5,573,181 A | 11/1996 | Ahmed |
| 5,355,278 A | 10/1994 | Hosoi et al. | 5,574,111 A | 11/1996 | Brichta et al. |
| 5,355,513 A | 10/1994 | Clarke et al. | 5,583,850 A | 12/1996 | Snodgrass et al. |
| 5,365,217 A | 11/1994 | Toner | 5,583,914 A | 12/1996 | Chang et al. |
| 5,371,736 A | 12/1994 | Evan | 5,587,705 A | 12/1996 | Morris |
| 5,382,778 A | 1/1995 | Takahira et al. | 5,588,005 A | 12/1996 | Ali et al. |
| 5,383,134 A | 1/1995 | Wrzesinski | 5,589,878 A | 12/1996 | Cortjens et al. |
| 5,383,187 A | 1/1995 | Vardakas et al. | 5,590,038 A | 12/1996 | Pitroda |
| 5,390,206 A | 2/1995 | Rein et al. | 5,590,179 A | 12/1996 | Shincovich et al. |
| 5,406,619 A | 4/1995 | Akhteruzzaman et al. | 5,592,491 A | 1/1997 | Dinkins |
| 5,412,192 A | 5/1995 | Hoss | 5,594,431 A | 1/1997 | Sheppard et al. |
| 5,412,654 A | 5/1995 | Perkins | 5,596,719 A | 1/1997 | Ramakrishnan et al. |
| 5,412,760 A | 5/1995 | Peitz | 5,596,722 A | 1/1997 | Rahnema |
| 5,416,475 A | 5/1995 | Tolbert et al. | 5,602,843 A | 2/1997 | Gray |
| 5,416,725 A | 5/1995 | Pacheco et al. | 5,604,414 A | 2/1997 | Milligan et al. |
| 5,418,812 A | 5/1995 | Reyes et al. | 5,604,869 A | 2/1997 | Mincher et al. |
| 5,420,910 A | 5/1995 | Rudokas et al. | 5,606,361 A | 2/1997 | Davidsohn et al. |
| 5,424,708 A | 6/1995 | Ballesty et al. | 5,608,721 A | 3/1997 | Natarajan et al. |
| 5,430,729 A | 7/1995 | Rahnema | 5,608,786 A | 3/1997 | Gordon |
| 5,432,507 A | 7/1995 | Mussino et al. | 5,613,620 A | 3/1997 | Center et al. |
| 5,438,329 A | 8/1995 | Gastouniotis et al. | 5,615,227 A | 3/1997 | Schumacher, Jr. et al. |
| 5,439,414 A | 8/1995 | Jacob | 5,615,277 A | 3/1997 | Hoffman |
| 5,440,545 A | 8/1995 | Buchholz et al. | 5,617,084 A | 4/1997 | Sears |
| 5,442,553 A | 8/1995 | Parrillo | 5,619,192 A | 4/1997 | Ayala |
| 5,442,633 A | 8/1995 | Perkins et al. | 5,623,495 A | 4/1997 | Eng et al. |
| 5,445,287 A | 8/1995 | Center et al. | 5,625,410 A | 4/1997 | Washino et al. |
| 5,445,347 A | 8/1995 | Ng | 5,628,050 A | 5/1997 | McGraw et al. |
| 5,451,929 A | 9/1995 | Adelman et al. | 5,629,687 A | 5/1997 | Sutton et al. |
| 5,451,938 A | 9/1995 | Brennan, Jr. | 5,629,875 A | 5/1997 | Adair, Jr. |
| 5,452,344 A | 9/1995 | Larson | 5,630,209 A | 5/1997 | Wizgall et al. |
| 5,454,024 A | 9/1995 | Lebowitz | 5,631,554 A | 5/1997 | Briese et al. |
| 5,455,569 A | 10/1995 | Sherman et al. | 5,636,216 A | 6/1997 | Fox et al. |
| 5,465,401 A | 11/1995 | Thompson | 5,640,002 A | 6/1997 | Ruppert et al. |
| 5,467,074 A | 11/1995 | Pedtke | 5,644,294 A | 7/1997 | Ness |
| 5,467,082 A | 11/1995 | Sanderson | 5,655,219 A | 8/1997 | Jusa et al. |
| 5,467,345 A | 11/1995 | Cutler, Jr. et al. | 5,657,389 A | 8/1997 | Houvener |
| 5,468,948 A | 11/1995 | Koenck et al. | 5,659,300 A | 8/1997 | Dresselhuys et al. |
| 5,471,201 A | 11/1995 | Cerami et al. | 5,659,303 A | 8/1997 | Adair, Jr. |
| 5,473,322 A | 12/1995 | Carney | 5,668,876 A | 9/1997 | Falk et al. |
| 5,475,689 A | 12/1995 | Kay et al. | 5,673,252 A | 9/1997 | Johnson et al. |
| 5,479,400 A | 12/1995 | Dilworth et al. | 5,673,259 A | 9/1997 | Quick, Jr. |
| 5,481,259 A | 1/1996 | Bane | 5,673,304 A | 9/1997 | Connor et al. |
| 5,481,532 A | 1/1996 | Hassan et al. | 5,673,305 A | 9/1997 | Ross |
| 5,484,997 A | 1/1996 | Haynes | 5,682,139 A | 10/1997 | Pradeep et al. |
| 5,488,608 A | 1/1996 | Flammer, III | 5,682,476 A | 10/1997 | Tapperson et al. |
| 5,493,273 A | 2/1996 | Smurlo et al. | 5,689,229 A | 11/1997 | Chaco et al. |
| 5,493,287 A | 2/1996 | Bane | 5,691,980 A | 11/1997 | Welles, II et al. |
| 5,502,726 A | 3/1996 | Fischer | 5,696,695 A | 12/1997 | Ehlers et al. |
| 5,504,746 A | 4/1996 | Meier | 5,699,328 A | 12/1997 | Ishizaki et al. |
| 5,506,837 A | 4/1996 | Sollner et al. | 5,701,002 A | 12/1997 | Oishi et al. |
| 5,508,412 A | 4/1996 | Kast et al. | 5,702,059 A | 12/1997 | Chu et al. |
| 5,509,073 A | 4/1996 | Monnin | 5,704,046 A | 12/1997 | Hogan |
| 5,513,244 A | 4/1996 | Joao et al. | 5,704,517 A | 1/1998 | Lancaster, Jr. |
| 5,515,419 A | 5/1996 | Sheffer | 5,706,191 A | 1/1998 | Bassett et al. |
| 5,517,188 A | 5/1996 | Carroll et al. | 5,706,976 A | 1/1998 | Purkey |
| 5,522,089 A | 5/1996 | Kikinis et al. | 5,708,223 A | 1/1998 | Wyss |
| 5,528,215 A | 6/1996 | Siu et al. | 5,708,655 A | 1/1998 | Toth et al. |
| 5,528,507 A | 6/1996 | McNamara et al. | 5,712,619 A | 1/1998 | Simkin |
| 5,539,825 A | 7/1996 | Akiyama et al. | 5,712,980 A | 1/1998 | Beeler et al. |
| 5,541,938 A | 7/1996 | Di Zenzo et al. | 5,714,931 A | 2/1998 | Petite et al. |
| 5,542,100 A | 7/1996 | Hatakeyama | 5,717,718 A | 2/1998 | Rowsell et al. |
| 5,544,036 A | 8/1996 | Brown, Jr. et al. | 5,719,564 A | 2/1998 | Sears |
| 5,544,322 A | 8/1996 | Cheng et al. | 5,722,076 A | 2/1998 | Sakabe et al. |
| 5,544,784 A | 8/1996 | Malaspina | 5,726,534 A | 3/1998 | Seo |
| 5,548,632 A | 8/1996 | Walsh et al. | 5,726,544 A | 3/1998 | Lee |
| 5,550,358 A | 8/1996 | Tait et al. | 5,726,634 A | 3/1998 | Hess et al. |
| 5,550,359 A | 8/1996 | Bennett | 5,726,644 A | 3/1998 | Jednacz et al. |

| Patent | Date | Inventor |
|---|---|---|
| 5,726,984 A | 3/1998 | Kubler et al. |
| 5,732,074 A | 3/1998 | Spaur et al. |
| 5,732,078 A | 3/1998 | Arango |
| 5,736,965 A | 4/1998 | Mosebrook et al. |
| 5,737,318 A | 4/1998 | Melnik |
| 5,740,232 A | 4/1998 | Pailles et al. |
| 5,740,366 A | 4/1998 | Mahany et al. |
| 5,742,509 A | 4/1998 | Goldberg et al. |
| 5,745,849 A | 4/1998 | Britton |
| 5,748,104 A | 5/1998 | Argyroudis et al. |
| 5,748,619 A | 5/1998 | Meier |
| 5,754,111 A | 5/1998 | Garcia |
| 5,754,227 A | 5/1998 | Fukuoka |
| 5,757,783 A | 5/1998 | Eng et al. |
| 5,757,788 A | 5/1998 | Tatsumi et al. |
| 5,760,742 A | 6/1998 | Branch et al. |
| 5,761,083 A | 6/1998 | Brown, Jr. et al. |
| 5,764,742 A | 6/1998 | Howard et al. |
| 5,767,791 A | 6/1998 | Stoop et al. |
| 5,771,274 A | 6/1998 | Harris |
| 5,774,052 A | 6/1998 | Hamm et al. |
| 5,781,143 A | 7/1998 | Rossin |
| 5,790,644 A | 8/1998 | Kikinis |
| 5,790,662 A | 8/1998 | Valerij et al. |
| 5,790,938 A | 8/1998 | Talarmo |
| 5,796,727 A | 8/1998 | Harrison et al. |
| 5,798,964 A | 8/1998 | Shimizu et al. |
| 5,801,643 A | 9/1998 | Williams et al. |
| 5,812,531 A | 9/1998 | Cheung et al. |
| 5,815,505 A | 9/1998 | Mills |
| 5,818,822 A | 10/1998 | Thomas et al. |
| 5,822,273 A | 10/1998 | Bary et al. |
| 5,822,309 A | 10/1998 | Ayanoglu et al. |
| 5,822,544 A | 10/1998 | Chaco et al. |
| 5,825,772 A | 10/1998 | Dobbins et al. |
| 5,826,195 A | 10/1998 | Westerlage et al. |
| 5,828,044 A | 10/1998 | Jun et al. |
| 5,832,057 A | 11/1998 | Furman |
| 5,838,223 A | 11/1998 | Gallant et al. |
| 5,838,237 A | 11/1998 | Revell et al. |
| 5,838,812 A | 11/1998 | Pare, Jr. et al. |
| 5,841,118 A | 11/1998 | East et al. |
| 5,841,764 A | 11/1998 | Roderique et al. |
| 5,842,976 A | 12/1998 | Williamson |
| 5,844,808 A | 12/1998 | Konsmo et al. |
| 5,845,230 A | 12/1998 | Lamberson |
| 5,848,054 A | 12/1998 | Mosebrook et al. |
| 5,852,658 A | 12/1998 | Knight et al. |
| 5,854,994 A | 12/1998 | Canada et al. |
| 5,856,974 A | 1/1999 | Gervais et al. |
| 5,862,201 A | 1/1999 | Sands |
| 5,864,772 A | 1/1999 | Alvarado et al. |
| 5,870,686 A | 2/1999 | Monson |
| 5,872,773 A | 2/1999 | Katzela et al. |
| 5,873,043 A | 2/1999 | Comer |
| 5,874,903 A | 2/1999 | Shuey et al. |
| 5,875,185 A | 2/1999 | Wang et al. |
| 5,880,677 A | 3/1999 | Lestician |
| 5,883,884 A | 3/1999 | Atkinson |
| 5,883,886 A | 3/1999 | Eaton et al. |
| 5,884,184 A | 3/1999 | Sheffer |
| 5,884,271 A | 3/1999 | Pitroda |
| 5,886,333 A | 3/1999 | Miyake |
| 5,889,468 A | 3/1999 | Banga |
| 5,892,690 A | 4/1999 | Boatman et al. |
| 5,892,758 A | 4/1999 | Argyroudis |
| 5,892,924 A | 4/1999 | Lyon et al. |
| 5,896,097 A | 4/1999 | Cardozo |
| 5,897,607 A | 4/1999 | Jenney et al. |
| 5,898,369 A | 4/1999 | Godwin |
| 5,898,733 A | 4/1999 | Satyanarayana |
| 5,905,438 A | 5/1999 | Weiss et al. |
| 5,905,442 A | 5/1999 | Mosebrook et al. |
| 5,907,291 A | 5/1999 | Chen et al. |
| 5,907,491 A | 5/1999 | Canada et al. |
| 5,907,540 A | 5/1999 | Hayashi |
| 5,907,807 A | 5/1999 | Chavez, Jr. et al. |
| 5,909,429 A | 6/1999 | Satyanarayana et al. |
| 5,914,656 A | 6/1999 | Ojala et al. |
| 5,914,672 A | 6/1999 | Glorioso et al. |
| 5,914,673 A | 6/1999 | Jennings et al. |
| 5,917,405 A | 6/1999 | Joao |
| 5,917,629 A | 6/1999 | Hortensius et al. |
| 5,923,269 A | 7/1999 | Shuey et al. |
| 5,926,101 A | 7/1999 | Dasgupta |
| 5,926,103 A | 7/1999 | Petite |
| 5,926,529 A | 7/1999 | Hache et al. |
| 5,926,531 A | 7/1999 | Petite |
| 5,933,073 A | 8/1999 | Shuey |
| 5,940,771 A | 8/1999 | Gollnick et al. |
| 5,941,363 A | 8/1999 | Partyka et al. |
| 5,941,955 A | 8/1999 | Wilby et al. |
| 5,946,631 A | 8/1999 | Melnik |
| 5,948,040 A | 9/1999 | DeLorme et al. |
| 5,949,779 A | 9/1999 | Mostafa et al. |
| 5,949,799 A | 9/1999 | Grivna et al. |
| 5,953,319 A | 9/1999 | Dutta et al. |
| 5,953,371 A | 9/1999 | Rowsell et al. |
| 5,953,507 A | 9/1999 | Cheung et al. |
| 5,955,718 A | 9/1999 | Levasseur et al. |
| 5,957,718 A | 9/1999 | Cheng et al. |
| 5,960,074 A | 9/1999 | Clark |
| 5,963,146 A | 10/1999 | Johnson et al. |
| 5,963,452 A | 10/1999 | Etoh et al. |
| 5,963,650 A | 10/1999 | Simionescu et al. |
| 5,966,658 A | 10/1999 | Kennedy, III et al. |
| 5,969,608 A | 10/1999 | Sojdehei et al. |
| 5,973,756 A | 10/1999 | Erlin |
| 5,974,236 A | 10/1999 | Sherman |
| 5,978,364 A | 11/1999 | Melnik |
| 5,978,371 A | 11/1999 | Mason, Jr. et al. |
| 5,978,578 A | 11/1999 | Azarya et al. |
| 5,986,574 A | 11/1999 | Colton |
| 5,987,011 A | 11/1999 | Toh |
| 5,987,331 A | 11/1999 | Grube et al. |
| 5,987,421 A | 11/1999 | Chuang |
| 5,991,625 A | 11/1999 | Vanderpool |
| 5,991,639 A | 11/1999 | Rautiola et al. |
| 5,994,892 A | 11/1999 | Turino et al. |
| 5,995,022 A | 11/1999 | Plis et al. |
| 5,995,592 A | 11/1999 | Shirai et al. |
| 5,995,593 A | 11/1999 | Cho |
| 5,997,170 A | 12/1999 | Brodbeck |
| 5,999,094 A | 12/1999 | Nilssen |
| 6,005,759 A | 12/1999 | Hart et al. |
| 6,005,884 A | 12/1999 | Cook et al. |
| 6,005,963 A | 12/1999 | Bolle et al. |
| 6,018,659 A | 1/2000 | Ayyagari et al. |
| 6,021,664 A | 2/2000 | Granato et al. |
| 6,023,223 A | 2/2000 | Baxter, Jr. |
| 6,026,095 A | 2/2000 | Sherer et al. |
| 6,028,522 A | 2/2000 | Petite |
| 6,028,857 A | 2/2000 | Poor |
| 6,031,455 A | 2/2000 | Grube et al. |
| 6,032,197 A | 2/2000 | Birdwell et al. |
| 6,035,213 A | 3/2000 | Tokuda et al. |
| 6,035,266 A | 3/2000 | Williams et al. |
| 6,036,086 A | 3/2000 | Sizer, II et al. |
| 6,038,491 A | 3/2000 | McGarry et al. |
| 6,044,062 A | 3/2000 | Brownrigg et al. |
| 6,046,978 A | 4/2000 | Melnik |
| 6,054,920 A | 4/2000 | Smith et al. |
| 6,055,561 A | 4/2000 | Feldman et al. |
| 6,060,994 A | 5/2000 | Chen |
| 6,061,604 A | 5/2000 | Russ et al. |
| 6,064,318 A | 5/2000 | Kirchner, III et al. |
| 6,067,017 A | 5/2000 | Stewart et al. |
| 6,067,030 A | 5/2000 | Burnett et al. |
| 6,069,886 A | 5/2000 | Ayerst et al. |
| 6,073,169 A | 6/2000 | Shuey et al. |
| 6,073,266 A | 6/2000 | Ahmed et al. |
| 6,073,840 A | 6/2000 | Marion |
| 6,075,451 A | 6/2000 | Lebowitz et al. |
| 6,078,251 A | 6/2000 | Landt et al. |
| 6,084,867 A | 7/2000 | Meier |
| 6,087,957 A | 7/2000 | Gray |
| 6,088,659 A | 7/2000 | Kelley et al. |
| 6,094,622 A | 7/2000 | Hubbard et al. |

| Patent No. | Date | Inventor |
|---|---|---|
| 6,097,703 A | 8/2000 | Larsen et al. |
| 6,100,816 A | 8/2000 | Moore |
| 6,100,817 A | 8/2000 | Mason, Jr. et al. |
| 6,101,427 A | 8/2000 | Yang |
| 6,101,445 A | 8/2000 | Alvarado et al. |
| 6,108,614 A | 8/2000 | Lincoln et al. |
| 6,112,983 A | 9/2000 | D'Anniballe et al. |
| 6,115,393 A | 9/2000 | Engel et al. |
| 6,115,580 A | 9/2000 | Chuprun et al. |
| 6,119,076 A | 9/2000 | Williams et al. |
| 6,121,593 A | 9/2000 | Mansbery et al. |
| 6,121,885 A | 9/2000 | Masone et al. |
| 6,122,759 A | 9/2000 | Ayanoglu et al. |
| 6,124,806 A | 9/2000 | Cunningham et al. |
| 6,127,917 A | 10/2000 | Tuttle |
| 6,128,551 A | 10/2000 | Davis et al. |
| 6,130,622 A | 10/2000 | Hussey et al. |
| 6,133,850 A | 10/2000 | Moore |
| 6,137,423 A | 10/2000 | Glorioso et al. |
| 6,140,975 A | 10/2000 | Cohen |
| 6,141,347 A | 10/2000 | Shaughnessy et al. |
| 6,150,936 A | 11/2000 | Addy |
| 6,150,955 A | 11/2000 | Tracy et al. |
| 6,157,464 A | 12/2000 | Bloomfield et al. |
| 6,157,824 A | 12/2000 | Bailey |
| 6,163,276 A | 12/2000 | Irving et al. |
| 6,167,239 A | 12/2000 | Wright et al. |
| 6,172,616 B1 | 1/2001 | Johnson et al. |
| 6,173,159 B1 | 1/2001 | Wright et al. |
| 6,174,205 B1 | 1/2001 | Madsen et al. |
| 6,175,922 B1 | 1/2001 | Wang |
| 6,177,883 B1 | 1/2001 | Jennetti et al. |
| 6,178,173 B1 | 1/2001 | Mundwiler et al. |
| 6,181,255 B1 | 1/2001 | Crimmins et al. |
| 6,181,284 B1 | 1/2001 | Madsen et al. |
| 6,181,981 B1 | 1/2001 | Varga et al. |
| 6,185,307 B1 | 2/2001 | Johnson, Jr. |
| 6,188,354 B1 | 2/2001 | Soliman et al. |
| 6,188,675 B1 | 2/2001 | Casper et al. |
| 6,192,282 B1 | 2/2001 | Smith et al. |
| 6,192,390 B1 | 2/2001 | Berger et al. |
| 6,195,018 B1 | 2/2001 | Ragle et al. |
| 6,198,390 B1 | 3/2001 | Schlager et al. |
| 6,199,068 B1 | 3/2001 | Carpenter |
| 6,201,962 B1 | 3/2001 | Sturniolo et al. |
| 6,205,143 B1 | 3/2001 | Lemieux |
| 6,208,247 B1 | 3/2001 | Agre et al. |
| 6,208,266 B1 | 3/2001 | Lyons et al. |
| 6,212,175 B1 | 4/2001 | Harsch |
| 6,215,404 B1 | 4/2001 | Morales |
| 6,215,440 B1 | 4/2001 | Geldart et al. |
| 6,218,953 B1 | 4/2001 | Petite |
| 6,218,958 B1 | 4/2001 | Eichstaedt et al. |
| 6,218,983 B1 | 4/2001 | Kerry et al. |
| 6,219,409 B1 | 4/2001 | Smith et al. |
| 6,229,439 B1 | 5/2001 | Tice |
| 6,233,327 B1 | 5/2001 | Petite |
| 6,234,111 B1 | 5/2001 | Ulman et al. |
| 6,236,332 B1 | 5/2001 | Conkright et al. |
| 6,243,010 B1 | 6/2001 | Addy et al. |
| 6,246,676 B1 | 6/2001 | Chen et al. |
| 6,246,677 B1 | 6/2001 | Nap et al. |
| 6,246,886 B1 | 6/2001 | Oliva |
| 6,249,516 B1 | 6/2001 | Brownrigg et al. |
| 6,259,369 B1 | 7/2001 | Monico |
| 6,271,752 B1 | 8/2001 | Vaios |
| 6,275,166 B1 | 8/2001 | del Castillo et al. |
| 6,275,707 B1 | 8/2001 | Reed et al. |
| 6,286,050 B1 | 9/2001 | Pullen et al. |
| 6,286,756 B1 | 9/2001 | Stinson et al. |
| 6,288,634 B1 | 9/2001 | Weiss et al. |
| 6,288,641 B1 | 9/2001 | Casais |
| 6,295,291 B1 | 9/2001 | Larkins |
| 6,301,514 B1 | 10/2001 | Canada et al. |
| 6,304,556 B1 | 10/2001 | Haas |
| 6,305,205 B1 | 10/2001 | Derks et al. |
| 6,305,602 B1 | 10/2001 | Grabowski et al. |
| 6,307,843 B1 | 10/2001 | Okanoue |
| 6,308,111 B1 | 10/2001 | Koga |
| 6,311,167 B1 | 10/2001 | Davis et al. |
| 6,314,169 B1 | 11/2001 | Schelberg, Jr. et al. |
| 6,317,029 B1 | 11/2001 | Fleeter |
| 6,327,245 B1 | 12/2001 | Satyanarayana et al. |
| 6,329,902 B1 | 12/2001 | Lee et al. |
| 6,334,117 B1 | 12/2001 | Covert et al. |
| 6,351,223 B1 | 2/2002 | DeWeerd et al. |
| 6,356,205 B1 | 3/2002 | Salvo et al. |
| 6,357,034 B1 | 3/2002 | Muller et al. |
| 6,362,745 B1 | 3/2002 | Davis |
| 6,363,057 B1 | 3/2002 | Ardalan et al. |
| 6,363,422 B1 | 3/2002 | Hunter et al. |
| 6,366,217 B1 | 4/2002 | Cunningham et al. |
| 6,366,622 B1 | 4/2002 | Brown et al. |
| 6,369,769 B1 | 4/2002 | Nap et al. |
| 6,370,489 B1 | 4/2002 | Williams et al. |
| 6,373,399 B1 | 4/2002 | Johnson et al. |
| 6,380,851 B1 | 4/2002 | Gilbert et al. |
| 6,384,722 B1 | 5/2002 | Williams |
| 6,392,692 B1 | 5/2002 | Monroe |
| 6,393,341 B1 | 5/2002 | Lawrence et al. |
| 6,393,381 B1 | 5/2002 | Williams et al. |
| 6,393,382 B1 | 5/2002 | Williams et al. |
| 6,396,839 B1 | 5/2002 | Ardalan et al. |
| 6,400,819 B1 | 6/2002 | Nakano et al. |
| 6,401,081 B1 | 6/2002 | Montgomery et al. |
| 6,405,018 B1 | 6/2002 | Reudink et al. |
| 6,411,889 B1 | 6/2002 | Mizunuma et al. |
| 6,415,155 B1 | 7/2002 | Koshima et al. |
| 6,415,245 B2 | 7/2002 | Williams et al. |
| 6,416,471 B1 | 7/2002 | Kumar et al. |
| 6,421,354 B1 | 7/2002 | Godlewski |
| 6,421,731 B1 | 7/2002 | Ciotti, Jr. et al. |
| 6,422,464 B1 | 7/2002 | Terranova |
| 6,424,270 B1 | 7/2002 | Ali |
| 6,424,931 B1 | 7/2002 | Sigmar et al. |
| 6,430,268 B1 | 8/2002 | Petite |
| 6,431,439 B1 | 8/2002 | Suer et al. |
| 6,437,692 B1 | 8/2002 | Petite et al. |
| 6,438,575 B1 | 8/2002 | Khan et al. |
| 6,441,723 B1 | 8/2002 | Mansfield, Jr. et al. |
| 6,445,291 B2 | 9/2002 | Addy et al. |
| 6,456,960 B1 | 9/2002 | Williams et al. |
| 6,457,038 B1 | 9/2002 | Defosse |
| 6,462,644 B1 | 10/2002 | Howell et al. |
| 6,462,672 B1 | 10/2002 | Besson |
| 6,477,558 B1 | 11/2002 | Irving et al. |
| 6,483,290 B1 | 11/2002 | Hemminger et al. |
| 6,484,939 B1 | 11/2002 | Blaeuer |
| 6,489,884 B1 | 12/2002 | Lamberson et al. |
| 6,491,828 B1 | 12/2002 | Sivavec et al. |
| 6,492,910 B1 | 12/2002 | Ragle et al. |
| 6,496,696 B1 | 12/2002 | Melnik |
| 6,504,357 B1 | 1/2003 | Hemminger et al. |
| 6,504,834 B1 | 1/2003 | Fifield |
| 6,507,794 B1 | 1/2003 | Hubbard et al. |
| 6,509,722 B2 | 1/2003 | Lopata |
| 6,513,060 B1 | 1/2003 | Nixon et al. |
| 6,515,586 B1 | 2/2003 | Wymore |
| 6,519,568 B1 | 2/2003 | Harvey et al. |
| 6,532,077 B1 | 3/2003 | Arakawa |
| 6,538,577 B1 | 3/2003 | Ehrke et al. |
| 6,542,076 B1 | 4/2003 | Joao |
| 6,542,077 B2 | 4/2003 | Joao |
| 6,543,690 B2 | 4/2003 | Leydier et al. |
| 6,560,223 B1 | 5/2003 | Egan et al. |
| 6,574,234 B1 | 6/2003 | Myer et al. |
| 6,574,603 B1 | 6/2003 | Dickson et al. |
| 6,584,080 B1 | 6/2003 | Ganz et al. |
| 6,600,726 B1 | 7/2003 | Nevo et al. |
| 6,608,551 B1 | 8/2003 | Anderson et al. |
| 6,618,578 B1 | 9/2003 | Petite |
| 6,618,709 B1 | 9/2003 | Sneeringer |
| 6,628,764 B1 | 9/2003 | Petite |
| 6,628,965 B1 | 9/2003 | LaRosa et al. |
| 6,653,945 B2 | 11/2003 | Johnson et al. |
| 6,654,357 B1 | 11/2003 | Wiedeman |
| 6,657,552 B2 * | 12/2003 | Belski et al. ............ 340/870.02 |
| 6,665,278 B2 | 12/2003 | Grayson |

| | | |
|---|---|---|
| 6,671,586 B2 | 12/2003 | Davis et al. |
| 6,671,819 B1 | 12/2003 | Passman et al. |
| 6,674,403 B2 | 1/2004 | Gray et al. |
| 6,678,255 B1 | 1/2004 | Kuriyan |
| 6,678,285 B1 | 1/2004 | Garg |
| 6,691,173 B2 | 2/2004 | Morris et al. |
| 6,731,201 B1 | 5/2004 | Bailey et al. |
| 6,735,630 B1 | 5/2004 | Gelvin et al. |
| 6,747,557 B1 | 6/2004 | Petite et al. |
| 6,751,196 B1 | 6/2004 | Hulyalkar et al. |
| 6,771,981 B1 | 8/2004 | Zalewski et al. |
| 6,775,258 B1 | 8/2004 | van Valkenburg et al. |
| 6,804,532 B1 | 10/2004 | Moon et al. |
| 6,816,088 B1 | 11/2004 | Knoska et al. |
| 6,826,607 B1 | 11/2004 | Gelvin et al. |
| 6,832,251 B1 | 12/2004 | Gelvin et al. |
| 6,842,430 B1 | 1/2005 | Melnik |
| 6,858,876 B2 | 2/2005 | Gordon et al. |
| 6,859,831 B1 | 2/2005 | Gelvin et al. |
| 6,888,876 B1 | 5/2005 | Mason, Jr. et al. |
| 6,891,838 B1 | 5/2005 | Petite et al. |
| 6,900,737 B1 | 5/2005 | Ardalan et al. |
| 6,906,636 B1 | 6/2005 | Kraml |
| 6,914,533 B2 | 7/2005 | Petite |
| 6,914,893 B2 | 7/2005 | Petite |
| 6,922,558 B2 | 7/2005 | Delp et al. |
| 6,959,550 B2 | 11/2005 | Freeman et al. |
| 6,970,434 B1 | 11/2005 | Mahany et al. |
| 6,996,154 B2 * | 2/2006 | Haas ..................... 375/132 |
| 7,020,701 B1 | 3/2006 | Gelvin et al. |
| 7,027,416 B1 | 4/2006 | Kriz |
| 7,027,773 B1 | 4/2006 | McMillin |
| 7,053,767 B2 | 5/2006 | Petite et al. |
| 7,054,271 B2 | 5/2006 | Brownrigg et al. |
| 7,064,679 B2 | 6/2006 | Ehrke et al. |
| 7,103,511 B2 | 9/2006 | Petite |
| 7,117,239 B1 | 10/2006 | Hansen |
| 7,181,501 B2 | 2/2007 | Defosse |
| 7,254,372 B2 | 8/2007 | Janusz et al. |
| 7,304,587 B2 | 12/2007 | Boaz |
| 7,349,682 B1 | 3/2008 | Bennett, III et al. |
| 7,424,527 B2 | 9/2008 | Petite |
| 7,468,661 B2 | 12/2008 | Petite et al. |
| 7,480,501 B2 | 1/2009 | Petite |
| 7,484,008 B1 | 1/2009 | Gelvin et al. |
| 7,573,813 B2 | 8/2009 | Melnik |
| 7,653,394 B2 | 1/2010 | McMillin |
| 7,739,378 B2 | 6/2010 | Petite |
| 2001/0002210 A1 | 5/2001 | Petite |
| 2001/0003479 A1 | 6/2001 | Fujiwara |
| 2001/0021646 A1 | 9/2001 | Antonucci et al. |
| 2001/0024163 A1 | 9/2001 | Petite |
| 2001/0034223 A1 | 10/2001 | Rieser et al. |
| 2001/0038343 A1 | 11/2001 | Meyer et al. |
| 2002/0002444 A1 | 1/2002 | Williams et al. |
| 2002/0012323 A1 | 1/2002 | Petite et al. |
| 2002/0013679 A1 | 1/2002 | Petite |
| 2002/0016829 A1 | 2/2002 | Defosse |
| 2002/0019725 A1 | 2/2002 | Petite |
| 2002/0027504 A1 | 3/2002 | Davis et al. |
| 2002/0031101 A1 | 3/2002 | Petite et al. |
| 2002/0032746 A1 | 3/2002 | Lazaridis |
| 2002/0061031 A1 | 5/2002 | Sugar et al. |
| 2002/0072348 A1 | 6/2002 | Wheeler et al. |
| 2002/0089428 A1 | 7/2002 | Walden et al. |
| 2002/0095399 A1 | 7/2002 | Devine et al. |
| 2002/0098858 A1 | 7/2002 | Struhsaker |
| 2002/0109607 A1 | 8/2002 | Cumeralto et al. |
| 2002/0136233 A1 | 9/2002 | Chen et al. |
| 2002/0158774 A1 | 10/2002 | Johnson et al. |
| 2002/0163442 A1 | 11/2002 | Fischer |
| 2002/0169643 A1 | 11/2002 | Petite et al. |
| 2002/0193144 A1 | 12/2002 | Belski et al. |
| 2003/0001754 A1 | 1/2003 | Johnson et al. |
| 2003/0023146 A1 | 1/2003 | Shusterman |
| 2003/0028632 A1 | 2/2003 | Davis |
| 2003/0030926 A1 | 2/2003 | Aguren et al. |
| 2003/0034900 A1 | 2/2003 | Han |
| 2003/0035438 A1 | 2/2003 | Larsson |
| 2003/0036822 A1 | 2/2003 | Davis et al. |
| 2003/0046377 A1 | 3/2003 | Daum et al. |
| 2003/0058818 A1 | 3/2003 | Wilkes et al. |
| 2003/0069002 A1 | 4/2003 | Hunter et al. |
| 2003/0073406 A1 | 4/2003 | Benjamin et al. |
| 2003/0078029 A1 | 4/2003 | Petite |
| 2003/0093484 A1 | 5/2003 | Petite |
| 2003/0133473 A1 | 7/2003 | Manis et al. |
| 2003/0169710 A1 | 9/2003 | Fan et al. |
| 2003/0185204 A1 | 10/2003 | Murdock |
| 2003/0210638 A1 | 11/2003 | Yoo et al. |
| 2004/0047324 A1 | 3/2004 | Diener |
| 2004/0053639 A1 | 3/2004 | Petite et al. |
| 2004/0090950 A1 | 5/2004 | Lauber et al. |
| 2004/0113810 A1 | 6/2004 | Mason, Jr. et al. |
| 2004/0131125 A1 | 7/2004 | Sanderford, Jr. et al. |
| 2004/0133917 A1 | 7/2004 | Schilling |
| 2004/0183687 A1 | 9/2004 | Petite et al. |
| 2004/0228330 A1 | 11/2004 | Kubler et al. |
| 2005/0017068 A1 | 1/2005 | Zalewski et al. |
| 2005/0190055 A1 | 9/2005 | Petite |
| 2005/0195768 A1 | 9/2005 | Petite et al. |
| 2005/0195775 A1 | 9/2005 | Petite et al. |
| 2005/0201397 A1 | 9/2005 | Petite |
| 2005/0243867 A1 | 11/2005 | Petite |
| 2005/0270173 A1 | 12/2005 | Boaz |
| 2006/0095876 A1 | 5/2006 | Chandra |
| 2007/0112907 A1 | 5/2007 | Defosse |
| 2008/0186898 A1 | 8/2008 | Petite |
| 2009/0006617 A1 | 1/2009 | Petite |
| 2009/0068947 A1 | 3/2009 | Petite |
| 2009/0096605 A1 | 4/2009 | Petite |
| 2009/0215424 A1 | 8/2009 | Petite |
| 2009/0243840 A1 | 10/2009 | Petite et al. |
| 2010/0250054 A1 | 9/2010 | Petite |

FOREIGN PATENT DOCUMENTS

| | | |
|---|---|---|
| EP | 0663746 B1 | 7/1995 |
| EP | 0718954 A1 | 6/1996 |
| EP | 0740873 B1 | 11/1996 |
| EP | 0749259 A2 | 12/1996 |
| EP | 0749260 A2 | 12/1996 |
| EP | 0766489 A2 | 4/1997 |
| EP | 0768777 A2 | 4/1997 |
| EP | 0812502 B1 | 12/1997 |
| EP | 0825577 A1 | 2/1998 |
| EP | 0999717 A2 | 5/2000 |
| EP | 1096454 A2 | 5/2001 |
| FR | 2817110 A1 | 5/2002 |
| GB | 2229302 A | 9/1990 |
| GB | 2247761 A | 3/1992 |
| GB | 2262683 A | 6/1993 |
| GB | 2297663 A | 8/1996 |
| GB | 2310779 A | 9/1997 |
| GB | 2326002 A | 12/1998 |
| GB | 2336272 A | 10/1999 |
| GB | 2352004 A | 1/2001 |
| GB | 2352590 A | 1/2001 |
| JP | 60261288 A | 12/1985 |
| JP | 1255100 A | 10/1989 |
| JP | 11353573 A | 12/1999 |
| JP | 2000113590 A | 4/2000 |
| JP | 2001063425 A | 3/2001 |
| JP | 2001088401 A | 4/2001 |
| JP | 2001309069 A | 11/2001 |
| JP | 2001319284 A | 11/2001 |
| JP | 2001357483 A | 12/2001 |
| JP | 2002007672 A | 1/2002 |
| JP | 2002007826 A | 1/2002 |
| JP | 2002085354 A | 3/2002 |
| JP | 2002171354 A | 6/2002 |
| KR | 2001025431 A | 4/2001 |
| WO | WO 90/13197 | 11/1990 |
| WO | WO 95/12942 | 5/1995 |
| WO | WO 95/24177 | 9/1995 |
| WO | WO 95/34177 | 12/1995 |
| WO | WO 96/10307 | 4/1996 |
| WO | WO 98/00056 | 1/1998 |
| WO | WO 98/10393 | 3/1998 |

| WO | WO 98/37528 | 8/1998 |
| WO | WO 98/45717 | 10/1998 |
| WO | WO 99/13426 | 3/1999 |
| WO | WO 00/23956 | 4/2000 |
| WO | WO 00/36812 | 6/2000 |
| WO | WO 00/55825 | 9/2000 |
| WO | WO 01/15114 | 3/2001 |
| WO | WO 01/24109 | 4/2001 |
| WO | WO 02/08725 | 1/2002 |
| WO | WO 02/08866 | 1/2002 |
| WO | WO 02/052521 | 7/2002 |
| WO | WO 03/007264 | 1/2003 |
| WO | WO 03/021877 | 3/2003 |
| WO | WO 04/002014 | 12/2003 |

OTHER PUBLICATIONS

"Welcome to UtiliNet: A Wireless Data Communications Solution from Metricom, Inc.," Author: unknown, available at http://web.archive.org/web/199806028045812/www.metricom.com/industrial/utilinet.html on May 10, 2010, pp. 1-10.

"Westinghouse Numa Logic Interface," Author: unknown, Engineering Report, No. 91-013, Date: unknown, pp. 1-7.

"What's Behind Ricochet: A Network Overview," Author: unknown, available at http://web.archive.org/web/20000815090824/www.ricochet.com/ricochet_advantage/tech_overview.html, Aug. 15, 2000, pp. 1-4.

"Wireless Access List—Atlanta Hartsfield International Airport," http://www.ezgoal.com/hotsports/wireless/f.asp?fid=63643 (visited Jul. 29, 2003) (1 page).

"Wireless Access List—0 ATL Admirals Club," http://www.ezgoal.com/hotspots/wireless/f.asp?fid=60346 (visited Jul. 29, 2003) (1 page).

"Wireless Accessories, catalog pages," Home Automation, Inc (archived web page), 1997.

"ESTeem Model 96C," ESTeem Radios (describing a system that was for sale at least as early as 1994).

"Site Survey Report," ESTeem Radios, Sep. 24, 1993.

"Technical Bulletin—Johnson Controls," ESTeem Radios, Jan. 29, 1998.

Abbott et al., "Wireless Product Applications for Utilities," Electric Power Research Institute, Feb. 1996, pp. 1-137.

About AES Corporation, AES IntelliNet, Author: unknown, available at http://web.archive.org/web/19990127093116/www/aes-intellinet.com/ae, on Mar. 5, 2009, pp. 1-2.

ADEMCO Group, 7720NX Network Extender,ADEMCO Group, Author: unknown, 1998; pp. 1-2.

ADEMCO Group, 4110DL Security System, Installation Instructions, Oct. 1996, ADEMCO Group, Author: unknown, pp. 1-15.

ADEMCO Group, 4110XM Security System, Installation Instructions, Jul. 1996, ADEMCO Group, Author: unknown, pp. 1-20.

ADEMCO Group, 4120EC Security System, Installation Instructions, Nov. 1990, ADEMCO Group, Author: unknown, pp. 1-17.

ADEMCO Group, 4120XM Security System, Installation Instructions, Oct. 1993, ADEMCO Group, Author: Unknown, pp. 1-80.

ADEMCO Group, 4140XMPT2 Partitioned Security System with Scheduling User's Manual, May 1993, ADEMCO Group, Author: unknown; pp. 1-54.

ADEMCO Group, 4281, 5881, and 5882 Series RF Receivers Installation Instructions, Oct. 1996, ADEMCO Group, Author: unknown; pp. 1-6.

ADEMCO Group, 5330 Alpha Console, Installation Instructions, May 90, ADEMCO Group, Author: unknown, pp. 1-24.

ADEMCO Group, 5706 Smoke Detector with Built-In Wireless Transmitter, Installation Instructions, Dec. 1991, ADEMCO Group, Author: unknown, pp. 1-8.

ADEMCO Group, 5707 Smoke Detector with Built-in Wireless transmitter, Installation Instructions, Aug. 1992, ADEMCO Group, Author: unknown, pp. 1-12.

ADEMCO Group, 5715 Universal Transmitter, Installation Instructions, Mar. 1989, ADEMCO Group; Author: unknown; pp. 1-4.

ADEMCO Group, 5775 Passive Infrared Motion Detector/Transmitter, Installation Instructions, Jul. 1991, ADEMCO Group, Author: unknown; pp. 1-4.

ADEMCO Group, 5808C Photoelectronic Smoke Detector with Built-In Wireless Transmitter Installation Instructions, 1998, ADEMCO Group, Author: unknown; pp. 1-4.

ADEMCO Group, 5800TM Transmitter Module Installation Instructions, Apr. 1994, ADEMCO Group, Author: unknown; pp. 1.

ADEMCO Group, 5801 Remote Wireless Panic Transmitter Installation Instructions, Apr. 1994, ADEMCO Group, Author: unknown; pp. 2.

ADEMCO Group, 5802CP Belt Clip Transmitter Installation Instructions, Nov. 1994, ADEMCO Group, Author: unknown; pp. 1.

ADEMCO Group, 5802MN, Supervised Miniature Transmitter Installation Instructions, Jan. 1995, ADEMCO Group, Author: unknown; pp. 1.

ADEMCO Group, 5802MN2 Supervised Miniature Transmitter Installation Instructions, Jun. 1997, ADEMCO Group, Author: unknown; pp. 1.

ADEMCO Group, 5803 Wireless Key Transmitter Installation Instructions, Nov. 1994, ADEMCO Group, Author: unknown, pp. 2.

ADEMCO Group, 5804 Wireless Key Transmitter Installation Instructions, Jul. 1995, ADEMCO Group, Author: unknown, pp. 3.

ADEMCO Group, 5804BD Bi-Directional Key Transmitter Installation Instructions, Apr. 1997, ADEMCO Group, Author: unknown, pp. 4.

ADEMCO Group, 5806 Smoke Detector with Built-In Wireless Transmitter Installation Instructions, May 1998, ADEMCO Group, Author: unknown, pp. 1-4.

ADEMCO Group, 5807 Smoke Detector with Built-In Wireless Installation Instructions, May 1998, ADEMCO Group, Author: unknown, pp. 1-6.

ADEMCO Group, 5808 Photoelectronic Smoke/Heat Detector with Built-In Wireless Transmitter Installation Instructions, 1998, ADEMCO Group, Author: unknown, pp. 1-8.

ADEMCO Group, 5808 Wireless Smoke Detector, 1999, available at http://web.archive.org/web/20000118015507/www.ademco.com/ademco on Mar. 5, 2009 pp. 1-4.

ADEMCO Group, 5809 Rate-of Rise Heat Detector/Transmitter Installation Instructions, Nov. 1994, ADEMCO Group, Author: unknown; pp. 1-2.

ADEMCO Group, 5816 Door/Window Transmitter Installation Instructions, Nov. 1994, ADEMCO Group, Author: unknown; pp. 1-2.

ADEMCO Group, 5816TEMP Low Temperature Transmitter Installation Instructions, May 1998, ADEMCO Group, Author: unknown; pp. 1-2.

ADEMCO Group, 5818 Recessed Transmitter Installation Instructions, Jan. 1994, ADEMCO Group, Author: unknown; pp. 1-2.

ADEMCO Group, 5819 Shock Processor Transmitter Installation Instructions, May 1998, ADEMCO Group, Author: unknown; pp. 1-2.

ADEMCO Group, 5819WHS Wireless Shock Sensor and Processor, 1997, available at http://web.archive.org/web/19990428164624/www.ademco.com/ademco on Mar. 5, 2009, pp. 1.

ADEMCO Group, 5819WHS/5819BRS Shock Processor Transmitter Installation Instructions, May 1998, ADEMCO Group, Author: unknown; pp. 1-2.

ADEMCO Group, 5827 Remote Wireless Keypad/Transmitter Installation Instructions, Apr. 1994, ADEMCO Group, Author: unknown; pp. 1.

ADEMCO Group, 5827BD and 5827BDE Wireless Bi-Directional Keypads Installation Instructions and Operating Guide, Mar. 1996, ADEMCO Group, Author: unknown; pp. 1-6.

ADEMCO Group, 5849 Glass Break Detector/Transmitter Installation Instructions, Oct. 1997, ADEMCO Group, Author: unknown; pp. 1-4.

ADEMCO Group, 5850 Glass Break Detector/Transmitter Installation Instructions, May 1998, ADEMCO Group, Author: unknown; pp. 1-4.

ADEMCO Group, 5890 Passive Infrared Motion Detector/Transmitter Installation Instructions, May 1998, ADEMCO Group, Author: unknown; pp. 1-8.

ADEMCO Group, 5890 Wireless PIR Motion Detector, 1997, available at http://web.archive.org/web/19990429054256/www.ademco.com/asc on Mar. 5, 2009, pp. 1-3.

ADEMCO Group, 5890PI Passive Infrared Motion Detector/Transmitter Installation Instructions, Mar. 1998, ADEMCO Group, Author: unknown; pp. 1-4.
ADEMCO Group, 6128RF Keypad/Receiver—full wireless capability, 1997, ADEMCO Group, Author: unknown; pp. 1-2.
ADEMCO Group, 6128RF Keypad/Transceiver Installation Instructions, Jul. 1998, ADEMCO Group, Author: unknown; pp. 1-8.
ADEMCO Group, 6128RF Keypad/Transceiver, User Guide, May 1998, ADEMCO Group, Author: unknown; pp. 1.
ADEMCO Group, 6128WL Keypad/Receiver Installation Instructions, Oct. 1998, ADEMCO Group, Author: unknown; pp. 1-8.
ADEMCO Group, 6128WL Keypad/Receiver User Guide, Oct. 1998, ADEMCO Group, Author: unknown; pp. 1.
ADEMCO Group, 7715DF MicroFAST Installation Tool, User Manual, Feb. 1998, ADEMCO Group, Author: unknown; pp. 1-32.
ADEMCO Group, 7720 Subscriber Radio, Installation Instructions, Jan. 1992, ADEMCO Group, Author: unknown, available at http://www.guardianalarms.net, pp. 1-18.
ADEMCO Group, 7720NX Network Extender, 1997, ADEMCO Group, Author: unknown, available at http://web.archive.org/web/19990220035932/www.ademco.com/ademco on Mar. 5, 2009, pp. 1-3.
Elster's Initial Disclosure of Invalidity Contentions Pursuant to LPR 4.3; *IPCO, LLC* v. *Elster Electricity, LLC*, Northern District of Georgia Case No. 1:05-cv-1138 (183 pages).
Elster's First Supplement to its Initial Disclosure of Invalidity Contentions Pursuant to LPR 4.3; *IPCO, LLC* v. *Elster Electricity, LLC*, Northern District of Georgia Case No. 1:05-cv-1138 (154 pages).
Elster's Second Supplemental to its Initial Disclosure of Invalidity Contentions Pursuant to LPR 4.3; *IPCO, LLC* v. *Elster Electricity, LLC*, Northern District of Georgia Case No. 1:05-cv-1138 (111 pages).
Defendant's Joint Preliminary Invalidity Contentions filed by Defendants Crestron Electronics, Inc. and Wayne-Dalton Corporation in *SIPCO, LLC* v. *AMAZON.COM, Inc. et al.*, District Court for the Eastern District of Texas Case No. 2:08-cv-359 (180 pages).
Trilliant Network, Inc.'s Invalidity Contentions Pursuant to Patent Rule 3-3, *IP Co. LLC* v. *Oncor Electric Delivery Company LLC et al.*, District Court for the Eastern District of Texas Case No. 2:09-cv-37 (112 pages).
Sensus's Invalidity Contentions filed by Defendant Sensus USA Inc. in *SIPCO, LLC* v. *Sensus USA Inc.*, District Court for the Eastern District of Texas Case No. 2:09-cv-37 (21 pages).
Defendant EKA Systems, Inc.'s Invalidity Contentions, *IP Co. LLC* v. *Oncor Electric Delivery Company LLC et al.*, District Court for the Eastern District of Texas Case No. 2:09-cv-37 (110 pages).
EKA Systems, Inc.'s Invalidity Contentions Pursuant to Patent Rule 3-3, *IP Co. LLC* v. *Oncor Electric Delivery Company LLC et al.*, District Court for the Eastern District of Texas Case No. 2:09-cv-37 (110 pages).
Sensus's Invalidity Contentions filed by Defendant Sensus USA Inc. in *SIPCO, LLC* v. *Sensus USA Inc.*, District Court for the Eastern District of Texas Case No. 6:09-cv-532 (22 pages).
Defendant Datamatic, LTD's Invalidity Contentions to Plaintiff, *SIPCO, LLC* v. *Datamatic LTD, et al.*, District Court for the Eastern District of Texas Case No. 6:09-cv-532 (2 pages with 7 claim chart exhibits).
Johnson Controls, Inc.'s Invalidity Contentions and Disclosures Pursuant to P.R. 3-3 and 3-4, *SIPCO, LLC* v. *Datamatic LTD, et al.*, District Court for the Eastern District of Texas Case No. 6:09-cv-532 (59 pages).
Trilliant Networks, Inc.'s Invalidity Contentions to Plaintiff, *SIPCO, LLC* v. *Datamatic LTD, et al.*, District Court for the Eastern District of Texas Case No. 6:09-cv-532 (418 pages).
Defendant Datamatic, LTD's Invalidity Contentions to Plaintiff Pursuant to P.R. 3-3(a), *SIPCO, LLC* v. *Datamatic LTD, et al.*, District Court for the Eastern District of Texas Case No. 6:09-cv-532 (2 pages with 7 claim chart exhibits).
Johnson Controls, Inc.'s Supplement Letter to the Invalidity Contentions, *SIPCO, LLC* v. *Datamatic LTD, et al.*, District Court for the Eastern District of Texas Case No. 6:09-cv-532 (5 pages and 99 page Addendum).
Defendant's Invalidity Contentions Pursuant to P.R. 3-3 and 3-4 filed by Control4 Corporation et al., *SIPCO, LLC* v. *Control4Corporation*, Eastern District of Texas Case No. 6:10-cv-249 (85 pages).
Johnson Controls, Inc.'s Supplemental Invalidity Contentions and Disclosures Pursuant to P.R. 3-3 and 3-4, *SIPCO, LLC* v. *Datamatic LTD, et al.*, District Court for the Eastern District of Texas Case No. 6:09-cv-532 (89 pages).
Defendant Toro Company's Motion for Summary Judgment of Invalidity, *Sipco, LLC* v. *The Toro Company, JLH Labs, LLC and Jason Hill*, District Court for the Eastern District of Pensylvania Case No. 08-CV-00505-TJS.
"HAI Omni: Features & Specifications," Home Automation, Inc. (archived web page), 1997.
"Home Telemetry Gateway Specifications Sheet: Connector 2000 Series," Coactive 1998.
"How Does the New Power Company Deliver on the Promise of Energy Reconstructing?" NewPower (press release), Author: unknown, May 31, 2001, pp. 1-6.
"IEEE Standards Board: Project Authorization Request (PAR) Form;" http://grouper.ieee.org/groups/802/11/PARs/par80211bapp.html, Mar. 24, 1998.
"Important Dealer Notification—Honeywell AlarmNet-M Network Alert," Source: unknown, Author: unknown, Apr. 2007, pp. 1.
"inCode Telecom Transforming Payphones into Wi-Fi Hot Spots," Jan. 14, 2003, http://www.pocketpcmag.com/news/incode.asp (2 pages).
"Industrial Communications," Author: unknown, available at http://web.archive.org/we b/19990222162354/www.metricom.com/industrial/ on May 10, 2010, pp. 1-3.
"Information Technology—Telecommunications and Information Exchange Between Systems—Local and Metropolitan Area Networks—Specific Requirements—Part 11: Wireless LAN Medium Access Control (MAC) and Physical Layer (PHY) Specifications," Author: unknown, IEEE, Std. 802.11-1997, 1997, pp. 1-445.
"Integrated Communication Services" of Industrial Communications; pp. 1-3; available at web.archive.org/web/19990222162354/www.metricom.com/industrial.
"International Search Report and Written Opinion for International Application No. PCT/US2006/002342," Search Authority European Patent Office, mailed May 31, 2006.
"IOConnect Architecture™," Coactive, 2001, pp. 1-4.
"JC/83RF System: Cost-effective Multiple Facility Management by Radio Network," Johnson Controls, Date: unknown, pp. 1-6.
"JC/83RF System: Multiple Facility Management by Radio Network," Johnson Controls, Publication No. 2161, 1983, pp. 1-4.
"Keltron's Home Page with Frames, Index," available at http://web.archive.org/web/19990831161957/http://www.keltroncorp.com, on Mar. 24, 2009, pp. 1.
"Local and Metropolitan Area Networks: Wireless Medium Access Control (MAC) and Physical (PHY) Specifications, Annex A: Protocol Implementation Conformance Statement (PICS) Proforma," Author: unknown; IEEE, Nov. 1997, pp. 1-75.
"LonTalk Protocol, LonWorks™ Engineering Bulletin," Echelon Corp.; Author: unknown; Apr. 1993, pp. 1-27.
"LonWorks® Products, 1998, Version A," Echelon Corp.; Author: unknown; 1997, pp. 1-21.
"LonWorks® Router User's Guide," Echelon Corp., Author: unknown; 1995, pp. 1-136.
"LonWorks® SMX™ Transceiver," datasheet, Echelon Corp.; Author: unknown; 1997, pp. 1-18.
"M100 Series Motor Actuator," Author: unknown, Johnson Controls, Inc., Apr. 1993, pp. 1-20.
"M100C Series Actuator with Digital Control Signal Input and R81CAA-2 Interface Board," Installation Bulletin, Johnson Controls, 2000, pp. 1-12.
"Man-Portable Networked Sensor System (1997-)," Author: unknown, available at http://www.spawar.navy.mil/depts/d30/d37/d371/mpnss/mpnss.html on May 20, 2010, pp. 1-4.
"March of the Motes," Author: unknown, New Scientist, vol. 179, issue 2409, Aug. 23, 2003, pp. 1-8.
"Metasys Compatible Products," Author: unknown; Johnson Controls, Inc., 1997 (9 pages).

"Metasys Extended System Architecture, vol. II," Author: unknown, Publisher: unknown, Sep. 1999.
"Metasys N2 System Protocol Specification for Vendors," Author: unknown, Publisher: unknown, Jun. 1996.
"Modicon Interfacing," Author: unknown, Engineering Report, No. 90-022, Revised: Apr. 12, 1996, pp. 1-9.
"Moore Products—Hart Protocol Interfacing," Author: unknown, Engineering Report, No. 94-007, Revised: Mar. 1, 1996, pp. 1-3.
"MTC Teams with Coactive Networks to Deliver an Advanced Energy Communications and Management Solution," Coactive (press release), Author: unknown, Feb. 5, 2001, pp. 1-4.
"Net77 Central Station Manual Section 3," AES Intellinet, Dec. 1996.
"NewPower and Coactive Networks Announce Strategic Alliance to Deliver the Connected Home," Coactive (press release), Author: unknown, Mar. 14, 2001, pp. 1-4.
"NX-480 Wireless Motion Sensor, document No. 466-1479 Rev. D," Caddx Controls, May 1, 1998.
"Omni Automation System," Author: unknown, Home Automation, Inc., Date: unknown, pp. 1-266.
"Omni Installation Manual," Author: unknown; Home Automation, Inc., Oct. 1997, pp. 1-88.
"Omni Owner's Manual," Author: unknown; Home Automation, Inc., Date: unknown, pp. 1-136.
"Omron Interfacing," Author: unknown, Engineering Report, No. 95-003, Revised: Apr. 17, 1996, pp. 1-4.
"Opto-22 Protocol," Author: unknown, Engineering Report, No. 93-010, Revised: May 31, 1996, pp. 1-8.
"Part 15.1: Wireless Medium Access Control (MAC) and Physical Layer (PHY) Specifications for Wireless Personal Area Networks (WPANS)," www.ieee802.org/15/Bluetooth/802-15-1_Clause_05.pdf, Jun. 14, 2002.
"Phoenix Contact Interfacing, Author: unknown," Engineering Report, No. 94-001, Revised: Jun. 20, 1996, pp. 1-7.
"Phonelin / HPNA / HomePNA Networks," http://www.homenethelp.com/web/howto/HomeNet-HPNA.asp (visited Jul. 29, 2003) (3 pages).
"PLC Direct (Koyo) Interfacing, Author: unknown," Engineering Report, No. 96-001, Revised: Apr. 10, 1996, pp. 1-8.
"Power/Perfect Energy Management Systems," Author: unknown, Johnson Controls, 1983, pp. 1-4.
"Selected Vendor Telecommunications Products," available at http://eetd.lbl.gov/ea/ems/reports/39015a.pdf (describing public uses in 1995), pp. 1-83.
"Smart Home Technology Leader Intelli Selects Coactive Networks Internet Gateways," Coactive (press release), Author: unknown, Sep. 11, 2000, pp. 1-4.
"Special Poll Feature," Author: unknown, Engineering Report, No. 93-008, Sep. 1993, pp. 1-5.
"Square D Interfacing," Author: unknown, Engineering Report, No. 88-010, Revised: Apr. 18, 1996, pp. 1-9.
"Technology Review, Metricom's Ricochet Packet Radio Network," Ham Radio Online, 1996, Author: unknown, pp. 1-3.
"Texas Instruments Interface," Author: unknown, Engineering Report, No. 91-021, Revised: Nov. 1994, pp. 1-3.
"The New Power Company Announces Revolutionary Energy-Saving Program the Gives Consumers Remote Control of the Their Thermostats via the Internet," NewPower (press release), Author: unknown, Apr. 24, 2001.
"The SNVT Master List and Programmer's Guide," Echelon Corp., Author: unknown, Mar. 1996, pp. 1-23.
To Starbucks and beyond: 802.11 wireless Internet access takes off, CommunicationsSolutions.com, vol. 4, Issue 1, Q1 2003, pp. 8-9.
"Toshiba Interfacing," Author: unknown, Engineering Report, No. 91-011, Revised: Jun. 19, 1996, pp. 1-4.
"TranstexT® Advanced Energy Management System," Article, Author: unknown, Publisher: unknown, Date: unknown, pp. 1-2.
"TranstexT® Advanced Energy Management System," Brochure, Author: unknown, Integrated Communication Systems, Inc., 1990, pp. 1-8.
ADEMCO Group, 7720P Programming Tool, User Guide, Mar. 1992, ADEMCO Group, Author: unknown, available at http://www.guardianalarms.net; pp. 1-8.

ADEMCO Group, 7720Plus Subscriber Radio Installation Instructions, Oct. 1996, ADEMCO Group, Author: unknown, available at http://www.guardianalarms.net; pp. 1-30.
ADEMCO Group, 7720ULF Combination Fire Control and Long Range Radio Transmitter, 1997, ADEMCO Group, Author: unknown, available at http://web.archive.org/web/19990501210612/www.ademco.com/ademco on Mar. 5, 2009, pp. 1-3.
ADEMCO Group, 7720ULF Subscriber Radio, Installation Instructions, Mar. 1995, ADEMCO Group, Author: unknown, available at http://www.guardianalarms.net, pp. 1-20.
ADEMCO Group, 7720V2 Self-Contained Long Range Radio Transmitter, 1997, ADEMCO Group, Author: unknown, available at http://web.archive.org/web/19990501212349/www.ademco.com/ademco on Mar. 5, 2009 pp. 1-4.
ADEMCO Group, 7720V2 Subscriber Radio, Installation Instructions, Jun. 1996, ADEMCO Group, Author: unknown, available at http://www.guardianalarms.net, pp. 1-24.
ADEMCO Group, 7810iR Internet Receiver, Installation and Setup Guide, May 2002, ADEMCO Group, Author: unknown, available at http://www.guardianalarms.net, pp. 1-58.
ADEMCO Group, 7820 Appendicies, Mar. 1995, ADEMCO Group, Author: unknown, available at http://www.guardianalarms.net, pp. 1-2.
ADEMCO Group, 7820 Integrated Radio Transmitter, Installation Instructions, Aug. 1995, ADEMCO Group, Author: unknown, available at http://www.guardianalarms.net, pp. 1-52.
ADEMCO Group, 7825 Outdoor Antenna with Bracket, Installation Instructions, Feb. 1995, ADEMCO Group, Author: unknown, available at http://www.guardianalarms.net, pp. 1-2.
ADEMCO Group, 7830R SafetyNet Subscriber Radio, Installation Instructions, Jun. 1996, ADEMCO Group, Author: unknown, available at http://www.guardianalarms.net, pp. 1-32.
ADEMCO Group, 7830R Subscriber Transmitter, 1997, available at http://web.archive.org/web/19990501215427/www.ademco.com.ademco on Mar. 5, 2009, pp. 1-3.
ADEMCO Group, 7835C Cellular Control Channel Transceiver, Installation and Setup Guide, Sep. 1998, ADEMCO Group, Author: unknown, available at http://www.guardianalarms.net, pp. 1-32.
ADEMCO Group, 7835C Cellular SafetyNet Subscriber Radio Transceiver, 1997ADEMCO Group, Author: unknown, available at http://web.archive.org/web/19990801221202/www.ademco.com/on Mar. 5, 2009, pp. 1-3.
ADEMCO Group, 7845C Cellular Control Channel Transceiver, Installation and Setup Guide, Sep. 1990, ADEMCO Group, Author: unknown, available at http://www.guardianalarms.net, pp. 1-104.
ADEMCO Group, 7845CZ Seven Zone Cellular Control Channel Transceiver, Installation and Setup Guide, Sep. 2001, ADEMCO Group, Author: unknown, available at http://www.guardianalarms.net, pp. 1-64.
ADEMCO Group, 7845i Internet Communications Module, Installation and Setup Guide, Mar. 2002, ADEMCO Group, Author: unknown, available at http://www.guardianalarms.net, pp. 1-42.
ADEMCO Group, 7920SE 900MHz Fully Synthesized Transceiver, 1997, ADEMCO Group, Author: unknown, available at http://web.archive.org/web/19990501222639/www.ademco.com/ on Mar. 5, 2009, pp. 1-3.
ADEMCO Group, 7920SE Transceiver, Installation Instructions, Apr. 1995, ADEMCO Group, Author: unknown, available at http://www.guardianalarms.net, pp. 1-80.
ADEMCO Group, ADEMCO World Leader in Home Security Products, 1997, ADEMCO Group, Author: unknown, available at http://web.archive.org/web/19990428164624/www.ademco.com/ademco on Mar. 5, 2009, pp. 1-2.
ADEMCO Group, AlarmNet Introduces Control Channel Cellular for Commercial Fire/Burglary Applications, ADEMCO Group (press release), Aug. 31, 1999, available at http://web.archive.org/web/19990420234120/www.ademco.com/pr0831 on Mar. 31, 2009.
ADEMCO Group, AlarmNet, 1997, ADEMCO Group, Author: unknown, available at http://web.archive.org/web/199904240234130/www.ademco.com/ademco on Mar. 5, 2009, pp. 1-3.

ADEMCO Group, Alpha Vista No. 5130XT Security System, Installation Instructions, Mar. 1989, ADEMCO Group, Author: unknown, pp. 96.
ADEMCO Group, Compass Network Downloader, ADEMCO Group, Author: unknown, Date: unknown, available at http://www.guardianalarms.net pp. 1-109.
ADEMCO Group, Compass, 1997, ADEMCO Group, Author: unknown, available at http://web.archive.org/web/19990209094401/www.ademco.com/ademco on Mar. 5, 2009.
ADEMCO Group, Control/Communicator 5110XM User's Manual, Apr. 1996, Ademco Group, Author: unknown, pp. 1-30.
ADEMCO Group, Fire and Burglary System Model 5120XM User's Manual, Apr. 1996, Ademco Group, Author: unknown, pp. 1-40.
ADEMCO Group, Home Page, ADEMCO Group, Author: unknown, available at http://web.archive.org/web/19961023204954/http://ademco.com/ on Mar. 5, 2009, pp. 1.
ADEMCO Group, LYNX—Quick Install Security System, 1997, ADEMCO Group, Author: unknown, available at http://web.archive.org/web/19990116225005 pp. 1-3.
ADEMCO Group, Lynx Quick Start Guide, Oct. 1998, Ademco Group, Author: unknown, pp. 1-4.
ADEMCO Group, Lynx Security System Installation and Setup Guide, Oct. 1998, Ademco Group, Author: unknown, pp. 1-48.
ADEMCO Group, Lynx Security System Programming Form & Summary of Connections, Oct. 1998, Ademco Group, Author: unknown, pp. 1-16.
ADEMCO Group, Lynx Security System User Guide, Oct. 1998, Ademco Group, Author: unknown, pp. 1-40.
ADEMCO Group, Powerline Carrier Device Modules, 1997 ADEMCO Group, Author: unknown, available at http://web.archive.org/web/19990218035115/www.ademco.com/ademco on Mar. 5, 2009, pp. 1-2.
ADEMCO Group, Remote Keypads 6128, 6137, 6137R, 6138, 6139 & 6139R, Installation Guide, Aug. 1998, Ademco Group, Author: unknown, pp. 1-2.
ADEMCO Group, Security System Model 4110DL Programming Form, Oct. 1996, ADEMCO Group, Author: unknown, pp. 1-8.
ADEMCO Group, Security System Model 4110XM Programming Form, Jul. 1996, ADEMCO Group, Author: unknown, pp. 1-4.
ADEMCO Group, Security System Model 4120EC Programming Form, Sep. 1993, ADEMCO Group, Author: unknown, pp. 1-2.
ADEMCO Group, Security System Model 4120XM Programming Form, Sep. 1992, ADEMCO Group, Author: unknown, pp. 1-4.
ADEMCO Group, Security System Model 4130XM, 4140XM, 5130XM Programming Form, Date: unknown, ADEMCO Group, Author: unknown, pp. 1-4.
ADEMCO Group, Security System Model 4130XT/4140/5130XT Programming Form, Jul. 1989, ADEMCO Group, Author: unknown, pp. 1-2.
ADEMCO Group, Security System Model 4140XMP Programming Form, Jan. 1992, ADEMCO Group, Author: unknown, pp. 1-2.
ADEMCO Group, Security System Model 4140XMPT Programming Form, ADEMCO Group, Author: unknown, Date: unknown, pp. 1-2.
ADEMCO Group, Security System Model 4140XMPT2 Programming Form, Apr. 1996, ADEMCO Group, Author: unknown, pp. 1-4.
ADEMCO Group, Security System Model 5110XM Programming Form, Apr. 1996, ADEMCO Group, Author: unknown, pp. 1-4.
ADEMCO Group, Security System Model 5120XM Programming Form, Jun. 1996, ADEMCO Group, Author: unknown, pp. 1-4.
ADEMCO Group, Security System Model 5140XM Programming Form, Jun. 1993, ADEMCO Group, Author: unknown, pp. 1-4.
ADEMCO Group, Security System Model Vista-10 Programming Form, Sep. 1994, ADEMCO Group, Author: unknown, pp. 1-4.
ADEMCO Group, Security System Model Vista-10SE Programming Form, Apr. 1997, ADEMCO Group, Author: unknown, pp. 1-24.
ADEMCO Group, Security System Model Vista-128B Commercial Burglary Partitioned Security System with Scheduling, Quick Start Guide, Jun. 1998, ADEMCO Group, Author: unknown, pp. 1-39.
ADEMCO Group, Security System User's Manual, Sep. 1996, ADEMCO Group, Author: unknown, pp. 1-88.
ADEMCO Group, The Vista-100 Series, 1997, ADEMCO Group, Author: unknown, available at http://web.archive.org/web19970620010543/www.ademco.com/ademco on Mar. 5, 2009.
ADEMCO Group, The Vista-10SE, 1997, ADEMCO Group, Author: unknown, available at http://web.archive.org/web/19990502214402/www.ademco/com/ademco on Mar. 5, 2009, pp. 1-4.
ADEMCO Group, via16 Programming Form, Jul. 1993, ADEMCO Group, Author: unknown, pp. 1-2.
ADEMCO Group, via16 Security System, Installation Instructions, Jan. 1992, ADEMCO Group, Author: unknown, pp. 1-24.
ADEMCO Group, via-30+, Vista 10, 4111XM Security System User's Manual, Jul. 1994, ADEMCO Group, Author: unknown, pp. 1-44.
ADEMCO Group, via-30Pse Security System Programming Guide, Apr. 1997, ADEMCO Group, Author: unknown, pp. 1-24.
ADEMCO Group, via-30PSE, Vista-1SE Security System User's Manual, Jan. 1997, ADEMCO Group, Author: unknown, pp. 1-88.
ADEMCO Group, Vista 4120XM and 4140XMP Security System User's Manual, Jan. 1994, ADEMCO Group, Author: unknown, pp. 1-60.
ADEMCO Group, Vista 4130XT Security System Installation Instructions, Oct. 1998, ADEMCO Group, Author: unknown, pp. 1-84.
ADEMCO Group, Vista 4140XMPT2 Partitioned Security System with Scheduling Installation Instructions, May 1993, ADEMCO Group, Author: unknown, pp. 1-68.
ADEMCO Group, Vista AT 4140 Security System Installation Instructions, Sep. 1998, ADEMCO Group, Author: unknown, pp. 1-68.
ADEMCO Group, Vista Series 4120EC Security System User's Manual, Sep. 1992, ADEMCO Group, Author: unknown, pp. 1-28.
ADEMCO Group, Vista Series 4130XM, 5130XM, 4140XMP Security System User's Manual, Feb. 1992, ADEMCO Group, Author: unknown, pp. 1-32.
ADEMCO Group, Vista Series 4140XMPT/4140XMPT-UL Partitioned Security System User's Manual, Jun. 1993, ADEMCO Group, Author: unknown, pp. 1-32.
ADEMCO Group, Vista Series 4140XMP, Installation Instructions, Jan. 1992, ADEMCO Group, Author: unknown, pp. 1-52.
ADEMCO Group, Vista Series 5140XM User's Manual, Aug. 1992, ADEMCO Group, Author: unknown, pp. 1-28.
ADEMCO Group, Vista XM Series 4140XM, 5130XM, 4130XM, Installation Instructions, Jul. 1990, ADEMCO Group, Author: unknown, pp. 1-26.
ADEMCO Group, Vista XM Series, Installation Instructions, ADEMCO Group, Author: unknown, Oct. 1991, pp. 1-16.
ADEMCO Group, Vista-10 Security System, Installation Instructions, Sep. 1994, ADEMCO Group, Author: unknown, pp. 1-56.
ADEMCO Group, Vista-100 Commercial Fire & Burglary Alarm Partitioned Security System with Scheduling, Installation Instructions and Programming Guide, Jan. 1998, ADEMCO Group, Author: unknown, pp. 1-233.
ADEMCO Group, Vista-100 Commercial Fire & Burglary Alarm System User's Manual, Nov. 1995, ADEMCO Group, Author: unknown, pp. 1-66.
ADEMCO Group, Vista-100 Commercial Fire & Burglary Alarm System with Scheduling Quick Start, Apr. 1996, ADEMCO Group, Author: unknown, pp. 1-24.
ADEMCO Group, Vista-10SE Security System, Installation Instructions, May 1997, ADEMCO Group, Author: unknown, pp. 1-88.
ADEMCO Group, Vista-128B Commercial Burglary Partitioned Security System with Scheduling, Installation and Setup Guide, Jul. 1998, ADEMCO Group, Author: unknown, pp. 1-252.
ADEMCO Group, Vista-128FB Commercial Fire and Burglary Partioned Security System with Scheduling, Installation, and Setup Guide, Oct. 1998, ADEMCO Group, Author: unknown, pp. 1-220.
ADEMCO Group, Vista-128FB Commercial Fire and Burglary Partitioned Security System User Guide, Oct. 1998, ADEMCO Group, Author: unknown, pp. 1-80.
ADEMCO Group, Vista-20 2-Partitioned Security System, Installation Instructions, Nov. 1995, ADEMCO Group, Author: unknown, pp. 1-120.

ADEMCO Group, Vista-20 2-Partitioned Security System, Programming Form, Apr. 1996, ADEMCO Group, Author: unknown, pp. 1-8.
ADEMCO Group, Vista-20 Security System User's Manual, Apr. 1995, ADEMCO Group, Author: unknown, pp. 1-52.
ADEMCO Group, Vista-20HW 2-Partitioned Security System, Installation Instructions, Apr. 1996, ADEMCO Group, Author: unknown, pp. 1-100.
ADEMCO Group, Vista-20HW 2-Partitioned Security System, Programming Form, Apr. 1996, ADEMCO Group, Author: unknown, pp. 1-8.
ADEMCO Group, Vista-20HWse 2-Partitioned Security System, Installation Instructions, Aug. 1997, ADEMCO Group, Author: unknown, pp. 1-84.
ADEMCO Group, Vista-20HWse 2-Partitioned Security System, Programming Form, Aug. 1997, ADEMCO Group, Author: unknown, pp. 1-8.
ADEMCO Group, Vista-20SE 2-Partitioned Security System, Installation Instructions, Aug. 1997, ADEMCO Group, Author: unknown, pp. 1-100.
ADEMCO Group, Vista-20SE 2-Partitioned Security System, Programming Guide, Aug. 1997, ADEMCO Group, Author: unknown, pp. 1-8.
ADEMCO Group, Vista-20SE/Vista-20HWse Security System User's Manual, Jun. 1997, ADEMCO Group, Author: unknown; pp. 1-52.
ADEMCO Group, Vista-30Pse Security System, Installation Instructions, Apr. 1997, ADEMCO Group, Author: unknown; pp. 1-104.
ADEMCO Group, Vista-40 2-Partition Security System, Installation and Setup Guide, Jul. 1998, ADEMCO Group, Author: unknown; pp. 1-380.
ADEMCO Group, Vista-40 2-Partition Security System, Programming Guide, Jul. 1998, ADEMCO Group, Author: unknown; pp. 1-24.
ADEMCO Group, Vista-40 Programming Guide, Jun. 1997, ADEMCO Group, Author: unknown; available at www.guardianalarms.net pp. 1-20.
ADEMCO Group, Vista-40 Security System User's Guide, Jul. 1998, ADEMCO Group, Author: unknown; pp. 1-60.
ADEMCO Group, Vista-50, Vista 50UL Security System, Nov. 1994, ADEMCO Group, Author: unknown; pp. 1-66.
ADEMCO Group, Vista-50P, Vista-50PUL Partitioned Security System with Scheduling, Installation Instructions and Programming Guide, Oct. 1997, ADEMCO Group, Author: unknown; pp. 1-199.
ADEMCO Group, Vista-50P, Vista-50PUL Security System User's Manual, Jul. 1995, ADEMCO Group, Author: unknown; pp. 1-66.
ADEMCO Group, Vista-50P, Vista-50PUL, Partitioned Security System with Scheduling, Quick Start, Aug. 1995, ADEMCO Group, Author: unknown; pp. 1-28.
ADEMCO Group, Vista5140XM Commercial Fire and Burglary Alarm System Installation Instructions, Jun. 1993, ADEMCO Group, Author: unknown, pp. 1-74.
ADEMCO Group, Vista-AT Security System User's Manual, Sep. 1998, ADEMCO Group, Author: unknown; pp. 1-56.
ADEMCO Group, V-Link Downloading Software User's Guide, Jun. 1994, ADEMCO Group, Author: unknown; available at http://www.guardianalarms.net, pp. 1-126.
ADEMCO Group, V-Plex Security Technology, 1997, ADEMCO Group, Author: unknown, available at http://web.archive.org/web/19990421110527/www.ademco.com/ademco on Mar. 5, 2009, pp. 1-6.
ADEMCO Group, Wireless Transmitters/Receivers: 5700 Wireless Transmitters, 1997, ADEMCO Group, Author: unknown, available at http://web.archive.org/web/19990127120423/www.ademco.com/ademco on Mar. 5, 2009, pp. 1-2.
ADEMCO Group, Wireless Transmitters/Receivers: 5800 Wireless Transmitters, 1997, ADEMCO Group, Author: unknown, available at http://web.archive.org/web/19990218181254/www.ademco/com/ademco on Mar. 5, 2009, pp. 1-2.
ADEMCO Group, Wirelss User Interface Devices, 1997, ADEMCO Group, Author: unknown, available at http://web.archive.org/web/19990421190353/www.ademco.com/ademco on Mar. 5, 2009, pp. 1-4.

ADEMCO Group, Vista Series Partitioned Security Systems Model 4140XMPT Installation Instructions, Feb. 1992, ADEMCO Group, Author: unknown, pp. 1-60.
AES—7700 Central Station, Installation & Operation Manual, Document 40-0551 u, AES Corporation, Author: unknown, Nov. 2003, pp. 1-40.
AES—IntelliGuard 7470, AES IntelliNet, Author: unknown, Nov. 2003, pp. 1-15.
AES 7000 Smart Central Station InstaCentral Station Installation & Operation Manual, Document No. 40-551, AES IntelliNet, Author: unknown; Nov. 20, 1996, pp. 1-48.
AES 7067 IntelliTap-II Digital Dialer Interface: A Supplemental Alarm Supporting Device, AES IntelliNet, Author: unknown, Aug. 5, 2004, pp. 1-4.
AES 7099 Central Station Installation & Operation Manual, Document No. 40-0050, AES IntelliNet, Author: unknown; 1998, pp. 1-20.
AES 7450 RF Subscriber Unit Installation Manual, AES IntelliNet, Author: unknown, 1998, pp. 1-8.
AES 7750-F RF SMART Subscriber Unit Version 2, Including 7750-F-4×4 and 7750-F-8, Installation & Operation Manual, AES IntelliNet, Author: unknown, Apr. 2001 (Updated Nov. 2003), pp. 1-60.
AES 7750-F RF Smart Subscriber Unit Version 2, Installation & Operation Manual, AES IntelliNet, Author: unknown, Aug. 2000, pp. 1-30.
AES Central Alarm Monitoring, Author: unknown, available at http://web.archive.org/web/19990225163745/www.aes-intellinet.com/ae, on Mar. 5, 2009, pp. 1-3.
AES IntelliNet 7450 Addendum, AES Corporation, Author: unknown, Jul. 9, 2002, pp. 1-2.
AES IntelliNet Dealer's List by State, Author: unknown, available at http://web.archive.org/web/200102162324026/www.aes-intellinet.com/list on Mar. 5, 2009, pp. 1-13.
AES IntelliNet Model 7003 Central Station, Installation & Operation Manual, AES IntelliNet, Author: unknown, Jan. 9, 2001, available at http://www.guardianalarms.net, pp. 1-25.
AES IntelliNet Model 7050, 7750, Subscriber Unit, Version 1.62, Installation & Operation Manual, AES IntelliNet, Author: unknown, Dec. 1996, available at www.guardianalarms.net, pp. 1-110.
Nunavut et al., Web Based Remote Security System (WRSS) Model Development, IEEE, Apr. 7-9, 2000, pp. 379-382.
X10, "CK11A ActiveHome, Home Automation System, Owner's Manual," Oct. 23, 1997, pp. 1-56.
X10.com: The Supersite for Home Automation, "What's in the Kit," available at http://web.archive.org/web/19991111133453/www.com/products/x, on Mar. 2, 2009, pp. 1-2.
X10.com: The Supersite for Home Automation, "Wireless Remote Control System (RC5000)," available at http://web.archive.org/web/1999111453227/www.x10.com/products/x1 on Mar. 2, 2009, pp. 1.
X10: The Supersite for Home Automation, "Transceiver Module," available at http://web.archive.org/web/20000229141517/www.x10.com/products/x on Mar. 2, 2009, pp. 1.
Xecom Incorporated, "EX900S Smart Spread Spectrum Transceiver," Nov. 2003 (13 pages).
Yadav, "Border Security Using Wireless Integrated Network Sensors (WINS)"; ECE 7th SEM, UE6551.
Young, "USAP: A Unifying Dynamic Distributed Mulitchannel TDMA Slot Assignment Protocol," Rockwell International Communication Systems Division, IEEE (1996).
Yu, "Target Identification Processor for Wireless Sensor Network," Dissertation, Los Angeles: University of California, 1999, pp. 1-110.
Zander et al., "The SOFTNET Project: A Retrospect," 1988 IEEE, pp. 343-345.
Zich et al., "Distribution, Networks, and Networking: Options for Dissemination", Workshop on Electronic Texts Session III, http://palimpsets.stanford.edu/byorg/lc/etextw/sess3.html, pp. 1-10, Accessed Jul. 17, 2007.
Zimmermann et al., "Daten Funken, Modacom-Telekom-Datenfunkdienst;" Bates SENSUS15305-15309, Publisher: unknown; Date: unknown, pp. 1-6.
Kahn et al., Advances in Packet Radio Technology, Proceedings of the IEEE, vol. 66, No. 11, pp. 1468-1496 (Nov. 1978).

Agre et al., "Development Platform for Self-Organizing Wireless Sensor Networks," Rockwell Science Center and UCLA, Date:Apr. 1999, pp. 257-268.

Kahn, "The Organization of Computer Resources into a Packet Radio Network," IEEE, Jan. 1977, vol. Com-25 No. 1, pp. 169-178.

Rosen, "Exterior Gateway Protocol (EGP)," Bolt Beranek and Newman Inc., Oct. 1982, pp. 1-48.

ADEMCO Group, Control/Communicator 5110XM Installation Instructions, Apr. 1996, Ademco Group, Author: unknown, pp. 1-76.

ADEMCO Group, Vista-128FB Commercial Fire and Burglary Partitioned Security System Quick Start Guide, Oct. 1998, ADEMCO Group, Author: unknown, pp. 1-68.

Brain, "How Motes Work: A Typical Mote," available at http://computer.howstuffworks.com/mote4.htm, on Feb. 25, 2010, pp. 1-2.

Cook et al., Water Distribution and Control by Wireless Networking, Electronic Systems Technology; Date: unknown, pp. 1-3.

U.S. Appl. No. 12/477,329 Non-Final Office Action dated Aug. 19, 2010.

U.S. Appl. No. 12/477,329 Non-Final Office Action dated Dec. 28, 2009.

U.S. Appl. No. 12/356,358 Final Office Action dated Sep. 15, 2010.

U.S. Appl. No. 12/356,358 Non-Final Office Action dated Jan. 21, 2010.

U.S. Appl. No. 10/792,608 Non-Final Office Action dated Jan. 22, 2010.

U.S. Appl. No. 10/792,608 Final Office Action dated Sep. 2, 2009.

U.S. Appl. No. 10/792,608 Non-Final Office Action dated Feb. 3, 2009.

U.S. Appl. No. 10/792,608 Final Office Action dated Aug. 19, 2008.

U.S. Appl. No. 12/792,608 Restriction Requirement dated Dec. 21, 2007.

U.S. Appl. No. 10/792,608 Non-Final Office Action dated Mar. 21, 2007.

U.S. Appl. No. 12/816,266 Non-Final Office Action dated Oct. 12, 2010.

U.S. Appl. No. 11/814,632 Final Office Action dated Dec. 7, 2010.

U.S. Appl. No. 11/814,632 Non-Final Office Action dated Jul. 13, 2010.

U.S. Appl. No. 11/125,009 Non-Final Office Action dated Dec. 9, 2010.

U.S. Appl. No. 11/125,009 Non-Final Office Action dated Mar. 1, 2010.

U.S. Appl. No. 11/125,009 Non-Final Office Action dated Apr. 6, 2009.

U.S. Appl. No. 11/125,009 Non-Final Office Action dated Oct. 1, 2008.

U.S. Appl. No. 11/125,009 Notice of Allowance dated Sep. 21, 2009.

U.S. Appl. No. 12/169,536 Non-Final Office Action dated Oct. 20, 2010.

U.S. Appl. No. 12/689,220 Non-Final Office Action dated Dec. 15, 2010.

U.S. Appl. No. 11/300,902 Non-Final Office Action dated Aug. 6, 2010.

U.S. Appl. No. 11/300,902 Non-Final Office Action dated Nov. 17, 2009.

U.S. Appl. No. 11/300,902 Non-Final Office Action dated Oct. 7, 2008.

U.S. Appl. No. 11/300,902 Final Office Action dated Jun. 4, 2008.

U.S. Appl. No. 11/300,902 Non-Final Office Action dated Oct. 11, 2007.

U.S. Appl. No. 11/300,902 Advisory Action dated Aug. 11, 2008.

U.S. Appl. No. 12/482,892 Non-Final Office Action dated Dec. 13, 2010.

Defendant SmartSynch, Inc.'s Invalidity Contentions Pursuant to P.R. 3-3 and 3-4, *Sipco, LLC, v. Energate Inc., Ecobee Inc., Rainforest Automation, Inc., SmartSynch, Inc., Amx Corporation, Simplehomenet, Inc., and Centralite Systems, Inc.*, District Court for the Eastern District of Texas, Case No. 6:10-cv-00533-LED.

Defendant ADT Security Services, Inc.'s Response to Plaintiff Sipco, LLC's first Interrogatories (Nos. 1-18), *Sipco, LLC, v. ADT Security Services, Inc.*, District Court for the Southern District of Florida, Case No. 11-80521-CIV-Middlebrooks/Johnson.

Defendant Control4 Corporation's Invalidity Contentions Pursuant to P.R. 4-3, *SIPCO LLC v. Control4 Corporation, et al.*, Northern District of Georgia Case No. 1:11-cv-612.

Reexamination Control No. 90-008011 Request for Ex Parte Reexamination of 6,044,062.

Reexamination Control No. 90-008011 Grant of Reexamination Request.

Reexamination Control No. 90-008011 Non-Final Office Action dated Nov. 19, 2007.

Reexamination Control No. 90-008011 Final Office Action dated Aug. 13, 2008.

Reexamination Control No. 90-010301 Request for Ex Parte Reexamination of 6,891,838.

Reexamination Control No. 90-010315 Request for Ex Parte Reexamination of 7,103,511.

Reexamination Control No. 90-010301 Grant of Reexamination Request.

Reexamination Control No. 90-010315 Denial of Reexamination Request.

Reexamination Control No. 90-010315 Petition to Review Denial of Request for Reexamination.

Reexamination Control No. 90-010507 Request for Ex Parte Reexamination of 7,103,511.

Reexamination Control No. 90-010509 Request for Ex Parte Reexamination of 7,103,511.

Reexamination Control No. 90-010510 Request for Ex Parte Reexamination of 6,891,838.

Reexamination Control No. 90-010505 Substitute Request for Ex Parte Reexamination of 7,103,511.

Reexamination Control No. 90-010507 Substitute Request for Ex Parte Reexamination of 7,103,511.

Reexamination Control No. 90-010508 Substitute Request for Ex Parte Reexamination of 7,103,511.

Reexamination Control No. 90-010509 Substitute Request for Ex Parte Reexamination of 7,103,511.

Reexamination Control No. 90-010510 Substitute Request for Ex Parte Reexamination of 6,891,838.

Reexamination Control No. 90-010511 Substitute Request for Ex Parte Reexamination of 6,891,838.

Reexamination Control No. 90-010512 Substitute Request for Ex Parte Reexamination of 6,891,838.

Reexamination Control No. 90-010505 Grant of Reexamination Request.

Reexamination Control No. 90-010507 Grant of Reexamination Request.

Reexamination Control No. 90-010508 Grant of Reexamination Request.

Reexamination Control No. 90-010509 Grant of Reexamination Request.

Reexamination Control No. 90-010510 Grant of Reexamination Request.

Reexamination Control No. 90-010511 Grant of Reexamination Request.

Reexamination Control No. 90-010512 Grant of Reexamination Request.

Reexamination Control No. 90-010301 Non-Final Office Action dated Dec. 2, 2009.

Reexamination Control No. 90-010315 Denial of Petition to Review Denial of Request for Reexamination.

Reexamination Control No. 90-010505 Non-Final Office Action dated Mar. 3, 2010.

Reexamination Control No. 90-010507 Non-Final Office Action dated Mar. 3, 2010.

Reexamination Control No. 90-010508 Non-Final Office Action dated Mar. 3, 2010.

Reexamination Control No. 90-010509 Non-Final Office Action dated Mar. 3, 2010.

Reexamination Control No. 90-008011 Examiner Answer to Appeal Brief.

Reexamination Control No. 90-010505 Final Office Action dated Aug. 2, 2010.

Reexamination Control No. 90-010507 Final Office Action dated Aug. 2, 2010.

Reexamination Control No. 90-010508 Final Office Action dated Aug. 2, 2010.
Reexamination Control No. 90-010509 Final Office Action dated Aug. 2, 2010.
Reexamination Control No. 90-010510 Final Office Action dated Aug. 20, 2010.
Reexamination Control No. 90-010511 Final Office Action dated Aug. 20, 2010.
Reexamination Control No. 90-010512 Final Office Action dated Aug. 20, 2010.
Reexamination Control No. 90-010301 Final Office Action dated Nov. 5, 2010.
Reexamination Control No. 90-010510 Final Office Action dated Nov. 5, 2010.
Reexamination Control No. 90-010511 Final Office Action dated Nov. 5, 2010.
Reexamination Control No. 90-010512 Final Office Action dated Nov. 5, 2010.
Reexamination Control No. 90-008011 BPAI Decision.
Reexamination Control No. 90-010510 Non-Final Office Action dated Dec. 2, 2009.
Reexamination Control No. 90-010511 Non-Final Office Action dated Dec. 2, 2009.
Reexamination Control No. 90-010512 Non-Final Office Action dated Dec. 2, 2009.
Reexamination Control No. 90-010301 Notice of Intent to Issue Reexam Certificate dated Dec. 13, 2010.
"1997 Project Summary, Held Untethered Nodes, University of California at Los Angeles," available at http://web.archive.org/web/199812052324758/http://www.darpa.mil/leaving.asp?url=http://www.janet.ucla.edu/glomo, Jul. 25, 2008, pp. 1-5.
"1997 Project Summary, Mobile Versatile Radios (MoVeR), University of California at Los Angeles," available at http://web.archive.org/web/19990222140122/http://www.darpa.mil/leaving.asp?url=http://www.janet.ucla.edu/, Jul. 25, 2008, pp. 1-4.
"1997 Project Summary, Towards a Wireless Overlay Internetworking Architecture, University of California at Berkeley," available at http://web.archive.org/web/19990202065939/http://www.darpa.mil/leaving.asp?url=http://daedalus.cs.berkeley.edu, Jul. 25, 2008, pp. 1-8.
"3Com Invests in Coactive Networks," Coactive (press release), Author: unknown, Dec. 14, 1999, pp. 1-4.
"5808 Photoelectric Smoke/Heat Detector with Built0in Wireless Transmitter Installation Instructions," Ademco, 1998.
"ABB Kent-Taylor Interfacing," Author: unknown, Engineering Report, No. 93-011, Jun. 18, 1996, pp. 1-9.
"AES Central Station Installation & Operation Manual, Document No. 40-0551e," AES Intellinet, Nov. 1996.
"AlarmNet-C Service Shutdown," Honeywell, Inc., Author: unknown, Date: unknown, pp. 1.
"Allen-Bradley Interfacing," Author: unknown, Engineering Report, No. 90-023, Jul. 21, 1999, pp. 1-11.
AN/TSQ-129 Position Location Reporting System (PLRS), Author: unknown, available at http://www.fas.org/man/dod-101/sys/land/plrs.htm on Feb. 22, 2010, pp. 1-3.
"AWAIRS Adaptive Wireless Arrays Interactive Recconaissance, Surveillance, and Target Acquisition in Small Unit Operations".
"Barrington Interface," Author: unknown, Engineering Report, No. 90-013, Revised: Oct. 1994, pp. 1.
Bell Canada launches public wireless Internet hotspot pilot, Dec. 10, 2002, http://www.bell.ca/3n/about/press/release/2002/pr_20021210.asp (3 pages).
"Bristol Babcock Interfacing," Author: unknown, Engineering Report, No. 95-001, Revised: Apr. 17, 1996, pp. 1-4.
"Caddx Installation Instructions Package, document No. 466-1486," Caddx Controls, Aug. 1998.
"Caddx Installation Instructions Package, document No. 466-1786," CADDX Installation Controls, Inc., Caddx Controls; Author: unknown; Aug. 1998, pp. 1-58.
"Caddx Installation Instructions Package," document No. 466-1786, CADDX Installation Controls, Inc., Caddx Controls; Author: unknown; Jul. 15, 1999, pp. 1-116.

"CADDX NetworX NX-8 Control/Communicator Installation Manual," Caddx Controls, 1996.
"Case Study: Genentech Uses Coactive's Technology to Centralize Monitor and Control Functions in a Mixed Legacy and New Equipment Environment," Coactive, Author: unknown, 1998, pp. 1-4.
"Case Study: Ingham Regional Medical Center Uses Coactive Technology to Monitor and Control Critical Power Generations in a Multi-Campus Environment," Coactive, 1998, pp. 1-4.
"Central Station Manual Section 1 System Overview, document No. 40-0551," AES Intellinet, Dec. 1996.
"Circon Systems Partners with Coactive Networks to Deliver Circon WebControl™," Coactive (press release), Author: unknown; Feb. 7, 2000, pp. 1-4.
"CIRCON Technology Connects Building Management Systems to Internet Using Coactive Routers," Coactive (press release), May 20, 1997.
"CISCO's John Chambers Discusses the Internet Consumer Revolution at CES Using Demo Based on Echelon's LonWorks Technology," Home Toys (press release), Jan. 8, 1999.
Coactive Bridges Gap between Control Systems and Corporate Data Networks with New Off-the-Shelf Router Family, Coactive (press release), Jun. 8, 1998.
"Coactive Enhances Residential Gateway to Enable Multiple Home Networks," Coactive (press release), Author: unknown; Jan. 6, 2000, pp. 1-4.
"Coactive Joins 3Com to Demonstrate Convergence of Control and Enterprise Networks at Retail Systems '98," Coactive (press release), Author: unknown, Jun. 16, 1998, pp. 1-4.
"Coactive Launches First Architecture to Support the Convergence Between Contol and IP Networks," Coactive (press release), Author: unknown, May 20, 1998, pp. 1-4.
"Coactive Leads Standardization Effort for Lon/Talk Routers," Coactive (press release), Author: unknown, May 20, 1997. pp. 3.
"Coactive Networks and Diverse Networks Team to Deliver End-to-End Infrastructure for Enabling the Digital Home," Coactive (press release), Author: unknown, Aug. 28, 2000, pp. 1-4.
"Coactive Networks and Innovex Technologies Deliver Internet Access to Home Security, Lighting and Climate Control," Coactive (press release), Author: unknown, Feb. 29, 2000, pp. 1-4.
"Coactive Networks and Silicon Energy Partner to Deliever an End-to-End Solution for Internet-Based Energy Monitoring and Analysis," Coactive (press release), Author: unknown, Sep. 19, 2000, pp. 1-4.
"Coactive Networks and Vicinium Systems team to Deliver a Complete Television-Based Interface to Digital Homes and Neighborhoods," Coactive (press release), Author: unknown, Jun. 19, 2000, pp. 1-4.
"Coactive Networks Announces First Shipments of Internet Gateway to Home Control Systems," Coactive (press release), Author: unknown, May 3, 1999, pp. 1-4.
"Coactive Networks Announces Formation of Technical Advisory Board," Coactive (press release), Author: unknown, Oct. 5, 1998, pp. 1-4.
"Coactive Networks Announces System Provider Partner Program," Coactive (press release), Author: unknown, Jan. 25, 1999, pp. 1-4.
"Coactive Networks Expands Support for Management and HMI Applications," Coactive (press release), Author: unknown, Nov. 2, 1998, pp. 1-4.
"Coactive Networks Names Gus Ezcurra Vice President of Sales," Coactive (press release), Author: unknown, Jul. 20, 1998, pp. 2.
"Coactive Networks Names Janice Roberts, 3Com Senior VP, to Board of Directors," Coactive (press release), Author: unknown, Jun. 2, 1998, pp. 2.
"Coactive Networks Powers Innovative Energy Management Solution," Coactive (press release), Author: unknown, Jan. 5, 2001, pp. 1-4.
"Coactive Networks President Named to LonMark Board of Directors," Coactive (press release), Jun. 14, 1998.
"Coactive Networks Shatters Price Barriers with New IP Gateway to Home Control Systems," Coactive (press release), Author: unknown, Oct. 26, 1998, pp. 1-4.

"Coactive Networks to Supply Internet-Based Home Gateways for up to 400,000 customers; First Phase of Deliveries Valued at US$2 Million," Coactive (press release), Author: unknown, Oct. 25, 1999.

"Coactive Networks Unveils the First Full-Service Residential Gateway," Coactive (press release), Author: unknown, May 3, 2000, pp. 1-4.

"Coactive Receives $2 Million in Funding," Coactive (press release), Oct. 15, 1997.

"Coactive Receives First Round of Venture Funding Investors Embrace Control Network Connectivity Technology," Coactive (press release), Author: unknown, Dec. 1, 1997, pp. 2.

"DSC-3500 Meeting the Control and Conservation Challenge," Johnson Controls, 1984, pp. 1-6.

"DTE Energy Technologies Selects Coactive Networks Internet Gateways to Roll Out New Class of E-Services to Businesses," Coactive (press release), Author: unknown, May 3, 2000, pp. 1-4.

"DTE Energy Technologies Selects Coactive Networks to Power Distributed Generation Solutions Worldwide," Coactive (press release), Author: unknown, Aug. 1, 2001, pp. 1-4.

"Echelon Corporation Demonstrates Internet Connectivity in Digital Home Applications at 1999 International Consumer Electronics Show," Home Toys (press release) , Dec. 15, 1998.

"Eight Leading Controls Companies Join Coactive Partner Program," Coactive (press release), Author: unknown, Aug. 21, 2000, pp. 1-4.

"Enhanced Position Location Reporting System (EPLRS)," Author: unknown, available at http://www.globalsecurity.org/military/systems/ground/eplrs.htm on Feb. 22, 2010, pp. 1-3.

"ESTeem Engineering Report, Johnson Controls Interface No. 91-102," Author: unknown, Publisher: unknown, Nov. 1994, pp. 1-14.

"ESTeem Model 96F," Author: unknown, ESTeem Radios; Sep. 6, 1996, pp. 1-2.

"Foxboro Interfacing," Author: unknown, Engineering Report, No. 91-023, Revised: Jun. 19, 1996, pp. 1-5.

"GE Fanuc Interfacing," Author: unknown, Engineering Report, No. 91-010, Revised: Apr. 11, 1996, pp. 1-8.

"General PLC/RTU Interfacing," Author: unknown, Engineering Report, No. 92-010, Revised: Jun. 18, 1996, pp. 1-5.

AES IntelliNet Model 7050-E & 7750-E, RF Subscriber Unit, Version 1.71, Installation & Operation Manual, AES IntelliNet, Author: unknown, Feb. 24, 1997, available at www.guardianalarms.net, pp. 1-54.

AES IntelliNet Model 7050-E Radio Subscriber Unit Installation Manual, AES IntelliNet, Author: unknown, Jul. 17, 2000, available at www.guardianalarms.net, pp. 1-4.

AES IntelliNet Model 7440 & 7440-XL RF Subscriber Unit, Addendum, AES IntelliNet, Author: unknown, Aug. 29, 2002.

AES IntelliNet Net 77 Version 1.48.30, Installation & Operation Manual, Document 40-0551u, AES Corporation, Author: unknown, Jun. 1999, pp. 1-30.

AES IntelliNet Net 77 Version 1.48.4, Installation & Operation Manual, Document 40-0551u, AES Corporation, Author: unknown, Nov. 2000, pp. 1-36.

AES IntelliNet Net 7K Version 1.48.4, Installation & Operation Manual, Document 40-0551, AES Corporation, Nov. 2000, pp. 1-36.

AES IntelliNet Net7K Version 3, Installation & Operation Manual, Document 40-0551, AES Corporation, Jun. 1999, pp. 1-30.

AES IntelliNet Radio Communication Subscriber Unit 7050, Sep. 16, 1997, available at http://web.archive.org/web/19990203061203/www.aes-intellinet.com/sp on Mar. 5, 2009, pp. 1-2.

AES IntelliNet Theory of Operation, AES IntelliNet; Author: unknown, Dec. 1996, downloaded from http://www.guardianalarms.net, pp. 1-18.

AES IntelliNet Wireless Network Glossary of Terms, document 40-0551u, AES IntelliNet, Author: unknown, Dec. 96, pp. 1-15.

AES IntelliNotes Universal Serial data Interface/USDI, Bulletin No. 55, AES Corporation, Author: unknown, Apr. 5, 2001, pp. 1-12.

AES IntelliTAP Model 7068, Version 1.08, Installation Guide, AES IntelliNet, Author: unknown, Jun. 15, 2000, pp. 1-11.

AES IntelliTRAK 7555-RT GPS Based Vehicle Tracking Unit, Version 2.0a, AES IntelliNet, Author: unknown, Feb. 20, 2001, pp. 1-16.

AES IntelliTRAK 7555-RT GPS Based Vehicle Tracking Unit, Version 2.12, AES IntelliNet, Author: unknown, Nov. 6, 2002, pp. 1-16.

AES Net7000, Installation & Operation Manual, AES Intellinet, Author: unknown, Nov. 24, 1996, pp. 1-76.

AES Net77 Wireless Network Management Software Installation & Operation ManuCentral Station Manual, Section 3, AES IntelliNet, Author: unknown, Dec. 1996, pp. 1-87.

AES UL/ULC System Configuration, AES Corporation, Author: unknown, May 1, 2003, pp. 1.

Agre et al., "Autoconfigurable Distributed Control Systems," ISADS, Apr. 27, 1995.

Agre et al., "Development Platform for Self-Organizing Wireless Sensor Networks," Rockwell Science Center and UCLA, Date:unknown, pp. 1-25.

Agre et al., "Technical and Management Proposal for Adaptive Wireless Arrays for Interactive Reconnaissance, Surveillance and Target Acquisition in Small Unit Operations (AWAIRS)," Defense Advanced Research Projects Agency Broad Agency Announcement 96-26, UCLA, Date: unknown, pp. 1-50.

Airpath Wireless, Inc., "Hot Spot Hardware," Copyright 2003, http://www.airpath.com/programs/hardward/hardware.htm (vistited Jul. 29, 2003) (2 pages).

AlarmLink, Inc. A Brief History available at http://www.alarmlink.com/Default.aspx?tabid=28, on Mar. 23, 2009, pp. 1.

AlarmLink, Inc. Alarm Over IP Products, available at http://www.alarmlink.com/Default.aspx?tabid=38 on Mar. 24, 2009, pp. 1.

AlarmLink, Inc. Central Stations, availabe at http://www.alarmlink.com/Default.aspx?tabid=35, on Mar. 24, 2009.

AlarmLink, Inc. Home Page, avaliable at http://www.alarmlink.com/ on Mar. 24, 2009, pp. 1.

AlarmLink, Inc., "MeshWorks of Los Angeles," available at http://www.alarmlink.com/Default.aspx?tabid=39 on Mar. 24, 2009, pp. 1.

Alwan et al., "Adaptive Mobile Multimedia Networks," IEEE Personal Communications, Apr. 1996, pp. 34-51.

Amir et al., "An Evaluation of the Metricom Ricochet Wireless Network," CS 294-7 Class Project, Department of Electrical Engineering and Computer Science of the University of California at Berkeley, Publisher: unknown, May 7, 1996, pp. 1-20.

Amir, "The Ricochet System Architecture," available at http://www.lariat.org/Berkeley/node2.html, on May 1996, pp. 1-5.

Asada et al., "Low Power Wireless Communication and Signal Processing Circuits for Distributed Microsensors;" Proceedings of the International Circuits and Systems Symposium, ISCAS '97; UCLA, Rockwell Science Center; Jun. 1997, pp. 1-5.

Asada et al., "Wireless Integrated Network Sensors: Low Power Systems on a Chip," UCLA, Rockwell Science Center; Date: unknown, pp. 1-24.

Asada et al., "Wireless Integrated Sensors Networks: Low Power Systems on a Chip," Publisher: unknown, Date: unknown, pp. 1-8.

Asada, "Wireless Integrated Network Sensors (WINS)," UCLA, SPIE vol. 3673, Mar. 1999, pp. 11-18.

Baba et al., "Wireless Medium Access Control Protocol for CAN," 4th Int'l CAN Conf., Berlin, Germany, available at http://www.can-cia.org/fileadmin/cia/files/icc/4/baba1.pdf (1997).

Bagby, "Calypso Ventures Inc.—WLAN background," 2 pages.

Baker et al. "The Architectual Organization of a Mobile Radio Network via a Distributed Algorithm," IEEE, Nov. 1981.

Ball et al., "Reliability of Packet Switching Broadcast Radio Networks," IEEE Transactions on Circuits and Systems, vol. CAS-23, No. 12, Dec. 1976, pp. 806-813.

Bapna, et al., "Antenna Pointing for High Bandwidth Communications from Mobile Robots," Paper, Field Robotics Center, The Robotics Institute, Carnegie Mellon University, date: unknown, pp. 1-6.

Beech et al., "AX.25 Link Access Protocol for Amateur Packet Radio, Version 2.2," American Relay & Tucson Amateur Packet Radio Corporation, Jul. 1993, Revised Jul. 1998, pp. 1-143.

Bergstein, "US telco plans WiFi payphone," May 12, 2003, http://www.news.com.au/common/story_page/0,4057,6420676%5E15306,00.html (2 pages).

BGE, 5743 Wireless Dual Switch™ Glass Break Detector, Installation and Operating Instructions, BGE, Author: unknown; Date: unknown, pp. 1-2.

BGE, 5742 Wirelss Audio Switch™ Glass Break Detector, Installation and Operating Instructions, BGE, Author: unknown, Date: unknown, pp. 1-10.

Bhatnagar et al., "Layer Net: A New Self-Organizing Network Protocol," Department of Electrical Engineering, SUNY, IEEE, 1990.

Black, "Lutron RF Technology, Reliable, First, Forward Thinking," Lutron Electronics Co. Inc., Aug. 2006, pp. 1-16.

Blaney, "HomeRF™ Working Group, 4th Liason Report," IEEE, 802.11-98/360, Nov. 1998, Slides 1-12.

Brain, "How Motes Work," available at http://computer.howstuffworks.com/mote.htm, on Feb. 25, 2010, pp. 1-2.

Brain, "How Motes Work: Ad hoc Networks," available at http://computer.howstuffw orks.com/mote3.htm on Feb. 25, 2010, pp. 1-3.

Brain, "How Motes Work: The Basic Idea," available at http://computer.howstuff works.com/mote1.htm, on Feb. 25, 2010, pp. 1-2.

Brain, "How Motes Work: Typical Applications," available at http://computer.howstuff works.com/mote2.htm, on Feb. 25, 2010, pp. 1-2.

Brayer, "Implementation and Performance of Survivable Computer Communication with Autonomous Decentralized Control," IEEE Communications Magazine, Jul. 1983, pp. 34-41.

Brownrigg et al., "Development of a Packet-Switching Network for Library Automation," Proceedings of The National Online Meeting Apr. 12-14, 1983, pp. 67-74.

Brownrigg et al., "Distributions, Networks, and Networking: Options for Dissemination," Workshop on Electronic Texts, Session III, available at http://palimpsest.standford.edu/byorg/lc/etextw/sess3.html, Jul. 17, 2007, pp. 1-10.

Brownrigg et al., "Electrons, Electronic Publishing, and Electronic Display," Information Technology and Libraries (Sep. 1985), pp. 201-207.

Brownrigg et al., "Implementing Library Automation Plans in a University Computing Environment, Planning for Computing in Higher Education 5," EDUCOM Series in Computing and Telecommunications in Higher Education, 1980, pp. 215-225.

Brownrigg et al., "Online Catalogues: Through a Glass Darkly," Information Technology and Libraries, Mar. 1983, pp. 104-115.

Brownrigg et al., "Packet Radio for Library Automation," Information Technology and Libraries 3 (Sep. 1984), pp. 229-244.

Brownrigg et al., "Packet Switching and Library Automation: A Management Perspective," Proceedings of the 45th ASIS Annual Meeting Oct. 17-21, 1982, vol. 19, pp. 54-57.

Brownrigg et al., "Technical Services in the Age of Electronic Publishing," Library Resource & Technical Services, Jan./Mar. 1984, pp. 59-67.

Brownrigg et al., "User Provided Access to the Internet," available at http://web.simmons.edu/~chen/nit/NIT'92/033-bro.htm, Jun. 9, 2005, pp. 1-6.

Brownrigg, "Continuing Development of California State Radio Packet Project," Proceedings of the ASIS 1992 Mid-Year Meeting (Silver Spring, MD: American Society for Information Science, 1992), pp. 97-100.

Brunninga, "A Worldwide Packet Radio Network," Signal, vol. 42, No. 10, Jun. 1988, pp. 221-230.

Bryan et al., "Man-Portable Networked Sensor System," Publisher: unknown, Date: unknown, pp. 1-10.

Bult et al. Low Power Systems for Wireless Microsensors, UCLA Electrical Engineering Department, 1996 ISLPED, pp. 1-5.

Bult et al., "A Distributed, Wireless MEMS Technology for Condition Based Maintenance," EED, Defense Technical Information Center, UCLA, Electrical Engineering Department, Rockwell Science Center; Apr. 22-26, 1996.

Bult et al., "A Distributed, Wireless MEMS Technology for Condition Based Maintenance," Publisher: unknown; Nov. 1997, pp. 1-8.

Bult et al., "Low Power Systems for Wireless Microsensors," EED, UCLA; ILSPED; 1996, pp. 1-15.

Bult et al., "Low Power Systems for Wireless Microsensors," UCLA Electrical Engineering Department, Los Anegeles, CA and Rockwell Science Center, Thousand Oaks, CA; Aug. 14, 1996, pp. 25-29.

Bult et al., "Low Power Wireless Integrated Microsensors (LWIM)," EED, UCLA; ARPA—LPE PI Meeting, Apr. 27-28, 1995, pp. 1-30.

Bult et al., "Wireless Integrated Microsensors," EED, UCLA Electrical Engineering Department, Rockwell Science Center, TRF; Jun. 6, 1996, pp. 205-210.

CADDX-CADDI Controls, Inc., Ranger 9000E, User's Manual, downloaded from http://www.guardianalarms.net, May 17, 1996, pp. 1-9.

Carlisle, "Edison's NetComm Project," Proceedings of the 33rd Annual Rural Electric Power Conference, IEEE, Apr. 1989, pp. B5/1-B5/4.

Chen et al., "Route Optimization and Location Updates for Mobile Hosts," 1996 IEEE, Proceedings of the 16th ICDCS, pp. 319-326.

Chen, Emerging Home Digital Networking Needs, Paper, DSP Solutions R & D Center, Texas Instruments, Inc., pp. 1-6.

Cisco Systems, Inc., Enhanced Interior Gateway Routing Protocol, Cisco Systems, Inc., Updated Sep. 9, 2005, pp. 1-44.

Cisco Systems, RFC1812-Requirements for IP Version 4 Routers, Fred Baker ed. (Jun. 1995), available at http://www.faqs.org/rfcs/rfc1812.html, Sep. 14, 2009, pp. 1-129.

Clement, "SCADA System Using Packet Radios Helps to Lower Cincinnati's Telemetry Costs," WATER/ Engineering & Management, Aug. 1996, pp. 18-20.

Cleveland, "Performance and Design Considerations for Mobile Mesh Networks," Milcom '96 Conference Proceedings, vol. 1 of 3, Oct. 22-24, 1996, pp. 245-249.

Clever Solutions—Metricom offers wireless data networks—includes related articles on Metricom's technology and the SONeTech company—Company Profile, available at http://findarticles.com/p/articles/mi_m0REL/is_n 11_v93/ai_147 70465/?tag=content;col1, on Nov. 22, 1993 (3 pages).

Coactive Networks, Inc., A New Solution for Offering Multive Telemetry Services to the Home, Coactive, 1999, pp. 1-8.

Coactive Networks, Inc., Coactive Connector® 1000 Series, Coactive, 2000, pp. 1-4.

Coactive Networks, Inc., Coactive Connector® 2000 Series, Coactive, Date: unknown, pp. 1-8.

Coactive Networks, Inc., Connecting Networks to the Real World™, Coactive, Date: unknown, pp. 1-4.

Coactive Networks, Inc., Corporate Backgrounder, Coactive, 2001, pp. 1-6.

Coactive Networks, Inc., Corporate Fact Sheet, Coactive, 2001, pp. 2.

Coactive Networks, Inc., Router-LE: Remote Access to LonWorks Over Ethernet, Coactive, 1998, pp. 1-4.

Coactive Networks, Inc., Router-LL: Connect LonWorks Networks Across Internet Protocol, Coactive, 1998, pp. 1-4.

Cohen et al., "IP Addressing and Routing in a Local Wireless Network," 1992 IEEE, 1992, pp. 626-632.

Cook et al., "Water Distribution and Control by Wireless Networking," Electronic Systems Technology, Date: unknown, pp. 1-3.

Corbell et al., "Technical Implementation in Support of the IAEA's Remote Monitoring Field Trial At the Oak Ridge Y-12 Plant," Dept. of Energy, Office of Scientific and Technical Information, Report No. SAND-096-1934C, available at http://www.osti.gov/bridge/product.biblio.jsp?qu ery_id=1&page=0&osti_id=270678 (1996).

Corbell et al., "Technical Results of Y-12/IAEA Field Trial of Remote Monitoring System," Dept. of Energy, Office of Scientific and Technical Information, Report No. SAND-97-1781C, available at http://www.osti.gov/bridge/product.biblio.jsp?query_id=0&page=0 &osti_id=505711 (1997).

Corcoran et al., "Browser-Style Interfaces to a Home Automation Network," IEEE Transactions on Consumer Electronics, vol. 43, No. 4, Nov. 1997, pp. 1063-1069.

Corcoran et al., "CEBus Network Access via the World-Wide-Web," available at http://ieeexplore.ieee.org/xpl/freeabs_all.jsp?arnumber= 517285, on Mar. 29, 2009, Paper published on Consumer Electronics, 1996, Digest of Technical Papers, pp. 236-237.

Corcoran et al., "CEBus Network Access via the World-Wide-Web," IEEE, 1996.

Corson et al., "Architectural Considerations for Mobile Mesh Networking," Milcom '96 Conference Proceedings vol. 1 of 3, Oct. 22-24, 1996, pp. 225-229.

Corson et al., "Internet-Based Mobile Ad Hoc Networking," IEEE Internet Computing, Jul.-Aug. 1999, pp. 63-70.

Court's claim construction Order dated Feb. 10, 2009, in *SIPCO LLC et al. v. The Toro Co. et al.*, Case No. 2:08-cv-00505-TJS (E.D. PA.).

Custom Solutions, Inc. Acessories, available at http://web.archive.org/web/19981206221844/www.csi3.com/hv_pv4.htm on Feb. 27, 2009, pp. 1-3.
Custom Solutions, Inc., HomAtion 2000 for HomeVision, Press Release, available at http://web.archive.org/web/19981207075734/www.csi3.com/HV_PR_0 on Feb. 27, 2009, pp. 1-2.
Custom Solutions, Inc., HomeVision 2.7 "How To" Information, Date: unknown; pp. 1-146.
Custom Solutions, Inc., HomeVision 2.7 Auto Report Feature, Date: unknown, pp. 1-10.
Custom Solutions, Inc., HomeVision 2.7 Interface Command Protocol, Date: unknown, pp. 1-40.
Custom Solutions, Inc., HomeVision 2.7 Interface Command Protocol, Date: unknown, pp. 1-80.
Custom Solutions, Inc. HomeVision 2.7, Date: unknown, pp. 1-42.
Custom Solutions, Inc. HomeVision 2.7, Document Purpose, Date: unknown, pp. 1-28.
Custom Solutions, Inc. HomeVision 2.7, Summary of Changes- 2.7, Date: unknown, pp. 1-26.
Custom Solutions, Inc. HomeVision 2.7, Welcome to HomeVision, Date: unknown, pp. 1-18.
Custom Solutions, Inc. HomeVision 2.7e, Owner's Manual (1999); pp. 1-596.
Custom Solutions, Inc. HomeVision 2.7e, Version History Overview, Date: unknown, pp. 1-38.
Custom Solutions, Inc. HomeVision Description, available at http://web.archive.org/web/19981206004955/http://www.csi3.com/HV.htm on Mar. 2, 2009, pp. 1-14.
Custom Solutions, Inc. HomeVision PC 2.62 Interface Command Protocol, date: unknown, pp. 1-36.
Custom Solutions, Inc. HomeVision PC 2.62, Welcome to HomeVision PC, Date: unknown; pp. 1-16.
Custom Solutions, Inc. HomeVision PC 2.62, Document Purpose, Date: unknown, pp. 1-24.
Custom Solutions, Inc. HomeVision PC 2.62, Summary of Changes- 2.62, date: unknown, pp. 1-8.
Custom Solutions, Inc. HomeVision PC 2.62, Version History Overview, Date:unknown, pp. 1-6.
Custom Solutions, Inc., HomeVision-PC Description, available at http://web.archive.org/web/19981205094024/http://www.csi3.com/hv_pc.htm on Mar. 2, 2009, pp. 1-6.
Custom Solutions, Inc., HomeVision-PC Software, available at http://web.archive.org/web/19990224053817/http://www.csi3.com/hvp3pc.htm on Feb. 27, 2009, pp. 1-2.
Haartsen et al., "Bluetooth: Vision, Goals, and Architecture;" Mobile Computing and Communications Review; vol. 1, No. 2; pp. 1-8.
Haartsen, "Bluetooth—The Universal Radio Interface for Ad Hoc, Wireless Connectivity;" Ericsson Review No. 3, 1998; pp. 110-117.
Hahn et al., "Packet Radio Network Routing Algorithms: A Survey," IEEE Communications Magazine, vol. 22, No. 11, Nov. 1984, pp. 41-47.
HAI Omni, Features & Specifications, Home Automation, Inc., available at http://web.archive.org/web/19970216055832/www.homeauto.com/omni on Feb. 17, 2009, pp. 1-6.
Hall, "Tactical Internet System Architecture for Task Force XXI," 1996 IEEE, pp. 219-230.
Hamilton et al., "Optimal Routing in Multihop Packet Radio Networks," 1990 IEEE, pp. 389-396.
Harrington, "More Visible Vehicles," ActionLINE, Jul. 2003 (4 pages).
Harrison, "Microwave Radio in the British Telecom Access Network," Second IEE National Conference on Telecommunications, Conference Publication No. 300, Date: unknown, pp. 208-213.
Hedrick, "An Introduction to IGRP," Rutgers, The State University of New Jersey, Center for Computers and Information Services, Laboratory for Computer Science Research, Aug. 22, 1991 (Updated Aug. 10, 2005), pp. 1-21.
Hedrick, "Routing Information Protocol" (Jun. 1988), RFC 1058, available at Http://Tools.Ietf.Org/Html/Rfc1058, Jun. 24, 2009, pp. 1-34.
Hinden et al., "The DARPA Internet Gateway," RFC 823, Publisher: unknown, Sep. 1982, pp. 1-43.
Hogan, "Call of the Wi-Fi," Entrepeneur Magazine, Sep. 2003, pp. 39-42.
Holtsville et al., "Symbol Technologies, Telxon and Aironet Commit to Future Interoperability of Their Wireless Local Area Networks Based on the IEEE 802.11 Specification," Business Wire, Jun. 24, 1996, available at http://www.thefreelibrary.co m/_/print/PrintArticle.aspx?id=18414624, pp. 1-3.
Home Automation Inc., "HAI Company Background;" Publisher: Unknown, Date: unknown, pp. 1-2.
Home Toys, Inc., "HTINews Review," available at http://www.hometoys.com/htinews/aug97/reviews/homevis/homevis1.htm on Mar. 2, 2009, pp. 1-26.
Honeywell, Inc., "Honeywell Home Control Version 2.0 Demonstratin," available at http://web.archive.org/web/19980630195929/www.hbc.honeywell.com/ on Mar. 5, 2009 (7 pages).
Hong et al., "U.S. Lightning Market Characterization, vol. II.: Energy Efficient Lighting Technology Options," Sep. 30, 2005, Reportprepared for Building Technologies Program, Office of Energy Efficiency and Renewable Energy, pp. 1-36.
Hotel Technology Next Generation, "A Guide for Understanding Wireless in Hospitality," an HTNG White Paper, Jun. 2006 (Jayne O'Neill, ed.), pp. 1-77.
Hruschka et al., "Packet Radio, Drahtlose Datenubertragung im Amateurfunk," Elektor, Jun. 1991, pp. 54-57 and 84.
Hsu et al., "Wireless Communications for Smart Dust," Berkeley: UCLA, Jan. 30, 1998, pp. 1-20.
Hubner et al., "A Distributed Multihop Protocol for Mobile Stations to Contact a Stationary Infrastructure," The Third IEE Conference on Telecommunications, Conference Publication No. 331, Date: unknown, pp. 204-207.
Internet Protocol, Version 4 (IPv4), RFC791 (Sep. 1981).
Internet Protocol, Version 6 (IPv6) Specification, RFC 2460 (Dec. 1998).
Internet Protocol; DARPA Internet Program Protocol Specification, John Postel Editor; Information Sciences Institute, University of Southern California, California; Sep. 1981; pp. 1-45.
Iwata et al., "Scalable Routing Strategies for Ad Hoc Wireless Networks," IEEE Journal on Selected Areas in Communications, vol. 17, No. 8, Aug. 1999, pp. 1369-1379.
Jacobsen, "The Building Blocks of a Smart Sensor for Distributed Control Networks," IEEE Technical Applications Conference Northcon, Nov. 4-6, 1998, pp. 285-290.
JDS Technologies, "Infrafred Xpander, IR-XP2, User Manual," Date: unknown, pp. 1-15.
JDS Technologies, "Model: 8R5PR, 8 Channel RS485 Relay Xpander, Installation Manual," pp. 1-5.
JDS Technologies, "Stargate 8 Channel RS-485 HUB," Publisher: unknown, Date: unknown, pp. 1.
JDS Technologies, "Stargate Interactive Automation System," 1998, pp. 1-2.
JDS Technologies, "Stargate, Operation Manual," Mar. 2000, pp. 1-114.
JDS Technologies, "Stargate-IP System Layout," Publisher: unknown; Date: unknown, pp. 1.
JDS Technologies, "Support: Protocol Specifications," available at http://jdstechnologies.com/protocol.htm, on Feb. 16, 2009, pp. 1-32.
JDS Technologies, "TimeCommander, TimeCommander Plus, User Guide," Jun. 1998, pp. 1-95.
JDS Technologies, "Web Xpander, Installation and Operation Manual," Feb. 2004, pp. 1-34.
Jimenez-Cedeno et al., "Centralized Packet Radio Network: A Communication Approach Suited for Data Collection in a Real-Time Flash Flood Prediction System," ACM-SAC 1993, pp. 709-713.
Johnson Controls, Inc., LonWorks® Digital Controller, 1998, pp. 1-12.
Johnson et al., "Dynamic Source Routing in Ad Hoc Wireless Networks", Computer Science Department, Carnegie Mellon University, A Chapter in Mobile Computing, vol. 353, pp. 1-18, 1996.
Johnson et al., "Dynamic Source Routing in Ad Hoc Wireless Networks," reprinted in Mobile Computing; Tomasz Imielinski and Hank Korth eds., 1996; Kluwer Academic Publishers, pp. 153-181.

Johnson et al., "Protocols for Adaptive Wireless and Mobile Networking," IEEE Personal Communications, 3(1), Feb. 1996, pp. 1-18.

Johnson et al., "Route Optimization in Mobile IP," Internet Draft (Nov. 28, 1994), available at http://www.monarch.cs.rice.edu/internet-drafts/draft-ietf-mobileip-optim-00.txt., Sep. 26, 2009, pp. 1-29.

Johnson, "Mobile Host Internetworking Using IP Loose Source Routing," Carnegie Mellon University CMU-CS-93-128, DARPA Order No. 7330, Feb. 1993, pp. 1-18.

Johnson, "Routing in Ad Hoc Networks of Mobile Hosts," 1995 IEEE, pp. 158-163.

Johnson, "Scalable and Robust Internetwork Routing for Mobile Hosts," 1994 IEEE, pp. 1-11.

Jubin et al., "The DARPA Packet Radio Network Protocols," Proceedings of the IEEE, vol. 75, No. 1, Jan. 1987, pp. 21-32.

Jubin, "Current Packet Radio Network Protocols," Proc. of the IEEE Infocom (Mar. 26-28, 1985), pp. 86-92.

Kaashoek et al., "FLIP: An Internetwork Protocol for Supporting Distributed Systems," ACM Transactions on Computer Systems, vol. 11, No. 1, Feb. 1993, pp. 73-106.

Kaiser et al., "Detailed Progress Report—LWIM Applications, Systems Verification and Field Test," UCLA.

Kaiser et al., "Low Power Wireless Integrated Microsensors (LWIM), BAA 94-15 Proposal Abstract," UCLA Electrical Engineering Department, Rockwell Science Center, Date: unknown, 15 pages.

Kaiser et al., "Low Power Wireless Integrated Microsensors (LWIM), Request for Support to Project", UCLA Electrical Engineering Department, Rockwell Science Center, Sep. 13, 1994, 71 pages.

Kaiser et al., "Low Power Wireless Integrated Microsensors (LWIM)," UCLA; Rockwell Science Center; LWIM Kickoff Meeting, Aug. 8, 1995, Presented to Dr. Ken Gabriel (ARPA), Dr. Elissa Sobolewski (ARPA), and Dr. Joseph Kielman (FBI), 62 pages.

Kaiser et al., "Program Mission: Low Power Wireless Integrated Microsensor (LWIM)," UCLA, Date: unknown.

Kaiser, "Circuits and Systems for Embedded Wireless Devices: Low Power Sensor, Interface, Signal Processing, Communication, and Network Systems," École Polytechnique Fédérale de Lausanne, pp. 1-40.

Custom Solutions, Inc., HomeVision-PC Version 2.62, Owner's Manual (1997), pp. 1-234.

Custom Solutions, Inc., Media Information, Feb. 16, 1999, available at http://web.archive.org/web/19990502073249/www.csi3.com/hv_media.htm on Feb. 27, 2009, pp. 1-2.

Custom Solutions, Inc., Using Enerzone StatNet Thermostats with HomeVision (1998) pp. 1-16.

Davies et al., "Internetworking in the Military Environment," Proceedings of IEEE Infocom '82 (1982) pp. 19-29.

Davies et al., "The Application of Packet Switching Techniques to Combat Net Radio," Proceedings of the IEEE, vol. 75, No. 1, Jan. 1987, pp. 43-55.

Davis et al., "Knowledge-Based Management of Cellular Clone Fraud," IEEE (1992), pp. 230-234.

Deering et al., "Internet Protocol, Version 6 (IPv6)," RFC1883, Publisher: unknown, Dec. 1995, pp. 1-37.

Deering et al., "Internet Protocol, Version 6 (IPv6)," RFC2460, The Internet Society, Dec. 1998, pp. 1-39.

Diaz, "Intervehicular Information System (IVIS): the Basis for a Tactical Information System," SAE International, Mar. 1994, pp. 1-14.

Dixon et al., "Addressing, Bridging and Source Routing," IEEE Network, Jan. 1988, vol. 2, No. 1, pp. 25-32.

Dong et al., "Low Power Signal Processing Architectures for Network Microsensors," ACM, 1997, pp. 173-177.

Echelon Corp., "LonTalk® Protocol Specification," Doc. No. 19550, available at http://ww w.enerlon.com/JobAids/Lontalk%20Protocol%20Spec.pdf (1994).

Echelon Corp., "Series 90™-30 PLC LonWorks® Bus Interface Module User's Manual," Doc. No. GFK-1322A, available at http://www.pdfsupply.com/pdfs/gfk1322a.pdf (1997).

Elson et al., "Fine-Grained Network Time Synchronization Using Reference Broadcasts," UCLA Computer Science Department, May 17, 2002, pp. 1-14.

Eng et al., "BAHAMA: A Broadband Ad-Hoc Wireless ATM Local-Area Network," 1995 IEEE International Conference on Communications, Jun. 18-22, 1995, pp. 1216-1223.

Ephremides et al., "A Design Concept for Reliable Mobile Radio Networks with a Frequency Hopping Signaling," IEEE 1987, pp. 1-18.

ESTeem Application Paper—AgriNorthwest Employee's Provide Wireless Control System (describing a system that was in use prior to Mar. 1999).

ESTeem Application Paper—Allen-Bradley Goes Wireless on Alaska's North Slope (describing a system that was in use prior to Mar. 1999).

ESTeem Application Paper—Build Your Own Wireless Power Distribution System (describing a system that was in use prior to Mar. 1999).

ESTeem Application Paper—Lost Cabin Gas Plant Uses Wireless Control to Enhance Production & Safety (describing a system that was in use prior to Mar. 1999).

ESTeem Application Paper—Northwest Farm Applies Wireless Solution (describing a system that was in use prior to Mar. 1999).

ESTeem Application Paper—Wireless Control of Polluted Water (describing a system that was in use prior to Mar. 1999).

ESTeem Application Paper—Wireless Mobile Mapping System (describing a system that was in use prior to Mar. 1999).

ESTeem Application Paper—Wireless Networking for Kodiak's Coast Guard Station (describing a system that was in use prior to Mar. 1999).

ESTeem Application Paper—Wireless Networking for Natural Gas Extraction (describing a system that was in use prior to Mar. 1999).

ESTeem Models 85, 95, 96, & 98 User's Manual (describing the ESTeem 96C and 96F radios used prior to 1999).

Estrin et al., "Next Century Challenges: Scallable Coordination in Sensor Networks," ACM, 1999, pp. 263-270.

Estrin et al., "RFC1940-Source Demand Routing: Packet Format and Forwarding Specification (Version 1)," Network Working Group, May 1996, available at http://www.faqs.org/rfcs/rfc1940.html, Sep. 14, 2009, pp. 1-20.

Estrin et al., "Source Demand Routing: Packet Format and Forwarding Specification (Version 1)", Network Working Group, Internet Draft, Jan. 19, 1995, pp. 1-28.

Federal Communications Commission, "Notice of Proposed Rule Making and Order," Adopted Dec. 17, 2003, Released Dec. 30, 2003 (54 pages).

Frank, "Transmission of IP Datagrams Over NET/ROM Networks, ARRL Amateur Radio 7th Computer Networking Conference," Oct. 1988, pp. 65-70.

Frank, "Understanding Smart Sensors," Artech House (1996).

Frankel, "Packet Radios Provide Link for Distributed Survivable Command Control Communications in Post-Attack Scenarios," Microwave System News, Jun. 1983, Circle Reader Service No. 77, pp. 80-108.

Franz, "HiperLAN—Der ETSI-Standard fur locale Funknetze," NTZ, Sep. 1995, 10 pages.

Fullmer, "Collision Avoidance Techniques for Packet-Radio Networks," Dissertation, University of California at Santa Cruz , Jun. 1998, pp. 1-162.

Gale et al., "The Impact of Optical Media on Information Publishing," Bulletin of the American Society for Information Science, vol. 12, No. 6, Aug./Sep. 1986, pp. 12-14.

Garbee, "Thoughts on the Issues of Address Resolution and Routing in Amateur Packet Radio TCP/IP Networks," ARRL Amateur Radio 6th Computer Networking Conference, Aug. 1987, p. 56-58.

Garcia-Luna-Aceves, "A Fail-Safe Routing Algorithm for Multishop Packet-Radio Networks," IEEE Infocom '86, Technical Sessions: Apr. 8-10, 1986, pp. 434-442.

Garcia-Luna-Aceves, "A Minimum-hop Routing Algorithm Based on Distributed Information," Elsevier Science Publishers, B.V. (North Holland), 1989, pp. 367-382.

Garcia-Luna-Aceves, "Routing Management in Very Large Scale Networks," Elsevier Science Publishers, B.V. (North Holland), 1988, pp. 81-93.

Garcia-Luna-Aceves, J.J et al., "Wireless Internet Gateways (WINGS)", 1997 IEEE, pp. 1271-1276, 1997.

GE Security, "NetworkX NX-4," 2004, pp. 1-2.

GE Security, "NetworkX NX-548E," 2006, pp. 1-2.

Geier et al., "Networking Routing Techniques and their Relevance to Packet Radio Networks," ARRL/CRRL Amateur Radio 6th Computer Networking Conference, London, Ontario, Canada, Sep. 1990, pp. 105-117.

Gerla et al., "Multicluster, Mobile, Multimedia Radio Network," UCLA Computer Science Department; Baltzer Journals; Wireless Networks; Jul. 12, 1995, pp. 255-265.

Golden Power Manufacturing, "6030 PCT Programmable Communicating Thermostat," Author: unknown, 2007, pp. 1-3.

Golden Power Manufacturing, "Ritetemp Universal Wireless Thermostat," Author: unknown, 2007, pp. 1-2.

Goldman et al., "Impact of Information and Communications Technologies on Residential Customer Energy Services," Paper, Berkeley: UCLA, Oct. 1996, pp. 1-89.

Gower et al., "Congestion Control Using Pacing in a Packet Radio Network", Rockwell International, Collins Communications Systems Division, Richardson, TX, IEEE 1982, pp. 23.1-1-23.1-6, 1982.

Grady et al., "Telemetry Options for Small Water Systems," Special Report SR14-1999, Publisher: unknown, Sep. 1999, pp. 1-23.

Guardian Alarms, Inc., "Home Security System—Model 7068 Digital Dialer Interface," Author: unknown, available at www.guardianalarms.net, 2007, pp. 1.

Guardian Alarms, Inc., "Security Company—Home Alarm System Monitoring—AES 7067 IntelliTap-II Digital Dialer Interface," Author: unknown, available at www.guardianalarms.net, 2007, pp. 1.

Guardian Alarms, Inc., "Security System—Alarm System Monitoring—7160 EZ Router," Author: unknown, available at www.guardianalarms.net, 2007, pp. 1.

Guardian Alarms, Inc., "Security System—Alarm System Monitoring—NET 7000," Author: unknown, available at www.guardianalarms.net, 2007, pp. 1.

Guardian Alarms, Inc., "Security System—Alarm System Monitoring—Radionics FDX," Author: unknown, available at www.guardianalarms.net, 2007, pp. 1.

Kaiser, "Embedded Wireless Devices: Sensors," Outline, École Polytechnique Fédérale de Lausanne, pp. 1-53.

Kaiser, "Embedded Wireless Devices: Signal Processing," Outline, École Polytechnique Fédérale de Lausanne, pp. 1-19.

Kaiser, "Embedded Wireless Devices: Wireless Networking," Outline, École Polytechnique Fédérale de Lausanne, pp. 1-16.

Kaiser, "Embedded Wireless Devices: Wireless Physical Layer," Outline, École Polytechnique Fédérale de Lausanne, pp. 1-29.

Karn et al., "Packet Radio in the Amateur Service," IEEE Journal on Selected Areas in Communications, vol. SAC-3, No. 3, May 1985, pp. 431-439.

Katz et al., "The Bay Area Research Wireless Access Network (BARWAN)" (Jun. 1996) (presentation paper), http://daedalus.cs.berkeley.edu/talks/retreat.6.97/BARWAN.597.ppt, pp. 1-66.

Katz et al., "The Bay Area Research Wireless Access Network (BARWAN)," University of California at Berkeley, available at http://www.cs.berkeley.edu/-randy/Daedalus/BARWAN/BARWAN_index.html, 6 pages.

Katz et al., "Towards a Wireless Overlay Internetworking Architecture", DARPA ITO Sponsored Research, 1997 Project Summary, University of California, Berkeley, pp. 1-8, Including a Slide Show Presentation of 56 Pages at http://daedalus.cs.berkeley.edu/talks/retreat.6.96/overview.pdf.

Kemp, "Home Automation Application Guide," Applications for Home Automation in Any Home, vol. 1, 2000, pp. 1-106.

Kleinrock et al., "Hierarchical Routing for Large Networks, Performance Evaluation, and Optimization," Computer Networks 1 (1977), pp. 155-174.

Kocom, "Digital Home Network, Kitchen TV Phone KTD-505, User's Manual," pp. 1-7.

Kohno et al., "An Adaptive Sensor Network System for Complex Environments in Intelligent Autonomous Systems (Kakazu et al., eds.)," IOS Press, 1998, pp. 21-28.

Kooser et al., "Testing 1-2-3," Entrepreneur Magazine, Sep. 2003, pp. 27-30.

Krishnamachari, "Networking Wireless Sensors," Cambridge University Press, Date: unknown, pp. 1-10.

Krishnamachari, "Wireless Sensor Networks: the Vision;" Cambridge University Press; pp. 1-10.

Lacoss, "Distributed Sensor Networks, Final Report," Lincoln Laboratory at Massachusetts Institute of Technology, Sep. 30, 1986, pp. 1-225.

Lauer et al., "Survivable Protocols for Large Scale Packet Radio Networks," IEEE Global Telecommunications Conference, Nov. 26-29, 1984, vol. 1 of 3, pp. 468-471.

Lauer, "Packet-Radio Routing, Routing in Communications Networks," Ch. 11 (1995) pp. 351-396.

Lee et al., "Distributed Measurement and Control Based on the IEEE 1451 Smart Transducer Interface Standards," Proceedings of the 16th IEEE Instrumentation and Measurement Technology Conference, vol. 1, May 24-26, 1999, IEEE, pp. 608-613.

Leiner et al., "Goals and Challenges of the DARPA GloMo Program;" IEEE Personal Communications; Dec. 1996, vol. 3, No. 6; pp. 34-45.

Leviton Manufacturing Co., Inc., "The DECORA® Collection of Designer Devices," 2006, pp. 1-85.

Lewis et al., "Packet-Switching Applique for Tactical VHF Radios," 1987 IEEE Military Communications Conference, Oct. 19-22, 1987, Conference Record vol. 2 of 3, pp. 449-455.

Lin et al., "Adaptive Clustering for Mobile Wireless Networks;" Publisher: unknown; Date: unknown; pp. 1-21.

Lin et al., "CMOS Front End Components for Micropower RF Wireless Systems;" EED, UCLA Electrical Engineering Department; 1998, pp. 1-5.

Lin et al., "Wireless Integrated Network Sensors (WINS) for Tactical Information Systems," UCLA, Rockwell Science Center; Date: unknown; pp. 1-5.

Linear Corporation, "Supervised Digital Security Transmitter t-90, Installation Instructions," 2006, pp. 1-2.

Linear Corporation, "Supervised Digital Security Transmitters TX-91, TX-92, TX-94, Operation Instructions," 1993, pp. 1.

Linear Corporation, "Supervised Wireless Receiver and Zone Expander SRX-64A, Installation Instructions," 2003, pp. 1-2.

Local and Metropolitan Area Networks: Wireless Medium Access Control (MAC) and Physical (PHY) Specifications, Author: unknown; IEEE, Nov. 1997, pp. 1-98.

Clare et al., "Self-Organizing Distributed Sensor Networks," UCLA, Rockwell Science Center.

Clare, "AWAIRS Progress Review: Planned Milestones," UCLA Rockwell Science Center, Nov. 20, 1998.

Lougheed et al., "A Border Gateway Protocol 3 (BGP-3)," RFC 1267, (Oct. 1991), available at http://tools.ietf.org/html/rfc1267, Jun. 24, 2009, pp. 1-36.

Lowe et al., "Publishing Bibliographic Data on Optical Disks: A Prototypical Application and Its Implications," Third International Conference on Optical Mass Data Storage, Proceedings of SPIE, vol. 529, pp. 227-236.

Lutron Electronics Co. Inc., Connecting to a RadioRA System via a Local Area Network, Application Note #127, Date: unknown, pp. 1-16.

Lutron Electronics Co. Inc., Homeowner's Guide for the RadioRA® Quick Start Package, 2004, pp. 1-8.

Lutron Electronics Co. Inc., How to Retrofit RadioRA® Wall-Mounted Master Control into an existing home, Application #41, 2004, pp. 1-2.

Lutron Electronics Co. Inc., Interfacing RadioRA® to Security and Fire Alarm Systems, Application Note #59, pp. 1-4.

Lutron Electronics Co. Inc., IR/RS232 Interface for Bang & Olufsen® Remote Control and RadioRA®, Application Note #119, 2004, pp. 1-3.

Lutron Electronics Co. Inc., Level Capture with a RadioRA® Master Control, Application Note #73, 2003, pp. 1-3.

Lutron Electronics Co. Inc., Modem Installation for HomeWorks®, Application Note #9, 1998, pp. 1-4.
Lutron Electronics Co. Inc., RadioRA® RA-IR-KIT Installation Instructions, Application Note #61, 2000, pp. 1-4.
Lutron Electronics Co. Inc., RadioRA® RF Signal Repeater, 1998, pp. 1-2.
Lutron Electronics Co. Inc., RadioRA® Single-Location Switch, Controls for Permanently Installed Lighting Loads, 1998, pp. 1-2.
Lutron Electronics Co. Inc., RadioRA® Table Lamp Controls, Dimming and Switching Controls for Table and Floor Lamps, 1999, pp. 1-2.
Lutron Electronics Co. Inc., Using a Photocell with the RadioRA® System, Application Note #45, 1998, pp. 1-4.
Lutron Electronics Co. Inc., Using an Astronomic Timeclock with the RadioRA® System, Application Note #42, 1998, pp. 1-2.
Lutron Electronics Co. Inc., Using the RadioRA® System to Activate Scenes 5-16 on a GRAFIK Eye® Control Unit, Application Note #48, 1998, pp. 1-4.
Lutron Electronics Co. Inc., Using the RadioRA® Telephone Interface, Application Note #46, 1998, pp. 1-2.
Lynch et al., "Application of Data Compression Techniques to a Large Bibliographic Database," Proceeding of the Seventh International Conference on Very Large Databases, Cannes, France, Sep. 9-11, 1981 (Washington, DC: IEEE Computer Society Press, 1981), pp. 435-447.
Lynch et al., "Beyond the Integrated Library System Concept: Bibliographic Networking at the University of California," Proceedings of the Second National Conference on Integrated Online Library Systems Proceedings, Sep. 1984, pp. 243-252.
Lynch et al., "Conservation, Preservation and Digitization, Energies for Transition," Proceedings of the Fourth National Conference of the Association of College and Research Libraries, Baltimore, MD, Apr. 9-12, 1986 (Chicago, IL: Association of College and Research Libraries, 1986), pp. 225-228.
Lynch et al., "Document Delivery and Packet Facsimile," Proceedings of the 48th ASIS Annual Meeting, vol. 22, Oct. 20-24, 1985, pp. 11-14.
Lynch et al., "Electronic Publishing, Electronic Imaging, and Document Delivery, Electronic Imaging '86," (Boston, MA: Institute for Graphic Communication, Inc., 1986), pp. 662-667.
Lynch et al., "Library Applications of Electronic Imaging Technology," Information Technology and Libraries, Jun. 1986, pp. 100-105.
Lynch et al., "Packet Radio Networks: Architectures, Protocols, Technologies and Applications," Pergamon Press, 1 ed., 1987, pp. 1-275.
Lynch et al., "Public Access Bibliographic Databases in a Multicampus University Environment, Databases in the Humanities and Social Sciences—4," Proceedings of the International Conference on Databases in the Humanities and Social Sciences, Jul. 1987, Learned Information, Inc., 1989, pp. 411-419.
Lynch et al., "The Telecommunications Landscape: 1986," Library Journal, Oct. 1, 1986, pp. 40-46.
Rehkter et al., "A Border Gateway Protocol 4 (BGP-4)," RFC 1771, (Mar. 1995), available at http://tools.ietf.org/html.rfc1771, Jun. 24, 2009, pp. 1-58.
Reuters, "Verizon Launches Wi-Fi Hot Spots," May 18, 2003, http://www.wired.com/news/wireless/0,1382,58830,00.html (2 pages).
Ritter et al., The Architecture of Metricom's Microcellular Data Network™ (MCDN) and Details of its Implementation as the Second and Third Generation Ricochet™ Wide-Area Mobile Data Service, IEEE, 2001, pp. 143-152.
Ross et al., "PNC/DOE Remote Monitoring Project at Japan's Joyo Facility," Office of Scientific and Technical Information, Report No. SAND-96-1937C, available at http://www.osti.gov/bridge/product.bib lio.jsp?query_id=0&pa ge=0&osti_id=270680 (1996).
Saffo, Paul, "Sensors: The Next Wave of Infotech Innovation," Institute for the Future (1997).
Salkintzisa et al., "Design and implementation of a low-cost wireless network for remote control and monitoring applications," Elservier, Microprocessors and Microsystems, 1997, pp. 79-88.
Saltzer et al., "Source Routing for Campus-wide Internet Transport (Sep. 15, 1980)," available at http://groups.csail.mit.edu/ana/publications/pubPDFs/Sourcerouting.html, Sep. 21, 2009, pp. 1-14.

Schneider et al., "International Remote Monitoring Project Argentina Nuclear Power Station Spent Fuel Transfer Remote Monitoring System," Dept. of Energy, Office of Scientific and Technical Information, Report No. SAND-97-1784C, available at http://www.osti.gov/bridge/product.bibli o.jsp?query_id=1&page=0&osti_id=505674 (1997).
Schulman et al., "SINCGARS Internet Controller-Heart of the Digitized Battlefield," Proceedings of the 1996 Tactical Communications Conference, Apr. 30-May 2, 1996, pp. 417-421.
Shacham et al., "A Packet Radio Network for Library Automation," 1987 IEEE Military Communications Conference, vol. 2, at 21.3.1 (Oct. 1987); pp. 456-462.
Shacham et al., "Dynamic Routing for Real-Time Data Transport in Packet Radio Networks," IEEE Proceedings of INFOCOM '82, pp. 152-159.
Shacham et al., "Future Directions in Packet Radio Architectures and Protocols," Proceedings of the IEEE, vol. 75, No. 1, Jan. 1987, pp. 83-99.
Shacham et al., "Future Directions in Packet Radio Technology," Proceedings of IEEE Infocom 85, Mar. 26-28, 1985, pp. 93-98.
Shacham et al., "Packet Radio Networking," Telecommunications vol. 20, No. 9, Sep. 1986, pp. 42,43,46,48,64 and 82.
Shoch, "Inter-Network Naming, Addressing and Routing, Internet Experiment Note # 19, Notebook section 2.3.3.5," Xerox Palo Alto Research Center, Jan. 29, 1978, Publisher: unknown, pp. 1-9.
Sohrabi et al., Protocols for Self-Organization of a Wireless Sensor Network, IEEE Personal Communications, Oct. 2000, pp. 16-27.
Stern, "Verizon to Offer Wireless Web Link via Pay Phones," May 10, 2003, http://www.washingtonpopst.com/ac2/wp-dyn?pagename=article&node=&contentID=A367 . . . (3 pages).
Subramanian et al., An Architectural for Building Self-Configurable Systems, IEEE, 2000, pp. 63-73.
Sunshine, "Addressing Problems in Multi-Network Systems," (Apr. 1981), available at ftp://ftp.isi.edu/in-notes/ien/ien178.txt, Sep. 14, 2009, pp. 1-26.
Sunshine, "Addressing Problems in Multi-Network Systems," Proceedings INFOCOM '82, 1982 IEEE, pp. 12-19.
Sunshine, "Network Interconnection and Gateways," IEEE Journal on Selected Areas in Communications, vol. 8, No. 1, Jan. 1990, pp. 4-11.
Sunshine, "Source Routing in Computer Networks," Information Sciences Department of the Rand Corporation (1977), Publisher: unknown, pp. 29-33.
Sutherland, Ed, "Payphones: The Next Hotspot Wave?," Jan. 28, 2003, http://www.isp-planet.com/fixed_wireless/news/2003/bellcanada_030128.html (3 pages).
Tanenbaum, "Computer Networks," 4th Int'l CAN Conf., Berlin, Germany, 1997.
Thodorides, "Wireless Integrated Network Sensors," Power Point Presentation, Publisher: unknown, Apr. 15, 2003, pp. 1-19.
Thomas, "Extending CAN Networks by Incorporating Remote Bridging," ESTeem Radios, Nov. 1994.
Thomas, "Extending CAN Networks by Incorporating Remote Bridging," 4th Int'l CAN Conf., Berlin, Germany, available at http://www.can-cia.org/fileadmin/cia/files/icc/4/thom as.pdf (1997).
Tobagi et al, "Packet Radio and Satellite Networks," IEEE Communications Magazine, vol. 22, No. 11, Nov. 1984, pp. 24-40.
Toh, "A Novel Distributed Routing Protocol to Support Ad-Hoc Mobile Computing," Conference Proceedings of the 1996 IEEE Fifteenth Annual International Phoenix Conference on Computers and Communications, Mar. 27-29, 1996, pp. 480-486.
Totolo, Home RF, A New Protocol on the Horizon, Feb. 1999, available at www.hometoys.com/htinews/feb99/articles/totolo/totolo.htm on Mar. 2, 2009.
Transmission Control Protocol; "DARPA Internet Program Protocol Specification," John Postel Editor; Information Sciences Institute, University of Southern California, California; Sep. 1981; pp. 1-85.
Varadhan et al., "SDRP Route Construction," Internet Draft, available at draft-ietf-sdr-route-construction-01.{ps,txt}, Feb. 27, 2005, pp. 1-12.
Vardhan, "Wireless Integrated Network Sensors (WINS): Distributed in Situ Sensing for Mission and Flight Systems," 2000 IEEE Aerospace Conference Proceedings, (2000).

Verizon, "Verizon Broadband Anytime," Copyright 2003, https://www33.verizon.com/wifi/login/loacations/locations-remote.jsp (2 pages).

Wang et al., "Energy-Scalable Protocols for Battery Operated MicroSensor Networks," Department of Electrical Engineering Massachusetts Institute of Technology, 1999.

Warrock, "School Give Report on Radio-Based FMS," Energy User News, Nov. 7, 1983, pp. 1.

Weiser, "Some Computer Science Issues in Ubiquitous Computing," Communications of the ACM, Jul. 1993.

Weiser, "The Computer for the 21st Century," Scientific American, Sep. 1991.

Westcott et al., "A Distributed Routing Design for a Broadcast Environment," 1982 IEEE Military Communications Conference on Progress in Spread Spectrum Communications, vol. 3, Oct. 17-20, 1982, pp. 10.4.1-10.4.5.

Westcott et al., "Hierarchical Routing for Very Large Networks," IEEE Military Communications Conference, Oct. 21-24, 1984, Conference Record vol. 2, pp. 214-218.

Westcott, "Issues in Distributed Routing for Mobile Packet Radio Networks," Proceedings of Computer Networks Compcon '82, Sep. 20-23, 1982, pp. 233-238.

Wey, Jyhi-Kong et al., "Clone Terminator: An Authentication Service for Advanced Mobile Phone System", 1995 IEEE 45th Vehicular Technology Conference, Chicago, IL, pp. 175-179 + Cover Page, Jun. 25-28, 1995.

Wikipedia, "Ad Hoc On-Demand Distance Vector Routing," available at http://en.wikipedia.org/wiki/Ad_Hoc_On-Demand_Distance_Vector_Routing on Aug. 25, 2009, pp. 1-3.

Wikipedia, "Bellman-Ford Algorithm," available at http://en.wikipedia.org/wiki/Bellman-Ford.

Wikipedia, "Border Gateway Protocol," available at http://en.wikipedia.org/wiki/Border_Gateway_Protocol, Jun. 24, 2009, pp. 1-13.

Wikipedia, "Distance-Vector Routing Protocol," available at http://en.wikipedia.org/wiki/Distance-Vector_Routing_Protocol, Jun. 24, 2009, pp. 1-4.

Wikipedia, "Enhanced Interior Gateway Routing Protocol," available at http://en.wikipedia.org/wiki/EIGRP, Jun. 24, 2009, pp. 1-7.

Wikipedia, "Exterior Gateway Protocol," available at http://en.wikipedia.org/wiki/Exterior_Gateway_Protocol, Jun. 24, 2009, pp. 1.

Wikipedia, "Interior Gateway Routing Protocol," available at http://en.wikipedia.org/wiki/Interior_Gateway_Routing_Protocol, Jun. 24, 2009, pp. 1-2.

Wikipedia, "IS-IS," available at http://en.wikipedia.org/wiki/IS-IS, Jun. 24, 2009, pp. 1-3.

Wikipedia, "L. R. Ford, Jr.," available at http://en.wikipedia.org/wiki/L._R._Ford,_Jr, Jun. 24, 2009, pp. 1.

Wikipedia, "Open Shortest Path First," available at http://en.wikipedia.org/wiki/open_shortest_path_first.

Wikipedia, "Richard E. Bellman," available at http://en.wikipedia.org/wiki/Richard_Bellman, Jun. 24, 2009, pp. 1-3.

Wikipedia, "Routing Information Protocol," available at http://en.wikipedia.org/wiki/Routing_Information_Protocol, Jun. 24, 2009, pp. 1-4.

Will et al., "Wireless Networking for Control and Automation of Off-road Equipment," ASAE, Jul. 18-21, 1999, pp. 1-10.

Wilson, Lexicon 700t Touchscreen Remote, Jan. 1, 1999, available at http://avrev.com/home-theater-remotes-system-control/remotes-system on Mar. 2, 2009, pp. 1-3.

Wright (ed.), Home-automation networks mature with the PC industry chases a new home LAN, EDN Design Feature, Date: unknown, pp. 1-9.

Wu, Jie, "Distributed System Design", Department of Computer Science and Engineering, Florida Atlantic University, CRC Press, pp. 177-180, 204 + Cover Pages, 1999.

MacGregor et al., "Multiple Control Stations in Packet Radio Networks", Bolt, Beranek and Newman, Inc., Cambridge, MA, IEEE 1982, pp. 10.3-1-10.3-5, 1982.

Mak et al., "Design Considerations for Implementation of Large Scale Automatic Meter Reading Systems," IEEE Transactions on Power Delivery, vol. 10, No. 1, Jan. 1995, pp. 97-103.

Malkin, "RFC 2453, RIP Version 2 (Nov. 1998)," available at http://tools.ietf.org/html/rfc2453, Jun. 24, 2009, pp. 1-40.

Maltz et al., "Experiences Designing and Building a Multi-Hop Wireless Ad Hoc Network Testbed", School of Computer Science, Carnegie Mellon University, pp. 1-22, Mar. 5, 1999.

Maltz, "On-Demand Routing in Multi-Hop Wireless Mobile Ad Hoc Networks," Thesis, May 2001, pp. 1-192.

Marcy et al., "Wireless Sensor Networks for Area Monitoring and Iintegrated Vehicle Health Management Applications," Rockwell Science Center, Thousand Oaks, CA, AIAA-99-4557; Date: unknown, pp. 1-11.

Markie et al., "LonWorks and PC/104: A winning combination," PC/104 Embedded Solutions, Summer 1998, pp. 1-8.

Martel et al., "Home Automation Report: A Modular Minimum Complexity, High-Resolution and Low CostField Device Implementation for Home Automation and Healthcare," MIT; Publisher: unknown; Mar. 31, 1998; pp. 1-29.

McQuillan et al., "The ARPA Network Design Decisions," Computer Networks, vol. 1, No. 5, Aug. 1977 pp. 243-289.

McQuillan et al., "The New Routing Algorithm for the ARPANET," IEEE Transactions on Communications, vol. COM-28, No. 5, May 1980, pp. 711-719.

Mills, "Exterior Gateway Protocol Formal Specification" (Apr. 1984), RFC 904, available at http://tools.ietf.org/html/rfc904, Jun. 24, 2009, pp. 1-32.

Moorman, "Packet Radio Used in a Cost-Effective Automated Weather Meso-Net," available at http://www.wrh.noaa.gov/wrh/96TAs/TA963 1/ta96-31.html, Dec. 3, 1996 (5 pages).

Moy, "RFC 2328, OSPF Version 2 (Apr. 1998)," available at http://tools.ietf.org/html/rfc2328, Jun. 24, 2009, pp. 1-245.

Mozer et al., "The Neural Network House: An Overview," in L. Niklasson & Boden (eds.), Current trends in connectionism (pp. 371-380); Hillsdale: Erlbaun, 1995; pp. 1-9.

Murthy et al., "An Efficient Routing Protocol for Wireless Networks, Mobile Networks and Applications 1," (1996), pp. 183-197.

Natkunanathan et al. "WINS: Signal Search Engine for Signal Classification," EED, UCLA; Date: unknown; pp. 1-6.

Natkunanathan et al., "A Signal Search Engine for Wireless Integrated Network Sensors," EED, UCLA Electrical Engineering Department;; Date: unkown; pp. 1-4.

Negus et al., "HomeRF™ and SWAP: Wireless Networking for the Connected Home," ACM SIGMOBILE Mobile Computing and Communications Review, vol. 2, Issue 4, Oct. 1998, available at http://portal.acm.org/citation.cfm?id=1321400.1321401 on Mar. 29, 2009, pp. 1-2.

Negus et al., "HomeRF™ and SWAP: Wireless Networking for the Connected Home," Mobile Computing and Communications Review, vol. 2, No. 4, Date: unknown, pp. 28-37.

NEXTGEN Searches, "IPCO v. The Wireless Sensor Network Industry? Special Report on IPCO v. ONCOR et al.," Corporate Manager's Edition, 2009, pp. 1-16.

Nilsen et al., "Storage Monitoring Systems for the Year 2000," Dept. of Energy, Office of Scientific and Technical Information, Report No. SAND-97-8532C, available at http://www.osti.gov/bridge/product.biblio.jsp?query_id=3&,page=0&,osti id=303988 (1997).

Ondo, "PLRS/JTIDS Hybrid," Filled Artillery Journal, Jan.-Feb. 1981, pp. 20-25.

Oran (ed.), "OSI IS-IS Intra-Domain Routing Protocol," RFC 1142 (Feb. 1990), available at http://tools.ietf.org/html/rfc1142, Jun. 24, 2009, pp. 1-665.

Park et al., "SensorSim: A Simulation Framework for Sensor Networks," ACM, 2000, pp. 104-111.

Perkins et al., "A Mobile Networking System Based on Internet Protocol," Publisher: unknown, Date: unknown, pp. 1-17.

Perkins et al., "Ad-Hoc On-Demand Distance Vector Routing "AODV"," http://moment.cs.ucsb.edu/AODV/aodv.html, Aug. 25, 2009, pp. 1-5.

Perkins et al., "Continuous, transparent network access for portable users, A Mobile Networking System Based on Internet Protocol," IEEE Personal Communications, First Quarter 1994, pp. 32-41.

Perkins et al., "Highly Dynamic Destination-Sequenced Distance-Vector Routing (DSDV) for Mobile Computers," SIGCOM Conference on Communications Architectures, Protocols ans Applications, London England UK (Aug. 1994); pp. 234-244.

Perkins et al., "Mobility Support in IPv6," Internet Draft (Sep. 22, 1994), available at http://www.monarch.cs.rice.edu/internet-draft/draft-perkins-ipv6-mobility-sup-oo.txt., Sep. 26, 2009, pp. 1-13.

Perkins et al., "RFC3561—Ad Hoc On-Demand Distance Vector (AODV) Routing (Jul. 2003)," available at http://tools.ietf.org/html?rfc3561, Aug. 25, 2009, pp. 1-38.

Pittway Corporation, "Company History," available at http://www.fundinguniverse.com/company-histories/Pittway-Corporation Mar. 6, 2009, pp. 1-5.

Plaintiffs' Opening Markman Brief in Support of Their Proposed Claim Constructions, filed by the patent owner and its co-plaintiff in *SIPCO LLC et al.* v. *The Toro Co. et al.*, Case No. 2:08-cv-00505-TJS (E.D. Pa.) filed on Sep. 26, 2008.

Pleading—Defendant DIGI International Inc.'s First Amended Answer and Defenses of *SIPCO, LLC* v. *Control4 Corporation et al.*, Civil Action No. 6:10-cv-249, currently pending in the U.S. District Court for the Eastern District of Texas, Tyler Division, filed Nov. 22, 2010, pp. 1-27.

Pleading—Defendant Siemens Industry, Inc.'s First Amended Answer and Defenses of *SIPCO, LLC* v. *Control4 Corporation et al.*, Civil Action No. 6:10-cv-249, currently pending in the U.S. District Court for the Eastern District of Texas, Tyler Division, filed Nov. 22, 2010, pp. 1-27.

Pleading—Defendant The Toro Company, The Toro Company's Second Supplemented Objections and Answers to Plaintiffs SIPCO LLC and Advanced Sensor Technology, Inc.'s Interrogatory No. 4 to Defendant *The Toro Company of SIPCO LLC, et al.* v. *The Toro Company et al.*, Civil Action No. 08- CV-00505-TJS (pp. 1-9).

Pleading—Defendant The Toro Company, Third Supplemented Objections and Answers to Plaintiffs SIPCO LLC and Advanced Sensor Technology, Inc.'s Interrogatory No. 4 to Defendant *The Toro Company of SIPCO LLC, et al.* v. *The Toro Company et al.*, Civil Action No. 08-CV-00505-TJS (pp. 1-9).

Pleading—Expert Report of Randy H. Katz, Ph. D, of *SIPCO, LLC et al.* v. *The Toro Company et al.*, Case No. 2:08-cv-00505.

Poor, Robert D., "Hyphos: A Self-Organizing, Wireless Network," Massachusetts Institute of Technology (Jun. 1997).

Postel (ed.), "Transmission Control Protocol, Version 4," RFC793, available at http://www.faqs.org/rfcs/rfc793.html, Sep. 1981, pp. 1-85.

Postel (Editor), "Internet Protocol, DARPA Internet Program Protocol Specification," RFC 791 (Sep. 1981), Information Sciences Institute, University of So. Cal., pp. 1-45.

Pottie et al., "Adaptive Wireless Arrays for Interactive RSTA in SUO (AWAIRS)," UCLA, Electrical Engineering Department; Date: unknown, pp. 1-20.

Pottie et al., "Adaptive Wireless Arrays Interactive Recconaissance, Surveillance, and Target Acquisition in Small Unit Operations (AWAIRS); Lower Power Wireless Integrated Microsensors (LWIM)," Presented to Dr. E. Carapezza, Dr. D. Lao and Lt. Col. J. Hernandez, UCLA, Rockwell Science Center; Mar. 21, 1997, pp. 1-110.

Pottie et al., "WINS: Principles and Practice," EDD, UCLA; Date: unknown, pp. 1-10.

Pottie et al., "Wireless Integrated Network Sensors," Communications of the ACM, vol. 43, No. 5, May 2000, pp. 51-58.

Pottie et al., "Wireless Integrated Network Sensors: Towards Low Cost and Robust Self-Organizing Security Networks;" EED, UCLA; Rockwell Science Center; SPIE vol. 3577, Nov. 1, 1998, pp. 86-95.

Pottie, "AWAIRS: Mini-Site Review, Project Status," UCLA: Rockwell Science Center, Feb. 23, 1998, pp. 1-58.

Pottie, "Hierarchical Information Processing in Distributed Sensor Networks," ISIT, Aug. 16-21, 1998, IEEE, 1998, pp. 163.

Pottie, "R&D Quarterly and Annual Status Report," SPAWAR (contractor), Apr. 31, 1999.

Pottie, "Wireless Sensor Networks," ITW 1998, Jun. 22-26, 1998, available at http://dantzig.ee.ucla.edu/oclab/Pottie.html, 2 pages.

Printout of 47 C.F.R. 15 (131 pages).

Rabaey et al., "PicoRadio Support Ad Hoc Ultra-Low Power Wireless Networking," Computer, IEEE, Jul. 2000, pp. 42-48.

Radlherr, "Datentransfer Ohne Draht and Telefon," Funkschau, Nov. 1991, pp. 49-52.

Raji, "Control Networks and the Internet, Rev. 2.0," Echelon Corp., 1998, pp. 1-39.

Raji, "End-to-End Solutions with LonWorks® Control Technology: Any Point, Any Time, Any Where," Echelon Corp.;, 1998, pp. 1-30.

Raji, "Control Networks and the Internet," Echelon Corp., Rev. 2.0, available at http://www.echelon.com/solutions/opensystems/papers/Control_Internet.pdf (1998).

Rants and Ramblings, "Go Wireless . . . At a Payphone," May 10, 2003, http://www.morethanthis.net/blog/archives/2003/05/10/000301.html (2 pages).

Prophet, Graham, Living in a Wireless Wonderland, available at http://www.ednmag.com/infoaccess.asp, Jun. 5, 2010, pp. 79-94.

U.S. Appl. No. 12/816,266 Non-Final Office Action dated Jun. 15, 2011.

U.S. Appl. No. 12/169,536 Non-Final Office Action dated Jun. 8, 2011.

U.S. Appl. No. 12/169,536 Non-Final Office Action dated Nov. 21, 2011.

U.S. Appl. No. 12/689,220 Final Office Action dated Oct. 5, 2011.

U.S. Appl. No. 12/482,892 Non-Final Office Action dated Jun. 28, 2011.

U.S. Appl. No. 12/482,892 Non-Final Office Action dated Nov. 25, 2011.

\* cited by examiner

SYSTEM AND METHOD FOR MONITORING REMOTE DEVICES WITH A DUAL-MODE WIRELESS COMMUNICATION PROTOCOL

CROSS REFERENCE TO RELATED APPLICATIONS AND PRIORITY CLAIM

This application is a continuation of U.S. patent application Ser. No. 10/792,608, entitled, "System and Method for Monitoring Remote Devices with a Dual-Mode Wireless Communication Protocol," filed on Mar. 3, 2004, which is incorporated herein by reference in its entirety as if fully set forth below.

BACKGROUND SECTION

Prior art monitoring and controlling systems for various applications, such as automated meter reading, prognostics, vending machines, and fire alarm and sprinkler systems utilize various communication protocols. Generally, these protocols utilize wireless RF communications either between transceivers or between a plurality of transceivers and a remote interrogator. The remote interrogator may then be coupled to a wide area network (WAN) which enables access to the transceivers by backend servers, workstations, etc.

In some instances, the RF transceivers may utilize a single-channel, substantially low-power communications protocol and, thus, have a limited range. The low-power applications are advantageous in certain remote applications, where a constant power supply is not available. For example, a transceiver coupled to a water meter cannot tap into any local power at the water meter, because typically there is no power. In this case, a battery is typically used. In order to maximize the life span of the battery, low-power transmissions are used. Low-power transmissions may also be advantageous because at certain frequency bands, a license from the Federal Communication Commission (FCC) is not required. The FCC requires certain devices to be licensed and/or comply with certain provisions if the devices radiate enough power within a given frequency spectrum over a given period.

Unfortunately, there are drawbacks to a low-power, single-channel communication protocol. In particular, the range of communication is directly proportional to the level of radiated power. Therefore, low power implies shorter communication range. Shorter communication range generally requires more infrastructure in a wireless system. Furthermore, single-channel communications (e.g., communications within one frequency channel, or on one carrier frequency) can be a problem if there is other electromagnetic radiation in a given area. Interference from other devices may cause noise at or near the specific single channel in which the RF transceivers are attempting to communicate, thus making communication unreliable, if not unfeasible.

Considering these drawbacks, it would be desirable to have a communication protocol that overcomes the disadvantages illustrated above. Furthermore, it would be advantageous for a systems provider for the communication devices (i.e., the RF transceivers and gateways) to be compatible with both communications protocols so that a communication upgrade would not require existing devices to be replaced. Instead the existing devices could be upgraded remotely through the system.

SUMMARY

Various embodiments of a dual-mode communication protocol, and corresponding systems, devices, methods, and computer programs, are provided. One embodiment is a system for monitoring and controlling remote devices. The system includes a first and a second remote device; and a first and a second wireless transceiver integrated with said respective remote devices. The wireless transceivers are configured to communicate with at least one of a spread-spectrum communication protocol and a fixed-frequency communication protocol.

Another embodiment is a system for monitoring the utility consumption measured by a plurality of utility meters. The system includes a plurality of utility meters and a network of wireless RF transceivers for communicating utility consumption data. The network of wireless RF transceivers is comprised of at least a first dual-mode transceiver, at least a first fixed-frequency transceiver, and at least a first spread-spectrum transceiver. The system further includes at least a first gateway in communication with each wireless RF transceiver either directly or via other wireless RF transceivers. The at least first gateway relays data from the network of wireless RF transceivers to a back-end system.

Yet another embodiment is a wireless transceiver used within a system for monitoring remote devices. The wireless transceiver includes an RF transceiver for communicating in at least one of a spread-spectrum communication protocol and a fixed-frequency communication protocol and a data controller coupled to the RF transceiver for processing data to be either transmitted by or received from the RF transceiver. The wireless transceiver also includes memory for storing various logic to be performed by the data controller and the RF transceiver for communicating in at least one of the communication protocols.

BRIEF DESCRIPTION OF THE DRAWINGS

The accompanying drawings incorporated in and forming a part of the specification, illustrate several aspects of the present invention, and together with the description serve to explain the principles of the invention.

DETAILED DESCRIPTION

Embodiments illustrated in further detail below illustrate various systems, methods, devices, and programs for communicating in a dual-mode communication protocol. A first communication protocol may generally be considered a fixed-frequency communication protocol and a second communication protocol may generally be considered a spread-spectrum communication protocol.

An embodiment of a transceiver communicating in a fixed-frequency communication protocol is generally configured to communicate a communication packet at a single frequency channel, with a first modulation scheme, at a given radiating power level.

An embodiment of a transceiver communicating in a spread-spectrum communication protocol is generally configured to communicate a first portion of a communication packet at a first frequency channel, and then communicate a second portion of the communication packet at a second frequency channel. The spread-spectrum communication protocol may employ a second modulation scheme, at a given radiating power level.

An embodiment of a transceiver communicating in the dual-mode communication protocol can generally communicate in both communication protocols. By providing for both communication protocols, the disadvantages of utilizing one singular protocol may be avoided. The accompanied figures and description illustrate embodiments of the dual-mode communication protocol in further detail.

Figure 1:
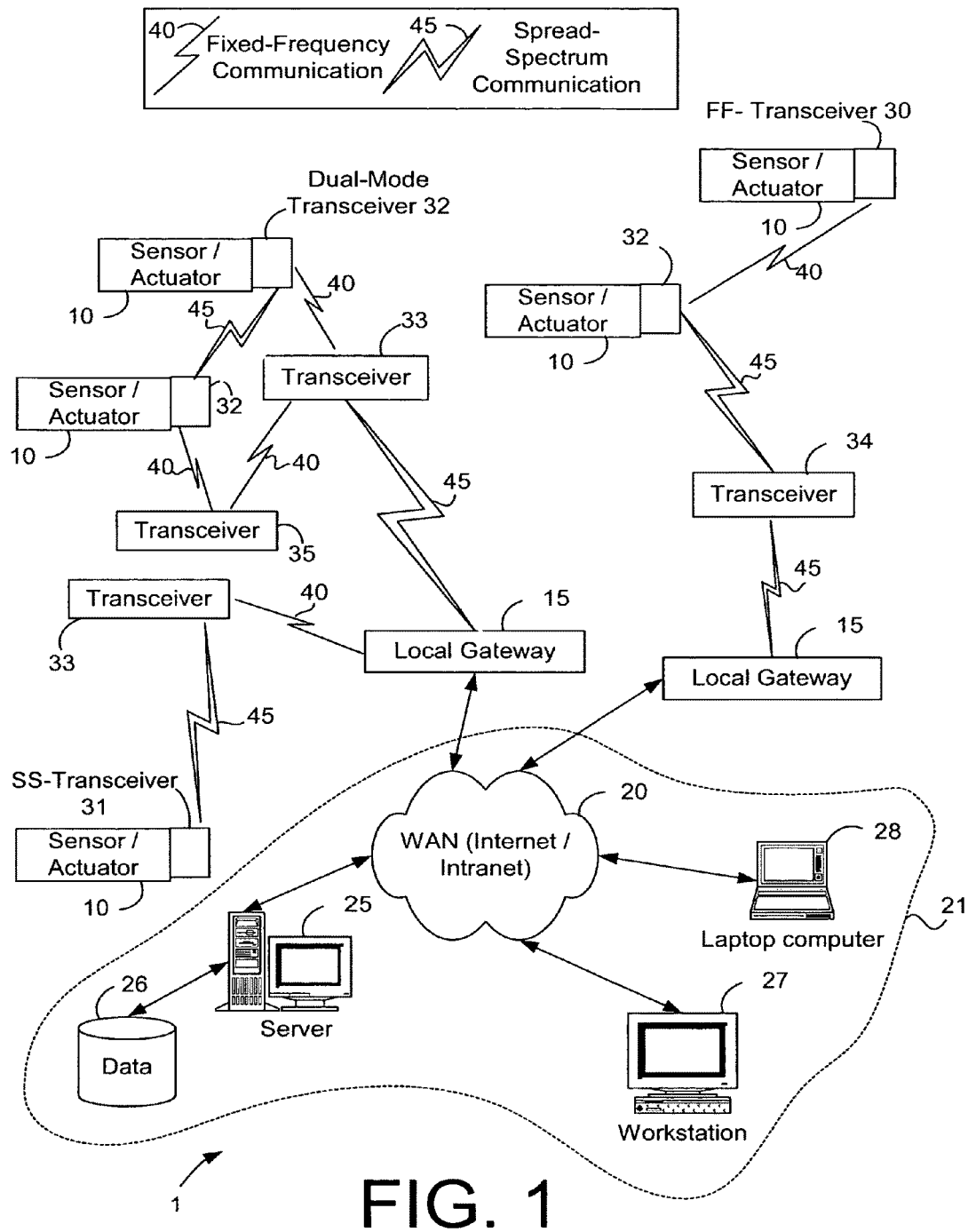
FIG. 1 is a block diagram illustrating an embodiment of a dual-mode monitoring/control system.

Turning now to FIG. 1, illustrated is a block diagram of an embodiment of a dual-mode monitoring/control system 1. Dual-mode system 1 comprises one or more external devices to be monitored and/or controlled (e.g., sensor/actuators 10) as illustrated in FIG. 1. Each sensor/actuator may be integrated with a transceiver 30, 31, or 32. The transceivers 30-32 are preferably RF (radio frequency) transceivers that are relatively small in size. Depending on the communication mode utilized, the transceivers 30-32 transmit either a relatively low-power RF signal, or a higher-power RF signal. As a result, in some applications, the transmission range of a given transceiver may be relatively limited. Although the transceivers 30-32 are depicted without a user interface such as a keypad, in certain embodiments, the transceivers 30-32 may be configured with user selectable buttons or an alphanumeric keypad. The transceivers 30-32 may be electrically interfaced with the device to be monitored and/or controlled, such as a smoke detector, a thermostat, a security system, etc., where external buttons are not needed.

Dual-mode system 1 also includes a plurality of stand-alone transceivers 33-35, which may be fixed or mobile. Each stand-alone transceiver 33-35 and each of the integrated transceivers 30-32 may be configured to receive an incoming RF transmission (transmitted by a remote transceiver) and to transmit an outgoing signal. The transceivers depicted in FIG. 1 may include different functionality depending on whether the transceiver communicates in a fixed-frequency communication mode, a spread-spectrum communication mode, or both. These communication modes, or protocols, will be discussed in further detail in subsequent figures. All transceivers may include the hardware and/or software to communicate in either of the protocols, but may be programmed or configured to communicate in only one or the other, or both, Fixed-frequency transceiver 30 is an integrated transceiver that is configured to communicate only with the fixed-frequency communication protocol. In general, the fixed-frequency communication protocol is any protocol in which a packet or frame of data is communicated within a single frequency channel. Transceiver 35 is the stand-alone counterpart to transceiver 30. A fixed-frequency communication link is illustrated in FIG. 1 with a thin communication bolt designated with numeral 40.

Spread-spectrum transceiver 31 is an integrated transceiver that is configured to communicate only with the spread-spectrum communication protocol. The spread-spectrum communication protocol will be discussed in further detail, but in short, is a protocol that facilitates frequency-channel hopping within a given frequency band. Transceiver 34 is the stand-alone counterpart to transceiver 31. A spread-spectrum communication link is denoted in FIG. 1 with a wide communication bolt and given numeral 45.

Dual-mode transceiver 32 is an integrated transceiver that is configured to communicate with either of the two aforementioned protocols. Transceiver 33 is the stand-alone counterpart to the dual-mode transceiver 32.

Notably, each transceiver can communicate only with another transceiver configured for similar protocols. In other words, a fixed-frequency transceiver 30, 35 cannot communicate with a spread-spectrum transceiver 31, 34. This, however, can be reasonably obviated by deploying dual-mode transceivers 32, 33 into the wireless infrastructure.

Figure 4:
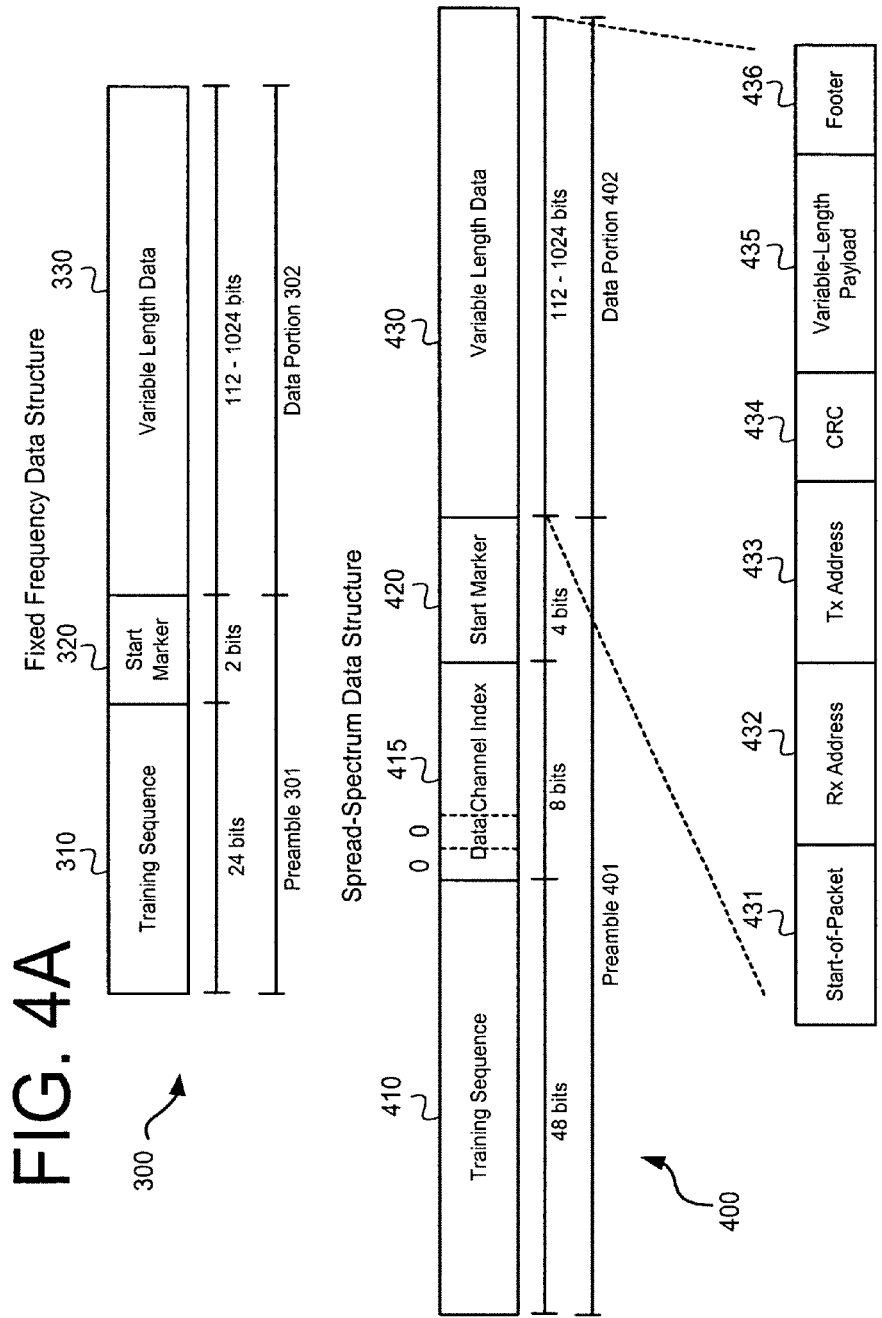
FIG. 4A is a data structure illustrating an embodiment of a fixed-frequency communication packet for the system of FIG. 1.
FIG. 4B is a data structure illustrating an embodiment of a spread-spectrum communication packet for the system of FIG. 1.

The specifics of a fixed-frequency communication 40 will be discussed in further detail in FIG. 4A and the specifics of a spread-spectrum communication 45 will be discussed in further detail in FIG. 4B. Both communications, however, are preferably wireless, RF transmissions, and more preferably, in the 902-928 MHz frequency range. Although this is preferable, in other embodiments, alternative frequency ranges may be employed. Furthermore, each communication may be transmitted over a conductive wire, fiber optic cable, or other transmission media.

The internal architecture of a transceiver 30-32 integrated with a sensor/actuator 10 and a stand-alone transceiver 33-35 will be discussed in more detail in connection with FIG. 2. It will be appreciated by those skilled in the art that integrated transceivers 30-32 can be replaced by RF transmitters (not shown) for client specific applications that only require data collection only.

Local gateways 15 are configured and disposed to receive remote data transmissions from the various stand-alone transceivers 33-35 or integrated transceivers 30-32 having an RF signal output level sufficient to adequately transmit a formatted data signal to the gateways. Local gateways 15 can communicate in either of the two aforementioned communication protocols. Thus, for the purpose of this document, they will be considered dual-mode gateways 15. In other embodiments, local gateways 15 may be capable of communicating in only one of the aforementioned protocols.

Local gateways 15 analyze the transmissions received, convert the transmissions into TCP/IP format (or other protocol), and further communicate the remote data signal transmissions to back-end system 21 via WAN 20. In this regard, and as will be further described below, local gateways 15 may communicate information, service requests, control signals, etc., to integrated transceivers 30-32 from server 25, laptop computer 28, and workstation 27 across WAN 20. Server 25 can be further networked with database server 26 to record client specific data. Server 25, laptop computer 28, and workstation 27 are capable of remotely controlling and/or configuring various functions of the transceivers. For instance, server 26 is capable of remotely controlling the communication protocol in which each transceiver can communicate. This can be accomplished by sending a downstream control signal and/or by sending a software/firmware upgrade downstream.

It will be appreciated by those skilled in the art that if an integrated transceiver (either of 30-32) is located sufficiently close to dual-mode local gateways 15 to receive RF data signals, the RF data signal need not be processed and repeated through stand-alone transceivers 33-35. It will be further appreciated that the system 1 may be used in a variety of environments. In one embodiment, system 1 may be employed to monitor and record utility usage of residential and industrial customers. In another embodiment, system 1 may be configured for the transfer of vehicle diagnostics from an automobile via an RF transceiver integrated with the vehicle diagnostics bus to a local transceiver that further transmits the vehicle information through a local gateway onto a WAN.

Generally, transceivers 30-32 may have similar construction (particularly with regard to their internal electronics) where appropriate, which provides a cost-effective implementation at the system level. Alternatively, fixed-frequency transceiver 30 may include some different internal electronics then spread-spectrum transceiver 31. Furthermore, dual-mode transceiver 32 may include different internal electronics as transceivers 30 and 31. Stand-alone transceivers 33-35 may include similar communication components as their integrated counterparts. The necessary hardware and software to integrate with a sensor/actuator 10 may, however, be excluded.

As illustrated in FIG. 1, stand-alone transceivers 33-35 are disposed to provide adequate coverage in a desired geographic area (e.g., an industrial plant or community), which is based on the particular system application. Preferably, stand-alone transceivers 33-35 may be dispersed so that at least one stand-alone transceiver will pick up a transmission from a given integrated transceiver 30-32. However, in certain instances, two or more stand-alone transceivers may pick up a single transmission. Thus, local gateways 15 may receive multiple versions of the same data transmission signal from an integrated transceiver, but from different stand-alone transceivers. Local gateways 15 may utilize this information to triangulate, or otherwise more particularly assess the location from which the transmission is originating. Due to the transmitting device identification that is incorporated into the transmitted signal, duplicative transmissions (e.g., transmissions duplicated to more than one gateway, or to the same gateway, more than once) may be ignored or otherwise appropriately handled.

Integrated transceivers 30-32 may be implemented in a variety of devices. For example, integrated transceivers 30-32 may be disposed within automobiles, a rainfall gauge, a parking lot access gate, and utility meters to monitor vehicle diagnostics, total rainfall and sprinkler supplied water, access gate position, and utility consumption, to name a few. The advantage of integrating a transceiver, as opposed to a one-way transmitter, into a monitoring device relates to the ability of the transceiver to receive incoming control signals, as opposed to merely transmitting data signals. Significantly, local gateways 15 may communicate with all system transceivers. Since local gateways 15 are integrated with WAN 20, server 25 can host application specific software that is typically hosted in an application specific local controller. Of further significance, the data monitoring and control devices need not be disposed in a permanent location. Provided the monitoring and control devices remain within signal range of a system compatible transceiver, which is within signal range of local gateway 15 interconnected through one or more transceiver networks to server 25. In this regard, small application specific transmitters compatible with system 1 can be worn or carried about one's person or coupled to an asset to be tracked and monitored.

In one embodiment, server 25 collects, formats, and stores client specific data from each of the integrated transceivers 30-32 for later retrieval or access from workstation 27 or laptop 28. In this regard, workstation 27 or laptop 28 can be used to access the stored information through a Web browser in a manner that is well known in the art. In another embodiment, server 25 may perform the additional functions of hosting application specific control system functions and replacing the local controller by generating required control signals for appropriate distribution via WAN 20 and local gateways 15 to the system sensors/actuators. In a third embodiment, clients may elect for proprietary reasons to host control applications on their own WAN connected workstation. In this regard, database 26 and server 25 may act solely as a data collection and reporting device with client workstation 27 generating control signals for the system 1.

It will be appreciated by those skilled in the art that the information communicated by the transceivers 30-35 may be further integrated with other data transmission protocols for transmission across telecommunications and computer networks other than the Internet. In addition, it should be further appreciated that telecommunications and computer networks other than the Internet can function as a transmission path between the transceivers, the local gateways, and the central server. For example, an integrated transceiver may communicate with a stand-alone transceiver in a RF communication scheme. The stand-alone transceiver may communicate with the gateway 15 in a cellular communication scheme, such as GSM or PCS. The gateway 15 may communicate with the back-end system 21 via satellite, POTS, or the Internet.

Figure 2:
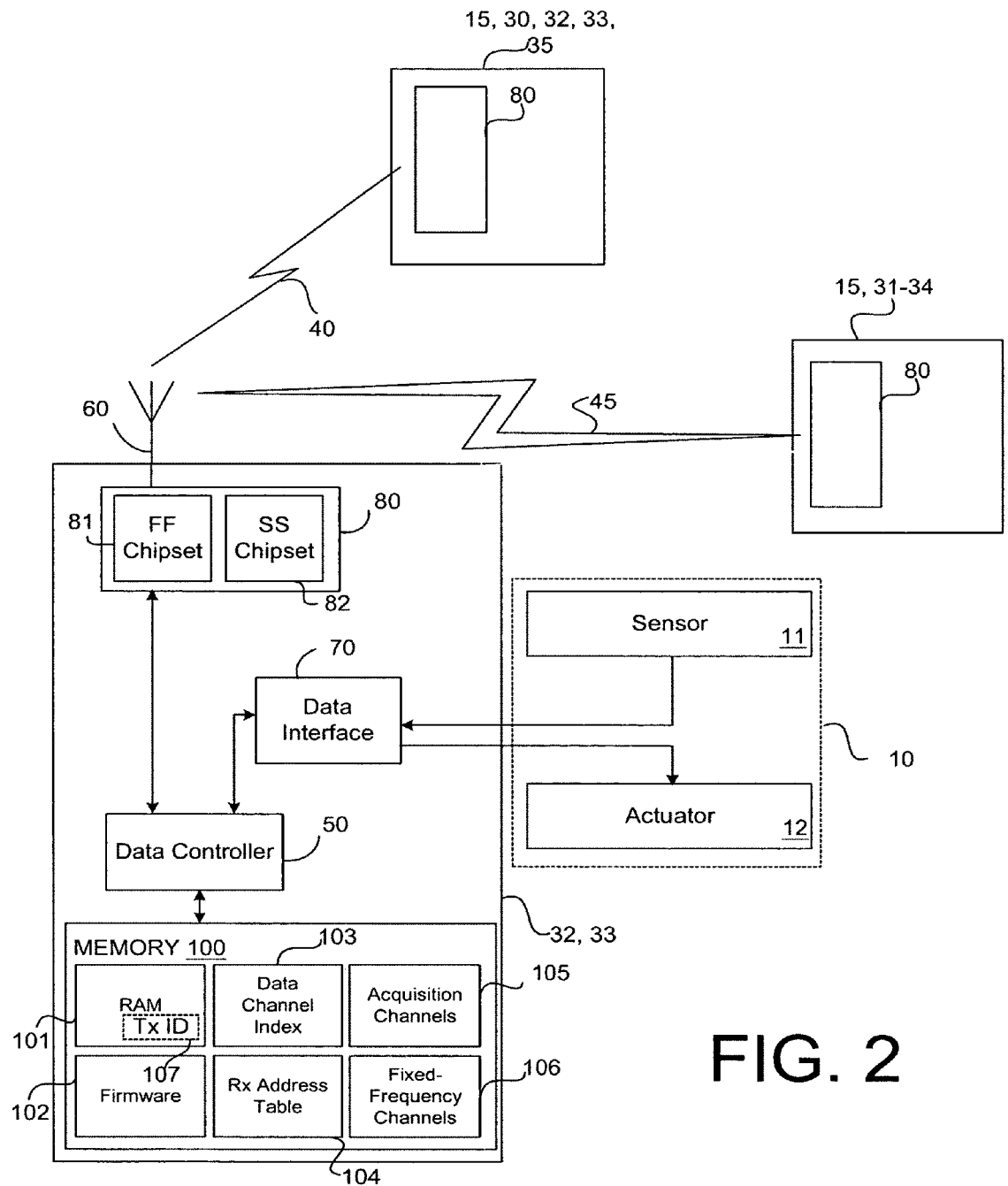
FIG. 2 is a block diagram illustrating the functional components of an embodiment of a dual-mode transceiver of the system of FIG. 1.

Reference is now made to FIG. 2, which is a block diagram that illustrates functional components of an embodiment of a dual-mode transceiver 32, 33. Dual-mode transceiver 32, 33 may communicate with another transceiver 30, 32, 33, and 35 or gateway 15 with the fixed-frequency communication protocol, or may communicate with another transceiver 31-34 or gateway 15 with the spread-spectrum communication protocol.

The integrated dual-mode transceiver 32 is coupled to external devices 10, for example, sensor 11 and actuator 12, by way of data interface 70. Data interface 70 is configured to receive electrical signals from sensor 11 and provide electrical signals to actuator 12, and ultimately convey such information to and from a data controller 50. In one embodiment, data interface 70 may simply comprise an addressable port that may be read by the data controller 50. Dual-mode transceiver 33 is a stand-alone transceiver, thus may not include the data interface 70 for coupling to external components 10, such as sensor 11 and actuator 12.

Data controller 50 is coupled to memory 100 which stores various software, firmware, and other logic. Further coupled with data controller 50 is an RF transceiver 80 which is used to convert information received from data controller 50 in digital electronic form into a format, frequency, and voltage level suitable for transmission from antenna 60 via an RF transmission medium. RF transceiver 80 also converts a received electromagnetic signal from antenna 60 into digital electronic form for data controller 50 to process.

Data controller 50 may be considered a micro-controller or micro-processor and, as such, is configured for performing the data processing for the transceiver 32, 33. Data controller 50 is configured to perform operations as directed by firmware 102 stored in memory 100. These operations include data formatting for communication in both modes of communication, as well as data formatting for communication with sensor 11 and actuator 12 (if so equipped).

RF transceiver 80 of dual-mode transceiver 32, 33 may include distinct chipsets for each communication protocol: a fixed-frequency communication protocol chipset (FF chipset) 81 and a spread-spectrum communication protocol chipset (SS chipset 82). Chipsets 81 and 82 include the necessary components for transmitting and receiving in the particular communication protocols. For example, FF chipset 81 includes the components for communicating in a first modulation scheme, at a given power level, and in a particular frequency band in accordance with the fixed-frequency communication protocol. SS chipset 82 includes the components for communicating in a second modulation scheme, at a given power level, and in another particular frequency band in accordance with the spread-spectrum communication protocol. In other embodiments, the chipsets may be fully integrated.

Fixed-frequency transceivers 30 and 35 may differ from dual-mode transceivers 32 and 33 because they may not include SS chipset 82. Alternatively, data controller 50 for fixed-frequency transceivers 30 and 35 may not be programmed, by firmware 102, for communicating in the spread-spectrum communication protocol. As will be discussed shortly, certain modules of memory 100 which are included in dual-mode transceivers 32 and 35 may not be included in fixed-frequency transceivers 30 and 35.

Likewise, spread-spectrum transceivers 31 and 34 may differ from dual-mode transceivers 32 and 33 because they may not include FF chipset 81. Alternatively, data controller 50 for the spread-spectrum transceivers 31 and 34 may not be programmed, by firmware 102, to communicate in the fixed-frequency communication protocol.

Memory 100 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 100 may incorporate electronic, magnetic, optical, and/or other types of storage media. Memory 100 can have a distributed architecture, where various components are situated remote from one another, but can be accessed by the data controller 50. Modules included in the memory 100 of a dual-mode transceiver 32 and 33 are a data channel index table 103, an acquisition channels table 105, a fixed-frequency channels table 106, a receiver (Rx) address table 104, firmware 102, RAM 101, and a transceiver identification (Tx ID) 107.

The data channel index table 103 is utilized for communication in the spread-spectrum communication protocol. The contents of the data channel index table 103 will become clearer as the spread-spectrum communication protocol is laid out in subsequent figures. In short, the data channel index table 103 includes a list of data channel frequencies in which a data portion of a communication packet may be communicated. Each data channel is given an index that RF transceiver 80 will recognize, and furthermore can be communicated in a preamble of a communication packet. A receiving transceiver 31-34 or gateway 15 will need to recover the data channel index from the preamble to properly receive the remainder of a communication packet. In the preferred embodiment, there are 40 frequency channels dedicated for data communication each channel designated by a unique data channel index. One will appreciate that the number of channels is not relevant. Accordingly, in other embodiments, the number of channels may vary.

The acquisition channels table 105 is utilized for communication in the spread-spectrum communication protocol. The acquisition channels table 105 includes a list of frequency channels designated for synchronizing communication with another transceiver and for communicating in a preamble of a communication packet. In the preferred embodiment there are ten designated acquisition channels, although this number can vary. An understanding of the acquisition channels table 105 will become clearer upon further explanation of the spread-spectrum communication protocol.

The fixed-frequency channels table 106 is utilized for communication in the fixed-frequency communication protocol. The fixed-frequency channels table 106 includes a list of frequency channels designated for synchronizing communication and subsequently communicating the data portion of a communication packet. In the preferred embodiment, there are eight fixed-frequency channels. An understanding of the fixed-frequency channels table 106 and its associated fixed-frequency channels will become clearer upon further explanation of the dual-mode communication protocol.

Each transceiver is configured to have a unique identification code 107 (e.g., transceiver identification number—Tx ID), that uniquely identifies the transceiver to the functional blocks of control system 1 (see FIG. 1). This transceiver identification number 107 may be electrically programmable, and implemented in the form of, for example, an EPROM. Alternatively, the transceiver identification number 107 may be set/configured through a series of DIP switches, or stored in RAM. Alternative methods of setting and configuring the transceiver identification number 107 may be implemented.

Rx address table 104 is generally a look-up table of transceiver identification numbers (Tx IDs), or addresses, of other transceivers in a given network in the system 1 and is called upon when preparing a communication packet to be transmitted. Each communication packet transmitted by any transceiver 30-35, or gateway 15, is destined for a particular transceiver as designated by the transceiver identification number 107 embedded within the communication packet for either communication protocol (to be illustrated in FIG. 4). As a transceiver receives various packets, it can distinguish, by the transceiver identification number embedded in the communication packet, whether that packet is destined for that transceiver. Otherwise, the transceiver may disregard the packet and/or relay the packet along to another transceiver. The specifics of how a communication packet is processed upon reception, including relaying the packet, is generally beyond the scope of the present invention.

The Rx address table 104 may also include more information about other transceivers, such as the communication protocol with which the other transceivers communicate. Furthermore, the desired modulation scheme(s) with which the other transceivers communicate as well as a necessary radiating-power level. Importantly some or all of the contents of the Rx address table 104 can be updated remotely, for instance, by server 26.

Firmware 102 includes the logic for operating data controller 50 in accordance with embodiments of the present invention. Logic configured to perform operations as laid out in flow charts illustrated in subsequent figures is found in firmware 102, along with programming logic for communicating with data interface 70 and its coupled components 10. Other programming logic may be incorporated in the firmware 102 as known by those of ordinary skill in the art, such as power conservation sequences, power-up and power-down sequences, and operating system upgrade sequences.

Sensor 11, in its simplest form, could be a two-state device such as a smoke alarm. Alternatively, the sensor 11 may output a continuous range of values to the data interface 70. If the signal output from the sensor 11 is an analog signal, the data interface 70 may include an analog-to-digital converter (not shown) to convert signals output to the actuator 12. Alternatively, a digital interface (communicating digital signals) may exist between the data interface 70 and each sensor 11. In FIG. 2, data interface 70 is shown with a single input from sensor 11. It is easy to envision a system that may include multiple sensor inputs. By way of example, a common home heating and cooling system might be integrated with the present invention. The home heating system may include multiple data interface inputs from multiple sensors. A home thermostat control connected with the home heating system could be integrated with a sensor that reports the position of a manually adjusted temperature control (i.e., temperature set value), as well as, a sensor integrated with a thermostat to report an ambient temperature. The condition of related parameters can be input to data interface 70 as well, including the condition of the system on/off switch, and the climate control mode selected (i.e., heat, fan, or AC). In addition, depending upon the specific implementation, other system parameters may be provided to data interface 70 as well.

The integration with an actuator 12 permits data interface 70 to apply control signals to a manual temperature control for the temperature set point, a climate control mode switch, and a system on/off switch. In this way, a remote workstation 27 or laptop 28 with WAN access (see FIG. 1) could control a home heating system from a remote location.

The operation of an embodiment of transceiver 32, 33 is best illustrated in the flow charts of FIGS. 5-8. However, a brief explanation of the operation should be made with reference to the particular components illustrated in the block diagram of FIG. 2. The dual-mode transceiver 32, 33, as its name implies, can communicate in any one of two modes or protocols: the fixed-frequency communication protocol and the spread-spectrum communication protocol.

Figure 3:
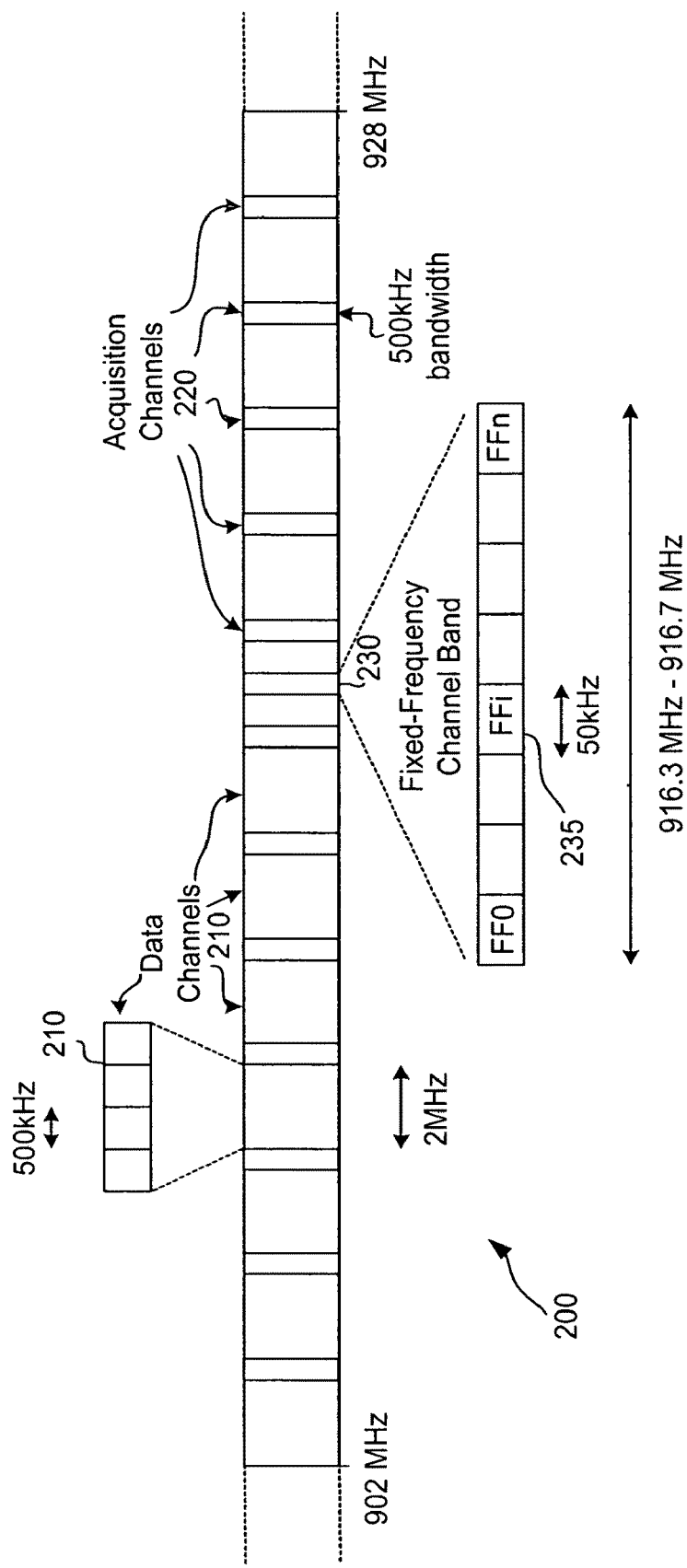
FIG. 3 is an illustration of an exemplary frequency band implemented in the system of FIG. 1.

When transmitting in the fixed-frequency communication protocol, data controller 50 will build a fixed-frequency communication packet (described in FIG. 4A) and pass that along to the RF transceiver 80 for communication. A communication packet is transmitted in the fixed-frequency communication protocol by transmitting at a dedicated channel, where the dedicated channel is one of the fixed-frequency channels (as illustrated in FIG. 3). Preferably, the dedicated channel for transmission is the center channel of the fixed-frequency band, which, in the case of FIG. 3, is the 916.5 MHz channel. Alternatively, building the fixed-frequency communication packet may involve querying the fixed-frequency channels table 106 to find the next fixed-frequency channel in which to communicate. The selected frequency channel is communicated to the FF chipset 81 along with the communication packet. In another alternative, the FF chipset 81 may be configured to cycle through the designated fixed-frequency channels without having to receive an index or pointer to a channel from the memory 100. In this alternative embodiment, the fixed-frequency channel table 106 may be excluded from the memory 100 and stored instead in memory integrated in with the FF chipset 81. The payload portion of the communication packet is populated with the relevant information to be communicated, which may include information received from the data interface 70. The data controller 50 may query the Rx address table 104 to make sure the destined transceiver can communicate in the fixed-frequency communication mode. After the packet is assembled it is passed along to the transceiver 80 for transmission.

FF chipset may receive in the fixed-frequency communication mode by cycling through the fixed-frequency channels to look for a carrier signal. Once found and synchronized, the packet communicated at that carrier channel is received and passed along to the data controller 50 for processing. Processing of the data may include preparing a reply signal, updating information in memory 100, and/or controlling actuator 12 or other external component 10.

When transmitting in the spread-spectrum communication protocol, the data controller 50 will build a spread-spectrum communication packet (as illustrated in FIG. 4B). The spread-spectrum communication protocol is built by querying the acquisition channels table 105 to find the next acquisition channel in which to send a preamble of the communication packet. Alternatively, the SS chipset 82 may be configured to cycle through the designated acquisition channels without having to receive an index or pointer to a channel from the memory 100. In this alternative embodiment, the acquisition channel table 105 may be excluded from the memory 100 and stored instead in memory integrated with the SS chipset 82. The preamble of the communication packet may also be prepared by querying the data channel index table 103 to find which data channel to communicate the payload portion of the packet. The index to the designated data channel is populated within the preamble. The payload portion of the communication packet is populated and formatted in a similar manner as the fixed-frequency communication protocol calls for. The communication packet is then passed along to RF transceiver 80 for transmission.

SS chipset 82 prepares the preamble of the communication packet for transmission at the designated acquisition channel frequency. Upon completing transmission of the preamble, SS chipset 82 then transmits the remainder of the communication packet at the frequency designated by the data channel index. Typically, this requires SS chipset 82 to change frequency channels mid-communication packet. In some special cases, however, the designated data-channel may be the same as the acquisition channel, which is essentially equivalent to the fixed-frequency communication protocol.

Importantly, communicating with the two communication protocols also provides the opportunity to communicate in two different modulation schemes. This is beneficial because the drawbacks of each can be countered with the advantages of the other. In one embodiment, the fixed-frequency communication protocol uses an amplitude modulation scheme, such as on-off keying (OOK). The spread-spread communication protocol uses a frequency modulation scheme, such as frequency shift-keying (FSK). These are merely exemplary modulation schemes that can be utilized. Those of skill in the art will appreciate that various modulation schemes may be utilized. Furthermore, in some embodiments, the two communication protocols may utilize the same modulation scheme. The particular modulation scheme used for each communication protocol by each transceiver can be remotely controlled by devices in the back-end system 21. Control commands can be received downstream to change the particular modulation scheme to be utilized.

FIG. 3 is an illustration of an embodiment of a preferred frequency band 200 at which the dual-mode transceivers communicate. The illustrated frequency band 200 is the 902-928 MHz band, which falls in the ultra high-frequency (UHF) radio band. Other frequency bands may be utilized. The 902-928 MHz band may be advantageous in certain situations because communication ion this band may not require licensing by the FCC, provided signal radiations remain below a given power threshold.

In the embodiment illustrated in FIG. 3, the 902-928 MHz frequency band is divided into a first set of channels designated as spread-spectrum communication channels and a second set of channels designated as fixed-frequency communication channels. The spread-spectrum communication channels are further divided into subsets of acquisition channels 220 and data channels 210. In the embodiment illustrated in FIG. 3, there are fifty spread-spectrum communication channels, of which ten are designated as acquisition channels 220 and forty are designated as data channels 210. Each channel comprises 500 kHz, with the carrier frequency being centered within the 500 kHz.

In other embodiments, the number of spread-spectrum communication channels, as well as the number of acquisition channels 220 and data channels 210 may be different. Furthermore, in some embodiments, the acquisition channels 220 and data channels 210 may overlap. In order to comply with certain provisions of Part 15 of the FCC's Guidelines for Operation (which is hereby incorporated by reference in its entirety), fifty channels are necessary for spread-spectrum communication. Embodiments of the present invention comply with the FCC's guidelines for communicating at a higher power level. By communicating at a higher power level, longer range communications and/or greater signal penetrations are possible, which is very advantageous for many applications in which system 1 may be utilized.

In one embodiment, the acquisition channels 220 are separated from each other by four data channels 210, thus providing 2 MHz of bandwidth between acquisition channels 220. The acquisition channels 220 are spread evenly across the entire frequency band 200 to spread the power spectral density across the entire frequency band. Again, this pattern can vary greatly, and should not be limited the embodiments illustrated in FIG. 3. For example, the acquisition channels 220 can be grouped together at various sections of the frequency band 200. One must consider, however, complying with the FCC's guidelines when designating the acquisition channels. The acquisition channels 220 may be evenly utilized because each transceiver is configured to cycle through the acquisition channels 220, upon transmission, in either a predetermined and/or pseudorandom pattern. The data channels 210 may also be evenly utilized because each transceiver is configured to cycle through the data channels 210 upon transmission in either a predetermined and/or pseudorandom pattern.

The current FCC guidelines require even usage of channels across an entire bandwidth. In one embodiment, it would appear that the acquisition channels 220 would get 4× more usage then the data channels 210. This may be accounted for, however, by limiting the data throughput at each acquisition channel 220. The total number of data bits communicated in the acquisition channels 220 is about equal to or less than the total number of data bits communicated across the many data channels 210.

Spread-spectrum communication may also be advantageous because it provides for communication from more devices using a given frequency band and greatly reduces the effects of interference. If one channel is currently in use or has some external interference, the transceivers can simply switch to another frequency channel. In one embodiment, the transmitter dictates what the next frequency channel will be by communicating the data channel index in the preamble of a communication packet. Frequency hopping is often used in spread-spectrum communication, which, as its name implies, is generally the process of changing frequency channels in which a transceiver communicates during operation.

As briefly discussed above with respect to FIG. 2, several embodiments of the spread-spectrum communication protocol work by communicating a preamble portion of a communication packet in one of the designated acquisition channels 220. A receiver can cycle through the designated acquisition channels 220 and lock onto a carrier signal at the acquisition channel 220 in which a transmitter is communicating. The receiver then receives the remainder of the preamble, which includes a data channel index field. The receiver then switches to the data channel 210 as designated by the data channel index and prepares to receive the remainder (the data portion) of the communication packet. This will be discussed in further detail in subsequent figures.

The fixed-frequency communication protocol is designated to communicate within another frequency band. In the embodiment illustrated in FIG. 3, the fixed-frequency channel band 230 is confined within one of the channels designated for the spread-spectrum communication protocol. For example, as FIG. 3 illustrates, the fixed-frequency channel band 230 is allotted the 916.3-916.7 MHz frequency band which is slightly smaller then one of the spread-spectrum communication channels of 500 kHz. It should be noted that the frequency band selected for the fixed-frequency communication protocol is merely a preferred frequency band and other frequency bands, including those outside the band dedicated for spread-spectrum communication, could be utilized. Importantly, other components of the dual-mode transceivers are a function of the selected frequency band. For example, antenna 60 may be a dual-frequency antenna for operating in two different frequency bands.

In one embodiment, eight channels 235 (each 50 kHz) are dedicated for fixed-frequency communication with the carrier frequency being centered in each channel 235. Of course, the number of fixed-frequency channels 235 and the allotted bandwidth for each channel 235 can vary.

Important to note is the relatively narrow bandwidth provided for the fixed-frequency channels 235. This is because the illustrated embodiment of the fixed-frequency communication protocol calls for lower power communication and also amplitude modulation. First, with lower power communications, the power spectral density at each carrier frequency is much more focussed at the carrier frequency than higher power communications. Thus, with higher-power communications, more bandwidth is required to allow sufficient separation between the also-wider frequency responses. Second, amplitude modulation, such as OOK, does not require deviation from the carrier frequency, as only the amplitude of the carrier frequency (or a nearby secondary frequency) is being modulated.

A receiving device operating within the fixed-frequency communication protocol, will search for a carrier frequency by cycling through the fixed-frequency channels 235 searching for a carrier frequency. Once locked on to a carrier frequency, the receiver will begin receiving the preamble and also the data portion of a communication packet. Unlike in the spread-spectrum communication protocol, the receiver will not be required to switch to another channel to receive the data portion of the communication packet.

FIG. 4A illustrates an embodiment of a fixed-frequency communication packet, or frame, 300 and FIG. 4B illustrates an embodiment of a spread-spectrum communication packet 400. Both embodiments preferably implement the Manchester encoding scheme. Nonetheless, one of ordinary skill in the art will appreciate that other embodiments may employ other encoding schemes. The Manchester encoding scheme is a bit-level encoding scheme well known in the art for its reliability and ease of timing synchronization. The Manchester encoding scheme translates a binary 1 data bit into a low-to-high transition, at the physical layer level. A binary 0 data bit is thus a high-to-low transition, at the physical layer level. Thus, for each data bit to be transmitted, a full data cycle is required with a 50% duty cycle. Although this cuts the data throughput in half, timing and synchronization is easily accomplished because synchronization can be done at each clock cycle.

Referring to FIG. 4A, the fixed-frequency communication packet 300 includes a preamble portion 301 and a data portion 302, both of which are communicated while at the same frequency channel. The preamble portion 301 includes a training sequence 310, which is composed of a predefined sequence of bits. In one embodiment, the sequence 310 is a series of binary 1s. The length of sequence 310 should be suitable for a receiver to cycle through the designated fixed-frequency channels 235 and look for the sequence. The receiver is configured to look for a subset, such as six or eight consecutive binary 1s. If the receiver receives this subset, the receiver remains at the current fixed-frequency channel 235. Otherwise, the receiver will move on to the next channel. In one embodiment, the training sequence 310 is 24 bits in length. Furthermore, the training sequence 310 could be another sequence besides consecutive binary 1s. Consecutive binary 0s or alternating binary 1s or 0s could be utilized.

As discussed earlier, the Manchester encoding scheme makes timing and synchronization relatively easy. A string of consecutive binary 1s appears to a receiver to be a square wave with a 50% duty cycle (as would a string of consecutive 0s, 180 degrees out of phase). If a receiver receives this square wave for a predefined period (equivalent to the prescribed period of time for the synchronization subset), the receiver will recognize that this data is the start of a communication packet, and timing and synchronization can then be performed with a standard phase lock loop.

As illustrated in FIG. 4A, a start marker 320 is composed of two bits and used to signify the end of the training sequence 310 and the start of the data portion 302 of the communication packet 300. The start marker 320 breaks away from the standard Manchester encoding scheme and is made up of two full clock cycles (thus two bits) of an all high (or on, for OOK) signal. Certainly, other configurations could be utilized.

The data portion 302 of the fixed-frequency communication packet 300 is composed of a variable length payload 330. In one embodiment, the variable length payload 330 is similar to the variable length payload 430 of the spread-spectrum communication packet 400 of FIG. 4B and will be discussed in further detail below.

Turning now to FIG. 4B, the spread-spectrum communication packet 400 is made up of a preamble portion 401 and a data portion 402. In one embodiment, the preamble portion 401 of the spread-spectrum communication packet 400 is communicated at one of the acquisition channels 220 (See FIG. 3). The preamble portion 401 includes a training sequence 410 similar to training sequence 310 and also a data channel index field 415. In the one embodiment, the training sequence 410 is composed of 48 bits, but this may greatly vary in other embodiments. The length of the training sequence 410 should be suitable for a receiver to cycle through all of the acquisition channels 220.

The preamble 401 also includes a data channel index field 415, which communicates to a receiver the data channel at which the data portion 402 of the communication packet 400 will be communicated. In one embodiment, the data channel index field 415 is composed of eight bits. The two most significant bits 415 are binary 0s and the remaining six bits are used to communicate the data channel. The data channel index field 415 also serves to notify a receiver that the communication packet is a spread-spectrum communication packet and not a fixed-frequency communication packet.

A start marker 420 similar to start marker 320 is then included in the communication packet 400. In the embodiment of FIG. 4B, the start marker 420 is composed of four bits and used to signify the end of the preamble 401.

The data portion 402 of the communication packet 400 is composed of a variable length payload 430. Briefly, the variable length payload 430 may include fields, such as a start-of-packet, or header, 431, receiver (Rx) address 432, and transmitter (Tx) address 433. A checksum, cyclic-redundancy check (CRC) 434 or other equivalent error detection scheme could be included in the variable length payload 430. Next, the actual data is transmitted in a variable length payload 435 followed by a footer 436. In one embodiment, the variable length payload 430 can vary from 112 to 1024 bits. The upper limit is defined by the data rate and a maximum dwell time at a particular channel. These parameters may be different in other embodiments, thus varying the length of the data portions of the communication packets. However, the length of the total communication packet should provide for continuous communication at a particular channel, at a given data rate, that is less then the maximum dwell time allotted by the FCC's guidelines. In one embodiment, 400 ms is the maximum dwell time allotted for communication on any frequency channel in the UHF band. The communication packet has a variable length (but not to exceed a given length) and the preferred data rate is 2400 bits per second (bps). This may vary in other embodiments.

The discussion that follows is directed toward the flow charts of FIGS. 5-8. The flow charts of FIGS. 5-8 are intended to illustrate embodiments of methods for communicating in a dual-mode communication protocol. In general, the methods may be embodied in software, hardware, firmware, or any combination thereof, and may be executed by devices, such as those illustrated in the embodiments of FIGS. 1-2.

Figure 5:
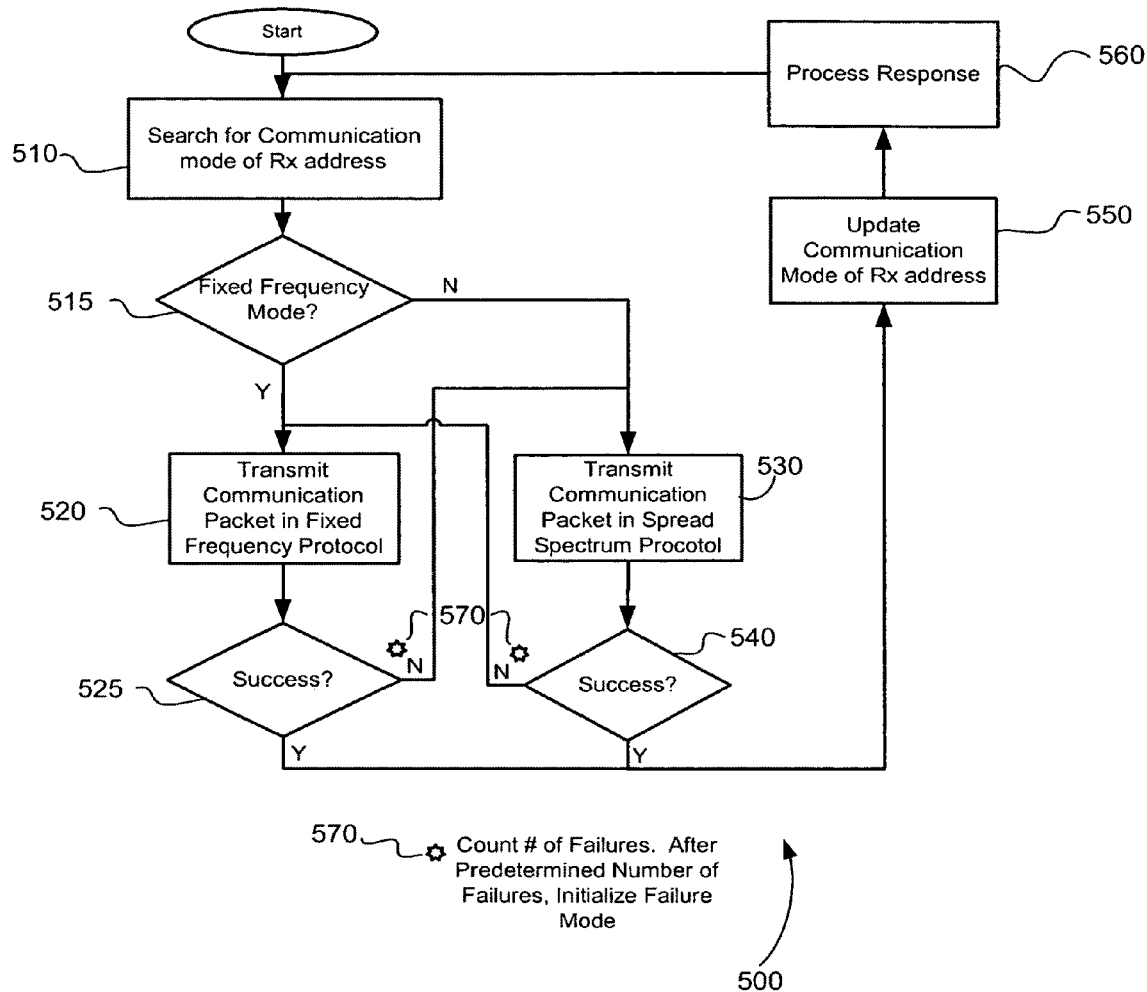
FIG. 5 is a flow chart illustrating an embodiment of a method for transmitting in a dual-mode communication protocol.

FIG. 5 is a flow chart illustrating an embodiment of a method 500 for transmitting in the dual-mode communication mode. Initially, the method 500 begins by receiving a command to transmit a particular communication packet. The communication packet may be generated by the device preparing to transmit, or it may be from another device having just sent the communication packet. In the latter case, the current device serves as a relay or repeater.

The method 500 proceeds by first searching for the communication mode of the intended receiver (step 510). This may be accomplished by examining the Rx address of the intended receiver, where information conveying the communication mode may be found. For example, the two MSBs of the Rx address may be reserved for conveying whether the receiver can communicate in the fixed-frequency communication protocol, the spread-spectrum communication protocol, or both. This may require querying the Rx address table 104 found in memory 100 of a transceiver (see FIG. 2). Alternatively, this information may be found in another table, which is not fully integrated with the Rx address.

If it is determined that the receiver communicates in the fixed-frequency communication protocol (step 515), the transmitter then begins transmission of the communication packet in the fixed-frequency communication protocol (step 520). The fixed-frequency communication protocol operates by communicating the entire communication packet, including the preamble and data portion, while at one frequency channel. Furthermore, the fixed-frequency communication protocol may utilize a particular modulation scheme, such as a particular amplitude modulation scheme. Likewise, the fixed-frequency communication protocol may transmit at a given power level. In the preferred embodiment, the fixed-frequency communication protocol operates at a substantially low-power radiation level. Other modulation schemes and/or power radiation levels could be utilized without departing from the scope of the present invention.

The transmitter may determine whether the transmission was a success (step 525) by receiving a response from the intended receiver. In certain instances, a response may not be required, thus the transmitter may not expect such a response. In these instances, success verification is not necessary and this step may be omitted.

Upon a success, or upon completing transmission of the communication packet if success verification is not necessary, the communication mode of the intended receiver may be updated (step 550), if necessary, and the response communication packet can be processed (step 560). Upon a failure, the method 500 proceeds by attempting to communicate in the spread-spectrum communication protocol (step 530).

Returning back to step 515, if it is determined that the intended receiver does not communicate in the fixed-frequency communication protocol, the transmitter will then begin transmission in the spread-spectrum communication protocol (step 530). This step will be discussed in further detail with relation to FIG. 6.

Upon transmitting the communication packet in the spread-spectrum communication protocol, the transmitting device may then verify whether the transmission was successful by receiving a response from the intended receiver (step 540). If successful, the method 500 proceeds to step 550 where the communication mode of the intended receiver may be updated. The transmitter can then process the response, if necessary (step 560). If not successful, the method 500 proceeds by attempting to transmit the communication packet in the fixed-frequency communication protocol (step 520).

A simple counter can be applied to count the number of failures or attempts at communicating in the two protocols (step 570). After a prescribed number of failures, a failure mode may be initialized, which may include a recalibration feature.

In some situations, the transmitting device may not have knowledge of the communication mode in which the intended receiver operates. In this case, the default procedure is to first attempt communication in the spread-spectrum communication protocol (step 530). If this is successful, the communication mode related to the intended receiver may be updated. If not successful, transmission can be attempted in the fixed-frequency communication protocol. If successful, the communication mode related to the intended receiver can be updated accordingly. Alternatively, the default may be to attempt communication first in the fixed-frequency communication protocol, and then the spread-spectrum communication protocol.

Figure 6:
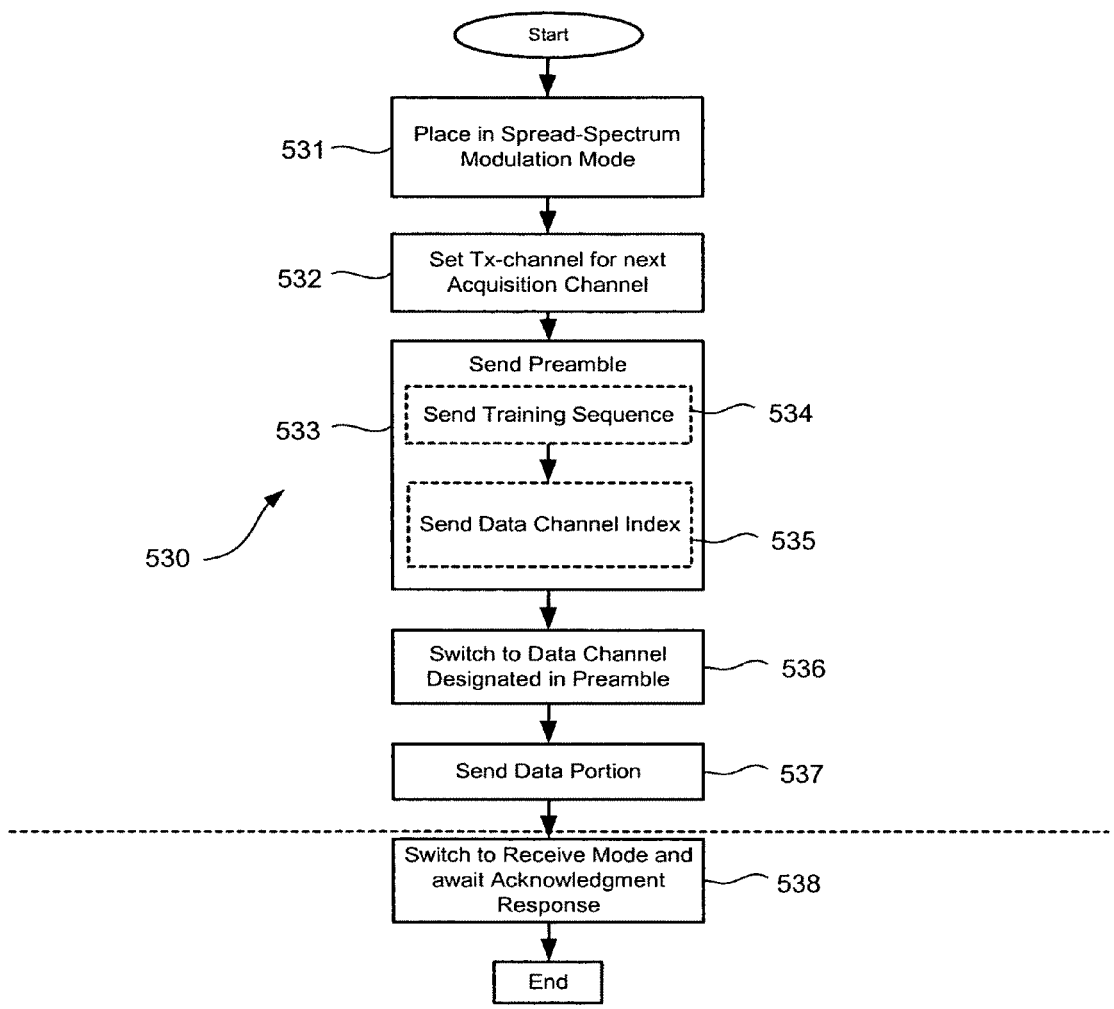
FIG. 6 is a flow chart illustrating an embodiment of a method for transmitting in a spread-spectrum communication protocol.

FIG. 6 is a flow chart illustrating an embodiment of a method 530 for transmitting in the spread-spectrum communication protocol. The method 530 begins by placing the transmitting device in the spread-spectrum modulation mode (step 531). In one embodiment, the spread-spectrum modulation mode utilizes a frequency modulation scheme, such as frequency shift keying (FSK) modulation. In other embodiments, other modulation schemes could be utilized, including those other then frequency modulation schemes. Furthermore, the spread-spectrum communication protocol calls for transmitting at a relatively higher-power radiation power then the fixed-frequency communication protocol. In this manner, the spread-spectrum communication protocol facilitates greater range and signal penetration.

The method 530 proceeds by setting the transmitting channel to the desired acquisition channel (step 532). The desired acquisition channel may be chosen in a predetermined pattern, or randomly.

Once the transmitting channel is set, the preamble of the communication packet can be sent (step 533). This step includes sending the training sequence (step 534) and the data channel index (step 535).

Upon sending the preamble, the transmitting device then switches the transmitting channel to the data channel as designated by the data channel index (step 536). The designated data channel may be selected in a predetermined pattern, or randomly. Subsequently, the data portion of the communication packet (step 537) is sent.

Once the entire communication packet is sent, the transmitting device may then switch to receive mode and await a response acknowledging reception of the communication packet by the intended receiver (step 538). This step may be omitted if no response is necessary. Receive mode is described in further detail in subsequent figures.

Figure 7:
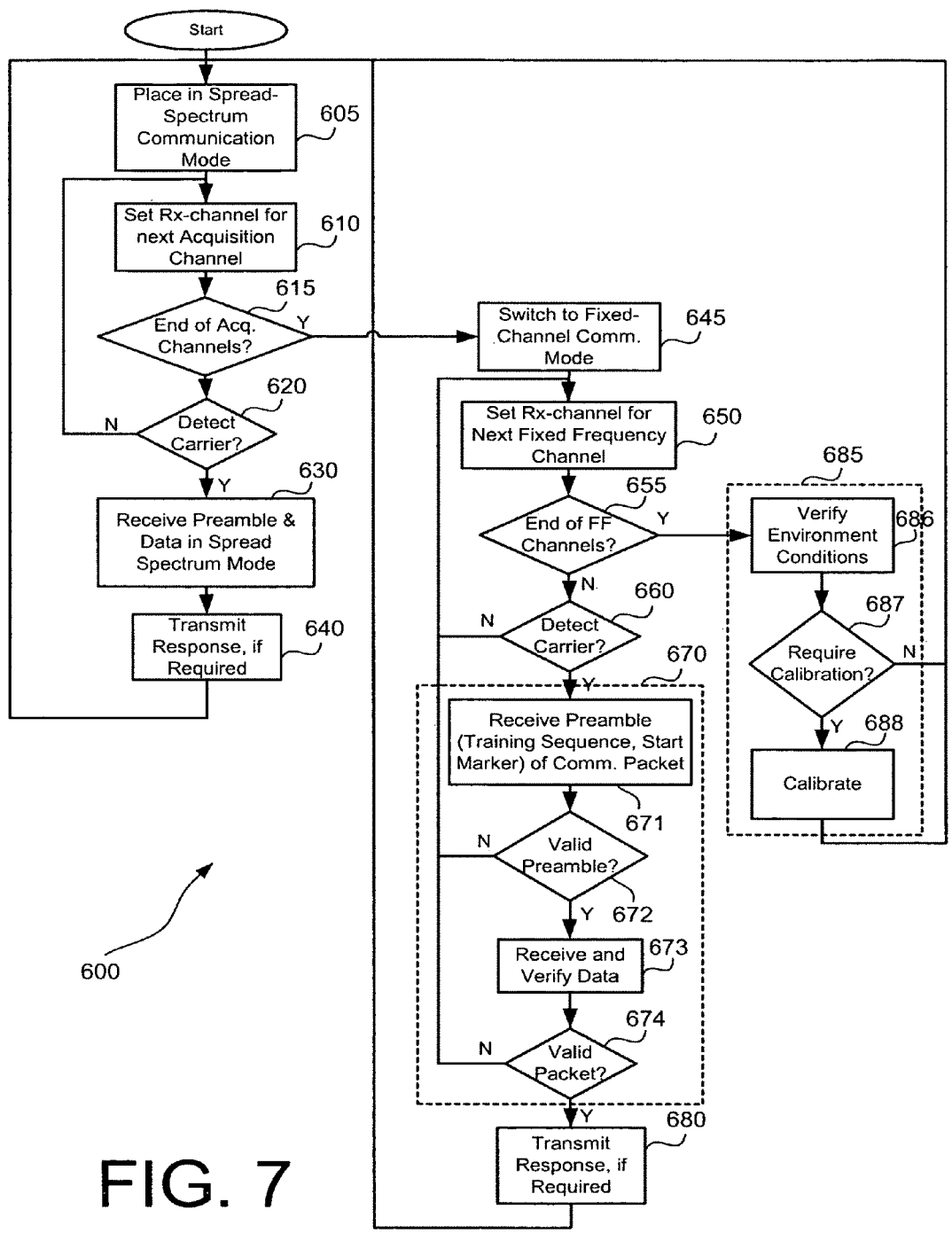
FIG. 7 is a flow chart illustrating an embodiment of a method for receiving in the dual-mode communication protocol.

FIG. 7 is a flow chart illustrating one embodiment of a method 600 for receiving in the dual-mode communication protocol. The method 600 begins by placing the receiving device in one of the communication modes, in this case the spread-spectrum communication mode, which includes setting the demodulation mode to the chosen spread-spectrum modulation/demodulation scheme, as discussed in FIGS. 5 & 6 (step 605).

Next, the receiving channel is set for the next acquisition channel in the sequence or series of acquisition channels (step 610). The sequence or series of acquisition channels may be predetermined and preprogrammed into the firmware of the receiving devices, or may be done in a random or pseudorandom fashion. If it is determined that all of the acquisition channels have been used without detecting a carrier signal (step 615) the method 600 then proceeds with switching to fixed-frequency communication mode, which will be discussed shortly.

At each acquisition channel, a carrier signal is checked for using standard carrier detection techniques as known in the art (step 620). If one is not found at the current acquisition channel, the method 600 returns to step 610, where the receiving channel moves on to the next acquisition channel.

Figure 8:
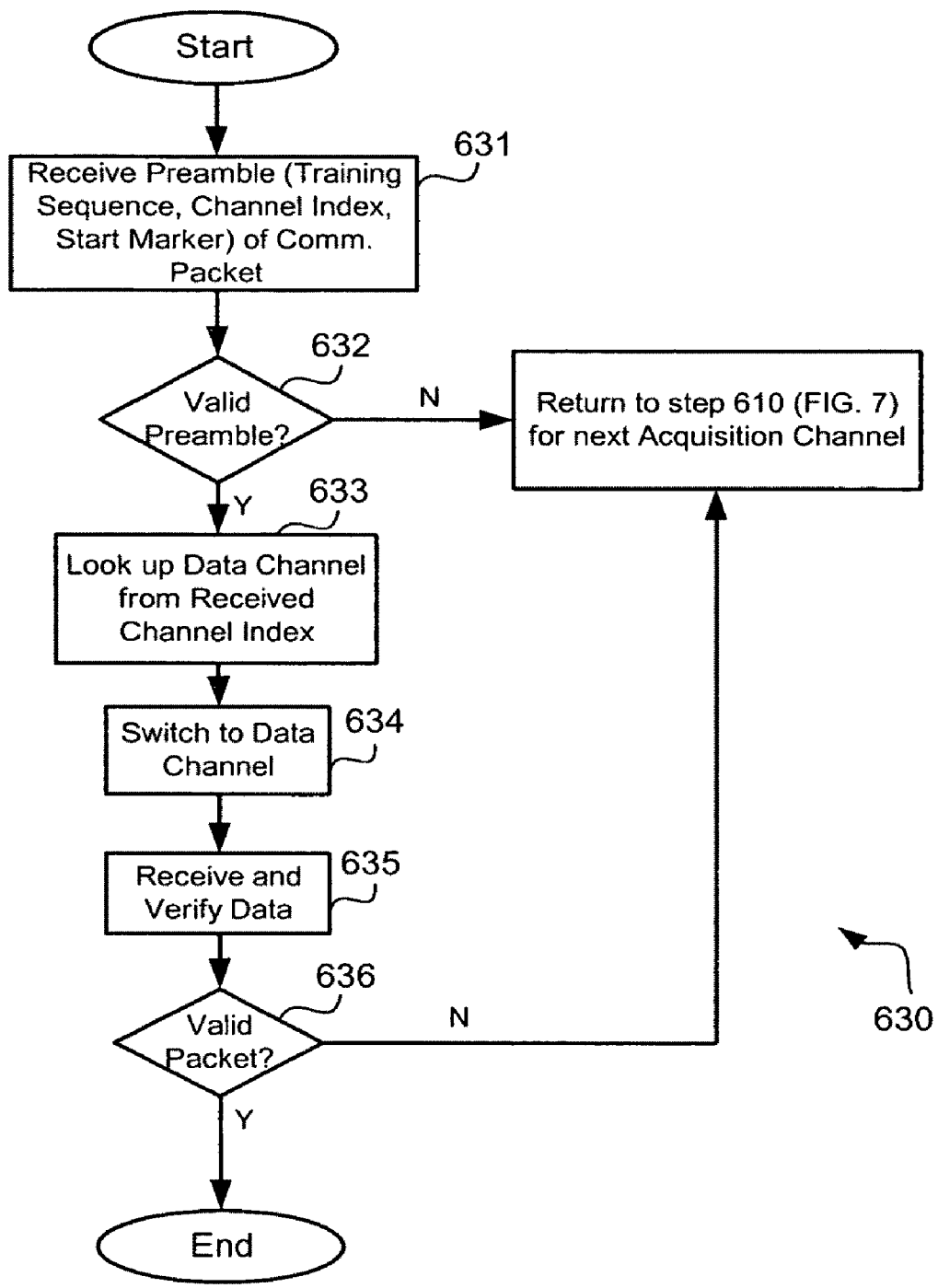
FIG. 8 is a flow chart illustrating an embodiment of a method for receiving in the spread-spectrum communication protocol.

If a carrier signal is detected, the method 600 proceeds with receiving the communication packet in the spread-spectrum communication protocol (step 630), which is discussed in further detail in FIG. 8.

Next, the receiving device transmits a response back to the originating transmitter verifying a successful communication (step 640). Transmitting a successful response may require communicating by way of the methods illustrated in FIGS. 5 & 6. Upon transmitting a response, the receiving device can then return back to the start of the method 600 and prepare for the next communication packet.

As mentioned above, if all of the acquisition channels are cycled through and a carrier signal is not detected (at step 615), the method 600 proceeds to the fixed-frequency communication mode. In this case, the receiving device switches (if necessary) to the fixed-frequency demodulation scheme (step 645). In one embodiment, the fixed-frequency modulation/demodulation scheme is different from the spread-spectrum modulation scheme, thus requiring a switch. Alternatively, however, the two modulation/demodulation schemes may be the same.

Next, the receiving channel is set to the next fixed-frequency channel (step 650). The next fixed-frequency channel may be selected among the designated fixed-frequency channels at random or in a predetermined manner. If it is determined that all of the fixed-frequency channels have been traversed without detecting a carrier signal (step 655), a recalibration procedure may be initiated (step 685). The recalibration procedure may not, however, be initiated until after a significant number of traversals of the acquisition channels and fixed-frequency channels without a carrier signal detection.

If a carrier signal is detected at step 660, the receiving device locks on and synchronizes communication by receiving the training sequence in the preamble of the communication packet. The remainder of the communication packet, including the data portion is then received at the current receiving channel (step 670).

Included within the step of receiving the entire communication packet (step 670) are several points at which the integrity of the data is verified. First, the receiving device receives the preamble of the communication packet (step 671). Next, the preamble is verified to determine whether it is a valid preamble (step 672). If not, the method 600 may return to step 650 where a new fixed-frequency channel is selected. If a valid preamble is detected, the receiving device receives and verifies the remainder of the communication packet (step 673). If the communication packet is invalid, it may be ignored and the method resumes back to step 650. If the communication packet is valid, the receiving device may then switch to transmission mode and transmit a response (step 680).

The recalibration procedure (step 685) may greatly vary with other embodiments. In one embodiment, particular environment conditions can be verified to determine whether drastic changes have occurred which could result in device malfunctions (step 686). For example, drastic operating temperature changes or ambient temperature changes could be verified to determine whether they are the cause of a possible device malfunction. In practice, environmental conditions such as these take time to change, thus the recalibration procedure may be performed at certain intervals of time, perhaps every 1000 fixed-frequency channel cycles, as an example. If recalibration is necessary (step 687), a recalibration protocol could be enabled (step 688).

The method 600 may return back to the spread-spectrum communication mode at step 605. In other embodiments, it is entirely foreseeable that the fixed-frequency communication mode is the first mode chosen, as opposed to the spread-spectrum communication mode. In this case, a receiving device would first attempt to receive in the fixed-frequency communication mode and then switch to the spread-spectrum communication mode after cycling through all of the fixed-frequency channels.

FIG. 8 is a flow chart illustrating an embodiment of a method 630 for receiving in the spread-spectrum communication protocol. The method 630 begins once a carrier signal has been detected at a particular acquisition channel. A receiving device then receives a preamble portion of a communication packet, which includes a training sequence and data channel index (step 631). The training sequence, as discussed earlier, is used to synchronize the timing for the receiving device.

Once the preamble is received, the receiving device may verify whether the preamble is valid (step 632). If not, the receiving device may return back to step 610 and switch to the next acquisition channel.

If the preamble is valid, the method 630 proceeds with looking up the data channel corresponding to the received data channel index in the preamble (step 633). Once established, the receiving device switches to the designated data channel, if necessary (step 634). In certain instances, where the acquisition channels and data channels overlap, it may be possible for the data channel index to indicate to the receiving device to remain at the current channel for data reception. For example, the special case of six binary 1s may indicate to the receiving device to remain at the current acquisition channel for data reception.

The data portion of the communication packet is then received and verified for integrity (step 635). If the communication packet is found to be invalid, the receiving device may revert back to step 610 where the next acquisition channel is selected. If the communication packet is found to be valid, method 630 ends, and the receiving device prepares to transmit a response, if necessary.

The embodiment or embodiments discussed were chosen and described to illustrate the principles of the invention and its practical application to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A wireless transceiver used within a system for monitoring remote devices, said wireless transceiver comprising:
    an RF transceiver for communicating in a spread-spectrum communication protocol and a fixed-frequency communication protocol, the RF transceiver comprising:
        a spread-spectrum communication protocol chipset for communicating in a first modulation scheme at a first radiating-power level; and
        a fixed-frequency communication protocol chipset for communicating in a second modulation scheme at a second radiating-power level;
    a data controller coupled to the RF transceiver for processing data communicated by the RF transceiver; and
    a memory comprising spread-spectrum logic implemented by at least one of the data controller and the RF transceiver, the spread-spectrum logic configured to:
    prepare a preamble portion and a data portion of a transmit-communication frame, the preamble portion comprising a first data channel index indicative of a first data channel frequency for communicating the data portion of the transmit-communication frame;
    transmit the preamble portion of the transmit-communication frame at a first frequency channel; and
    transmit the data portion of the transmit-communication frame at the first data channel frequency, and
    wherein the memory further comprises fixed-frequency logic implemented by at least one of the data controller and the RF transceiver, the fixed-frequency logic configured to:
    prepare a preamble portion and a data portion of a fixed frequency communication frame; and
    transmit the preamble portion and the data portion at a fixed-frequency designated channel frequency.

2. The transceiver of claim 1, wherein the memory further comprises:
    an acquisition channels table storing a first set of frequency channels designated for communicating the preamble portion of the transmit-communication frame; and
    a data channels table storing a second set of frequency channels designated for communicating the data portion of the transmit-communication frame.

3. The transceiver of claim 2, wherein the spread-spectrum logic is further configured to:
    receive a preamble portion of a receive-communication frame at a second frequency channel;
    detect a second data channel index in the preamble portion of the receive-communication frame indicative of a second data channel frequency for communicating a data portion of the receive-communication frame; and receive the data portion of the receive-communication frame at the second data channel frequency.

4. The transceiver of claim 3, wherein spread-spectrum logic is further configured to traverse through the first set of frequency channels in the acquisition channels table until synchronizing with a transmitting transceiver at a frequency channel, whereupon the frequency channel at which synchronization occurs is the second frequency channel.

5. The transceiver of claim 3, wherein the first frequency channel and the second frequency channel are the same.

6. The transceiver of claim 1, wherein the spread-spectrum logic is further configured to change the first or second modulation scheme for either of said communication protocols in accordance with a received remote command.

7. The transceiver of claim 1, wherein the spread-spectrum logic is further configured to change the radiating-power levels for either of said communication protocols in accordance with a received remote command.

8. The transceiver of claim 1, wherein the first modulation scheme is the same as said second modulation scheme.

9. The transceiver of claim 1, wherein the memory further comprises a receiver address table storing identification addresses of other devices with which the transceiver may communicate.

10. The transceiver of claim 9, wherein the receiver address table further stores a communication protocol and modulation scheme for each of the other devices with which the transceiver may communicate.

11. The transceiver of claim 1, wherein the memory further comprises a fixed-frequency channels table for storing a third set of frequency channels designated for communicating the fixed-frequency communication frame.

12. The transceiver of claim 1, further comprising a data interface coupled to said data controller for communicating data to and from at least a first remote device.

13. The transceiver of claim 2, wherein the first remote device is a utility meter, and wherein the data communicated is utility consumption data.

14. The transceiver of claim 2, wherein the first remote device is a pipe leakage sensor, and wherein the data communicated is leakage data.

15. The transceiver of claim 2, wherein the first remote device is a water quality sensor, and wherein the data communicated is water quality data.

16. The transceiver of claim 2, wherein the first remote device is an identification tag, and wherein the data communicated is identification data.

17. In a system for monitoring and controlling remote devices, the system comprising a plurality of remote devices, a gateway, and a plurality of wireless transceivers, wherein each wireless transceiver in the plurality of wireless transceivers is configured to communicate signals via at least one of a fixed-frequency communication protocol and a spread-spectrum communication protocol, a dual-mode transceiver integrated with at least one remote device in the plurality of remote devices, the dual-mode transceiver comprising:
    an RF transceiver configured to communicate with at least one of a first wireless transceiver in the plurality of wireless transceivers and the gateway;
    a data controller in communication with the RF transceiver, the data controller configured to process data to be communicated by the RF transceiver; and
    memory comprising:
        a receiver address table storing an identification address, a receiver communication protocol, and a receiver modulation scheme for the at least one of the first wireless transceiver and the gateway;
        a spread-spectrum logic implemented by at least one of the data controller and the RF transceiver, the spread-spectrum logic configured to execute a spread-spectrum transmit process if the receiver communication protocol is the spread-spectrum communication protocol, the spread-spectrum transmit process comprising:
            preparing a preamble portion and a data portion of a transmit-communication frame, the preamble portion comprising a first data channel index indicative of a first data channel frequency for communicating the data portion of the transmit-communication frame;
            transmitting the preamble portion of the transmit-communication frame to the at least one of the first wireless transceiver and the gateway at a first frequency channel with the receiver modulation scheme; and
            transmitting the data portion of the transmit-communication frame to the at least one of the first wireless transceiver and the gateway at the first data channel frequency with the receiver modulation scheme; and
        a fixed-frequency logic implemented by at least one of the data controller and the RF transceiver, the fixed-frequency logic configured to execute a fixed-frequency transmit process if the receiver communication protocol is the fixed-frequency protocol, the fixed-frequency transmit process comprising:
            preparing the preamble portion and the data portion of the transmit-communication frame; and
            transmitting the preamble portion and the data portion to the at least one of the first wireless transceiver and the gateway at a fixed-frequency designated channel frequency with the receiver modulation scheme.

18. The dual-mode transceiver of claim 17, wherein the memory further comprises a receive logic configured to execute a receive process, the receive process comprising:
    receiving a preamble portion of a receive-communication frame from at least one of the first wireless transceiver and the gateway at a second frequency channel;
    detecting a second data channel index in the preamble portion of the receive-communication frame indicative of a second data channel frequency for communicating a data portion of the receive-communication frame; and
    receiving the data portion of the receive-communication frame at the second data channel frequency.

* * * * *